(12) United States Patent
Hatanaka et al.

(10) Patent No.: US 6,999,948 B1
(45) Date of Patent: Feb. 14, 2006

(54) MEMORY CARD

(75) Inventors: Masayuki Hatanaka, Kawasaki (JP); Jun Kamada, Kawasaki (JP); Takahisa Hatakeyama, Kawasaki (JP); Takayuki Hasebe, Kawasaki (JP); Seigou Kotani, Kawasaki (JP); Shigeki Furuta, Kawasaki (JP); Takeaki Anazawa, Tokyo (JP); Tadaaki Tonegawa, Kodaira (JP); Toshiaki Hioki, Ogaki (JP); Miwa Kanamori, Ogaki (JP); Yoshihiro Hori, Gifu (JP)

(73) Assignees: Fujitsu Limited, Kawasaki (JP); Nippon Columbia Co., Ltd., Tokyo (JP); Hitachi, Ltd., Tokyo (JP); Sanyo Electric Co., Ltd., Moriguchi (JP)

( * ) Notice: Subject to any disclaimer, the term of this patent is extended or adjusted under 35 U.S.C. 154(b) by 583 days.

(21) Appl. No.: 10/048,482

(22) PCT Filed: Aug. 9, 2000

(86) PCT No.: PCT/JP00/05339

§ 371 (c)(1),
(2), (4) Date: Feb. 8, 2002

(87) PCT Pub. No.: WO01/13358

PCT Pub. Date: Feb. 22, 2001

(30) Foreign Application Priority Data

Aug. 10, 1999 (JP) ................................. 11-226406
Dec. 8, 1999 (JP) ................................. 11-349336

(51) Int. Cl.
*G06F 17/60* (2006.01)

(52) U.S. Cl. ................. 705/65; 713/150; 713/171; 705/51; 705/52; 705/57; 705/58; 705/59; 705/64; 380/200; 380/201; 380/202; 380/203; 380/277; 380/282

(58) Field of Classification Search ................ 713/150, 713/171; 705/50–79; 380/277–279, 282, 380/200–203
See application file for complete search history.

(56) References Cited

U.S. PATENT DOCUMENTS 6,055,314 A * 4/2000 Spies et al. ................. 380/228

(Continued)

FOREIGN PATENT DOCUMENTS

EP     0 561 685 A2     9/1993

(Continued)

OTHER PUBLICATIONS

Nikkei Electronics No. 739, pp. 49-53, Mar. 22, 1999. See PCT search report.

(Continued)

*Primary Examiner*—James P. Trammell
(74) *Attorney, Agent, or Firm*—Westerman, Hattori, Daniels & Adrian, LLP

(57) ABSTRACT

A memory card 110 extracts a session key Ks from the data applied onto a data bus BS3 by carrying out a decryption process. An encryption processing unit 1406 encrypts a public encryption key KPcard(1) of memory card 110 based on session key Ks, and applies the encrypted key to a server via data bus BS3. A memory 1412 receives from a server data such as license key Kc, license ID data License-ID and user ID data User-ID encrypted with a public encryption key KPcard(1) differing for each memory card for storage, and receives encrypted content data [Dc]Kc encrypted with license key Kc from data bus BS3 for storage.

10 Claims, 43 Drawing Sheets

U.S. PATENT DOCUMENTS

2002/0013772 A1 * 1/2002 Peinado .................. 705/51

FOREIGN PATENT DOCUMENTS

| JP | 62-53042 | 3/1987 |
| JP | 8-69419 | 3/1996 |
| JP | 8-186667 | 7/1996 |
| JP | 11-328033 | 11/1999 |

OTHER PUBLICATIONS

Nikkei Electronics No. 728, pp. 31-32, Oct. 19, 1998. See PCT search report.
Nikkei Electronics No. 731, pp. 29-30, Nov. 30, 1998. See PCT search report.

* cited by examiner

FIG.2

| | SYMBOL | ATTRIBUTE | PROPERTY | |
|---|---|---|---|---|
| KEY ADMINISTERED WITHIN MEMORY CARD | Kmedia | PRIVATE DECRYPTION KEY | UNIQUE TO MEDIUM | COMMON TO ALL MEMORY CARDS |
| | Kcard(n) | PRIVATE DECRYPTION KEY | | UNIQUE TO EACH MEMORY CARD |
| | KPcard(n) | PUBLIC ENCRYPTION KEY | | PAIRED WITH Kcard(n) DATA ENCRYPTED WITH KPcard(n) CAN BE DECRYPTED WITH Kcard(n) |
| KEY ADMINISTERED OUTSIDE MEMORY CARD | KPmedia | PUBLIC ENCRYPTION KEY | UNIQUE TO MEDIUM | PAIRED WITH Kmedia DATA ENCRYPTED WITH KPmedia CAN BE DECRYPTED WITH Kmedia |
| | Ks | SECRET SYMMETRIC KEY | UNIQUE TO SESSION | GENERATED FOR EACH COMMUNICATION (EXAMPLE: FOR EACH ACCESS). ADMINISTERED BY DISTRIBUTION SERVER AND CELLULAR PHONE |
| DISTRIBUTION DATA | Kc | SECRET SYMMETRIC KEY | LICENSE KEY | DECRYPTION KEY OF ENCRYPTED CONTENT DATA |
| | License-ID | INFORMATION ASSOCIATED WITH REPRODUCTION | | EXAMPLE: SPECIFIC INFORMATION OF SONG INFORMATION OF LIMITED NUMBER OF REPRODUCTIONS |
| | User-ID | INFORMATION TO IDENTIFY RECEIVER | | EXAMPLE: TELEPHONE NUMBER |
| | Dc | CONTENT DATA | | EXAMPLE: MUSIC INFORMATION DATA |
| | [Dc]Kc | ENCRYPTED CONTENT DATA | | CONTENT DATA ENCRYPTED WITH SECRET SYMMETRIC KEY Kc |

FIG.13

DISTRIBUTION WITH REGISTER [SERVER] | CELLULAR PHONE (USER 1) | CARD 140

DISTRIBUTION REQUEST — S100

SESSION KEY Ks GENERATION — S103

ENCRYPT KEY Ks WITH PUBLIC ENCRYPTION KEY KPmedia — S104

TRANSMIT [Ks]Kmedia — S106

S108 — DECRYPT AND EXTRACT KEY Ks USING KEY Kmedia

S110 — ENCRYPT PUBLIC ENCRYPTION KEY KPcard(1) USING KEY Ks

S112 — TRANSMIT [KPcard(1)]Ks

DECRYPT AND EXTRACT KEY KPcard(1) USING KEY Ks — S114

OBTAIN LICENSE KEY Kc FROM DISTRIBUTION INFORMATION DATABASE — S116

GENERATE LICENSE ID License-ID AND USER ID User-ID — S118

ENCRYPT KEY Kc, DATA License-ID AND User-ID USING KEY KPcard(1) — S120

ENCRYPT [Kc, License-ID, User-ID]Kcard(1) USING KEY Ks — S122

TRANSMIT [[Kc, License-ID, User-ID]Kcard(1)]Ks — S124

S126 — DECRYPTION USING Ks

S128 — STORE IN MEMORY

S129 — DECRYPT License-ID AND User-ID USING KEY Kcard(1), AND STORE IN REGISTER

OBTAIN [Dc]Kc FROM DISTRIBUTION INFORMATION DATABASE, AND TRANSMIT — S130

S132 — STORE IN MEMORY (STATE SA)

FIG.17

REPRODUCTION WITH REGISTER NUMBER OF TIMES OF REPRODUCTION

CELLULAR PHONE (USER 1)

- REQUEST — S200
- GENERATE Ks — S210
- ENCRYPT KEY Ks USING KEY KPmedia — S212
- TRANSMIT [Ks]Kmedia — S214
- OBTAIN DECRYPTION KEY Kc USING KEY Ks — S222
- DECRYPT DATA [Dc]Kc BY KEY Kc — S226
- REPRODUCTION OF CONTENT DATA — S228

CARD 110

- OBTAIN DATA License-ID STORED IN REGISTER — S205
- DECRYPTION ALLOWED? (LICENSE ID: License-ID) — S206
  - Y → TRANSMIT REPRODUCTION ALLOW NOTIFICATION — S208 (STATE SA)
  - N → TRANSMIT REPRODUCTION DISALLOW NOTIFICATION — S230 (STATE SB)
- DECRYPT AND EXTRACT KEY Ks WITH KEY Kmedia — S216
- MODIFY DATA License-ID IN REGISTER — S217
- READ OUT [Kc, License-ID, User-ID] Kcard(1) FROM MEMORY, AND DECRYPT USING Kcard(1) — S218
- ENCRYPT LICENSE KEY Kc USING KEY Ks — S219
- TRANSMIT [Kc]Ks — S220
- READ OUT DATA [Dc]Kc FROM MEMORY — S224

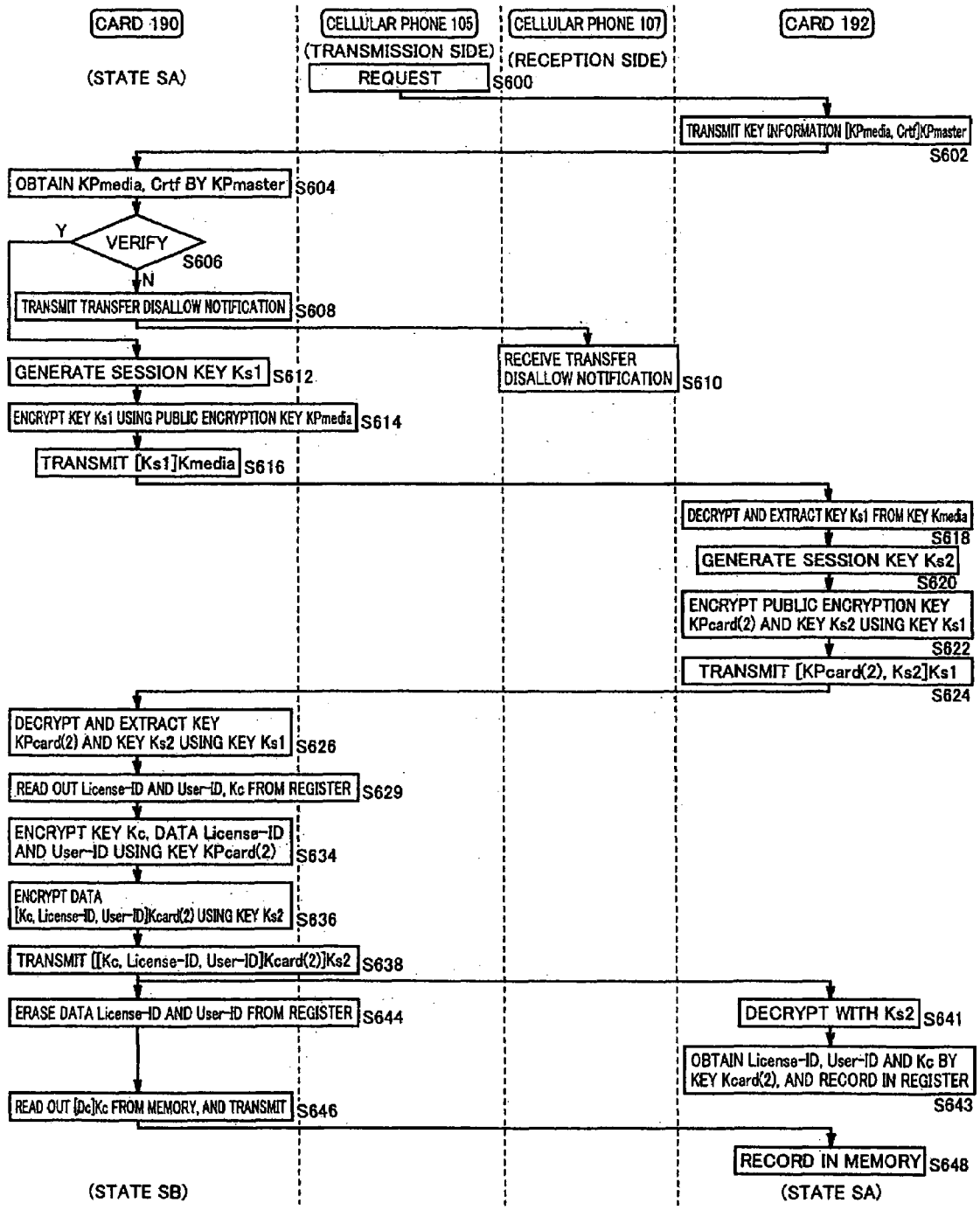

MEMORY CARD

TECHNICAL FIELD

The present invention relates to a memory card that allows, protection on copyrights with respect to copied information in an information distribution system to distribute information to terminals such as cellular phones.

BACKGROUND ART

By virtue of the progress in information communication networks and the like such as the Internet in these few years, each user can now easily access network information through individual-oriented terminals employing a cellular phone or the like.

In such information communication, information is transmitted through digital signals. It is now possible to obtain copied music and video information transmitted via the aforementioned information communication network without degradation in the audio quality and picture quality of the copy information, even in the case where the copy operation is performed by an individual user.

Thus, there is a possibility of the copyright of the copyright owner being significantly infringed unless some appropriate measures to protect copyrights are taken when any created work subject to copyright protection such as music and image information is to be transmitted on the information communication network.

However, if copyright protection is given top priority so that distribution of copyrighted data through the disseminating digital information communication network is suppressed, the copyright owner who can essentially collect a predetermined copyright royalty for copies of a copyrighted work will also incur some disbenefit.

Consider the case of a recording medium recorded with digital information instead of the above-described distribution through a digital information communication network. As to the commercially-availabled CDs (Compact Disks) recorded with music information, copying music information from a CD to a magneto optical disk (MD) can be carried out basically arbitrarily as long as the copied music is used only for individual usage. Although indirectly, the individual user conducting digital recording and the like pays as a compensation a predetermined amount out of the cost of the digital recording equipment per se or the medium such as the MD to the copyright owner.

Based on the fact that the resultant music information constituted by digital signals, when copied from a CD to a MD, corresponds to digital information with almost no degradation through the copy operation, copying music data from one MD to another MD as digital information is disabled due to configuration constraints on the apparatus for the purpose of protecting copyright owners.

At the current stage, one can copy arbitrarily from a CD which is a digital recording medium to a MD, but not from a recordable MD to another MD.

In view of the foregoing, sufficient measures must be taken in distributing music and image information to the public through the digital information communication network for the purpose of copyright protection since distribution per se is an act subject to restriction based on the copyright owner's right of transmission to the public.

In this case, it is necessary to prevent any unauthorized user from receiving copyrighted data transmitted to the public through an information communication network, as well as preventing any copyrighted work, once received by an authorized user, to be further copied without permission.

DISCLOSURE OF THE INVENTION

An object of the present invention is to provide a memory card in an information distribution system that allows only the user with the proper access right to receive copyrighted data through an information communication network such as a cellular phone or the like when distributing copyrighted data.

Another object of the present invention is to provide a memory card in an information distribution system that can prevent distributed copyrighted data from being copied without permission of the copyright Owner.

The memory card according to the invention of the present application to achieve the above objects is a memory card receiving and recording encrypted content data. The memory card includes a first key hold unit, a first decryption processing unit, a second key hold unit, a first encryption processing unit, a second decryption processing unit, a first storage unit, a third key hold unit, and a third decryption processing unit.

The first key hold unit stores a first private decryption key to decrypt data encrypted by a predetermined first public encryption key corresponding to the memory card.

The first decryption processing unit receives a first symmetric key encrypted by the first public encryption key, and applies a decryption process. The first symmetric key is updated and distributed for each communication of encrypted content data.

The second key hold unit stores a second public encryption key which is unique to each memory card. The first encryption processing unit encrypts and outputs the second public encryption key based on the first symmetric key.

The second decryption processing unit receives a content key encrypted by the second public encryption key and further encrypted by the first symmetric key, and applies a decryption process based on the first symmetric key. The first storage unit receives and stores the output of the second decryption processing unit. The third key hold unit stores a second private decryption key to decrypt data encrypted by the second public encryption key. The third decryption processing unit decrypts the content key with the second private decryption key based on data stored in the first storage unit.

According to another aspect of the present invention, a memory card to receive and record encrypted data and decryption information data to decrypt the encrypted data includes a first storage unit, a first key hold unit, a second key hold unit, a first decryption processing unit, a third key hold unit, a session key generation unit, a first encryption processing unit, a second decryption processing unit, a second storage unit, a fourth key hold unit, and a third decryption processing unit.

The first storage unit stores encrypted data. The first key hold unit stores a predetermined first public encryption key corresponding to the memory card and its own authentication data encrypted so as to be decryptable using a public authentication key, and can output the same to an external source.

The second key hold unit stores a first private decryption key to decrypt data encrypted by the first public encryption key. The first decryption processing unit receives a first symmetric key that is encrypted by the first public encryption key, and applies a decryption process. The first symmetric key is updated and transmitted for each communication of decryption information data.

The third key hold unit stores a second public encryption key that differs for each memory card.

The session key generation unit generates a second symmetric key updated for each decryption information data communication. The first encryption processing unit encrypts the second public encryption key and second symmetric key based on the first symmetric key, and outputs the keys. The second decryption processing unit decrypts, based on the second symmetric key, decryption information data encrypted by the second public encryption key at an external source, and further encrypted by the second symmetric key.

The second storage unit stores decryption information data encrypted by the second public encryption key output from the second decryption processing unit. The fourth key hold unit stores the second private decryption key to decrypt data encrypted by the second public encryption key. The third decryption processing unit decrypts the data stored in the second storage unit based on the second private decryption key, and extracts decryption information data.

According to a further aspect of the present invention, a memory card to receive and record encrypted data and decryption information data to decrypt the encrypted data includes a first storage unit, a first key hold unit, a second key hold unit, a first decryption processing unit, a third key hold unit, a session key generation unit, a first encryption processing unit, a second decryption processing unit, a fourth key hold unit, a third decryption processing unit, and a second storage unit.

The first storage unit stores encrypted data. The first key hold unit stores a predetermined first public encryption key corresponding to the memory card and its own authentication data encrypted so as to be decryptable using a public authentication key, and allows output to an external source.

The second key hold unit stores a first private decryption key to decrypt data encrypted by the first public encryption key. The first decryption processing unit receives a first symmetric key encrypted by the first public encryption key, and applies a decryption process. The first symmetric key is updated and transmitted for each communication of decryption information data. The third key hold unit stores a second public encryption key that differs for each memory card.

The session key generation unit generates a second symmetric key updated for each communication of the decryption information data. The first encryption processing unit encrypts and outputs the second public encryption key and second symmetric key based on the first symmetric key.

The second decryption processing unit decrypts, based on the second symmetric key, the decryption information data encrypted with the second public encryption key at an external source, and further encrypted with the second symmetric key.

The fourth key hold unit stores a second private decryption key to decrypt data encrypted by the second public encryption key.

The third decryption processing unit receives decryption information data encrypted by the second public encryption key at an external source, and decrypts the decryption information data by the second private decryption key. The second storage unit stores decryption information data.

According to the present invention, only the proper user can receive and store content data in a memory, and when data once stored in a memory card is to be copied by another user, data reproduction is disabled at the transmission source if data is to be transferred in a reproducible state for that another user. It is therefore possible to prevent copyright owners from incurring undue disbenefit caused by unrestricted copying.

BRIEF DESCRIPTION OF THE DRAWINGS

FIG. 2 is a diagram to describe together characteristics of key data and the like used for communication in the information distribution system of FIG. 1.

FIG. 13 is a flow chart to describe a distribution mode using memory card 140 of FIG. 12.

FIG. 17 is a flow chart describing the reproduction mode of decrypting encrypted content data and providing the same as music data output according to a modification of the third embodiment.

FIG. 43 is a flow chart to describe a transfer mode between two memory cards in the ninth embodiment.

BEST MODES FOR CARRYING OUT THE INVENTION

Embodiments of the present invention will be described hereinafter with reference to the drawings.

First Embodiment

Figure 1:
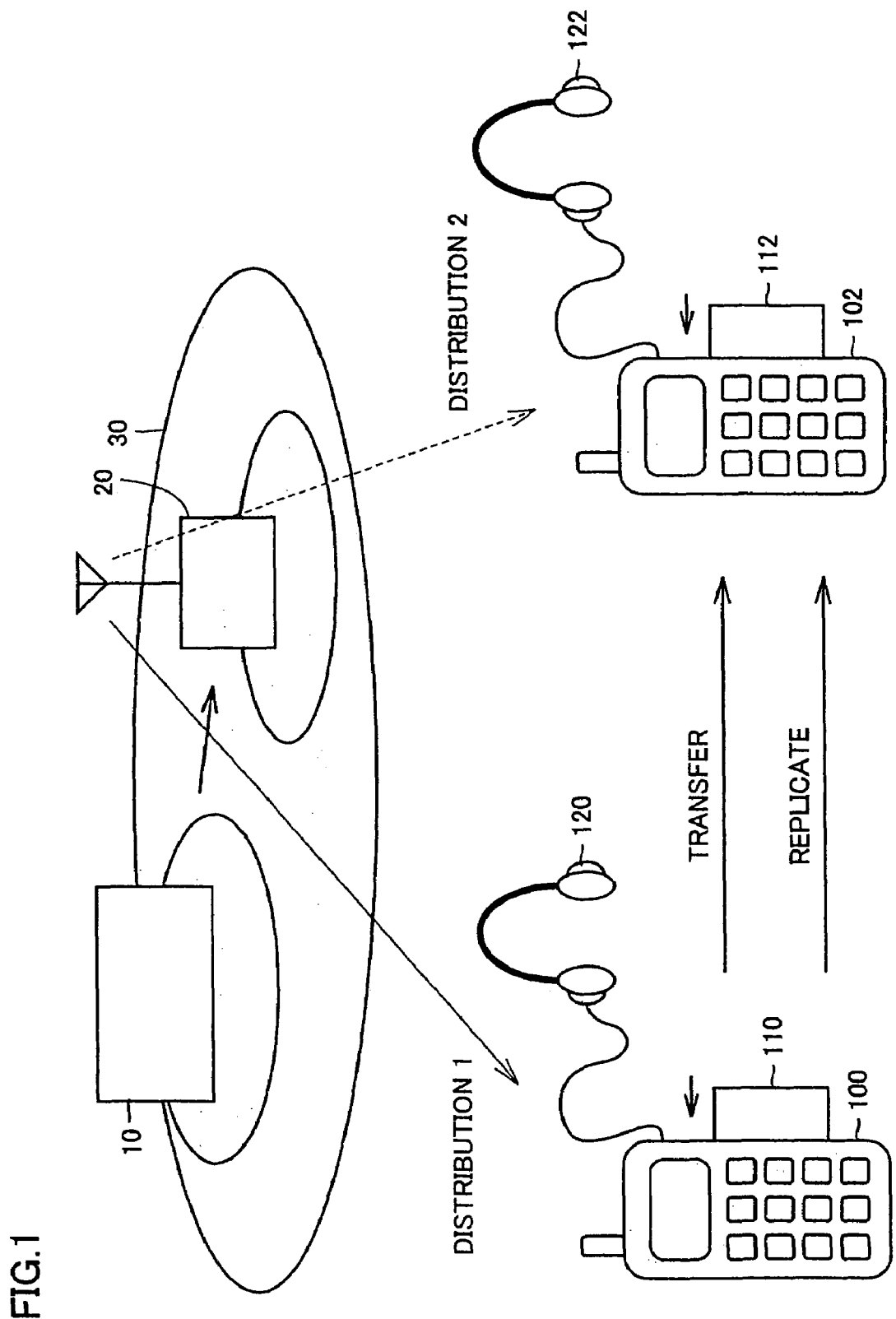
FIG. 1 is a diagram to describe schematically an entire structure of an information distribution system of the present invention.

FIG. 1 is a diagram to describe schematically an entire structure of an information distribution system of the present invention.

Although a configuration of a data distribution system that distributes music data to respective users through a cellular phone network will be described as an example hereinafter, the present invention is not limited thereto, as will become apparent from the following description. The present invention is applicable to the case of distributing other copyrighted data, for example, copyrighted data of image data or the like, through other information communication networks.

Referring to FIG. 1, a content server 10 administrating music information subject to copyright protection encrypts music data according to a predetermined cryptographic scheme (also called "content data" hereinafter), and provides the encrypted data to a cellular phone company serving as a distribution carrier 20 to distribute information.

Distribution carrier 20 relays through its own cellular telephone network a distribution request from each user to content server 10. In response to the distribution request, content server 10 further encrypts the requested content data, and distributes the encrypted data to each user's cellular phone through the cellular telephone network of distribution carrier 20.

FIG. 1 shows a configuration in which a cellular phone 100 of a cellular phone user 1, for example, receives encrypted content data through cellular phone 100 to decrypt the encryption conducted for transmission, and store the decrypted data in a detachable memory card 110 for provision to a music reproduction unit (not shown) in cellular phone 100.

User 1, for example, can listen to music which is reproduced from such content data via a headphone 130 or the like connected to cellular phone 100.

This content server 10 and distribution carrier 20 are together referred to as music server 30 hereinafter.

The process of transmitting content data from music server 30 to each portable telephone terminal is referred to as "distribution".

By such a configuration, any user who has not purchased a memory card 110 which is a proper memory card cannot easily receive and reproduce distribution data from music server 30.

By counting the number of times of distributing content data of, for example, one song at distribution carrier 20, and collecting the copyright fee incurred every time a user receives (downloads) content data in the form of telephone bills for respective cellular phones, the copyright fee of the copyright owner can be ensured.

Furthermore, since such content data distribution is conducted through a cellular phone network which is a closed system, there is the advantage that measures to protect copyrights can be taken more easily than compared to an open system such as the Internet.

Here, a user 2 possessing a memory card 112, for example, can directly receive distribution of content data from music server 30 through his/her own cellular phone 102. However, direct reception of content data or the like from music server 30 is relatively time consuming for user 2 since the content data includes a large amount of information. In such a case, it will be convenient for the user if content data can be copied from user 1 that has already received distribution of that content data.

However, from the standpoint of protecting the rights of copyright owners, unscrupulous copying of content data is not allowed on the basis of system configuration.

In the example of FIG. 1, the operation of letting user 2 copy the content data received by user 1 as well as the information required to render that content data reproducible is called "transfer" of content data. Here, since user 2 is to copy the entire information required for reproduction (reproduction information), reproduction of content data at user 1 must be disabled after the information is transferred. Thus, content data is to be distributed in the form of encrypted content data that is encrypted according to a predetermined encryption scheme. "Reproduction data" implies a license key that allows decryption of content data encrypted according to the aforementioned predetermined encryption scheme, and license information such as license ID data "License-ID" and user ID data "User-ID".

In contrast, letting user 2 copy only content data still in the encrypted state is referred to as "replicating" music information.

In this case, user 2 cannot reproduce the music by just obtaining the encrypted content data since reproduction information required to reproduce the content data is not copied to the terminal of user 2. Therefore, when user 2 wishes to reproduce this music, user 2 must receive distribution of reproduction information from music server 30 in order to render the content data reproducible. It is to be noted that user 2 needs to receive only the distribution of information required for reproduction in such a case. Therefore, user 2 can reproduce music in an extremely shorter telephone duration than the case where the entire distribution is received directly from music server 30.

For example, consider the case where cellular phones 100 and 102 are PHSs (Personal Handy Phone)®. Since the so-called transceiver mode conversation is available, one-time information transfer from user 1 to user 2, or transfer of only encrypted content data (replicate) is possible taking advantage of the transceiver mode conversation function.

In the structure shown in FIG. 1, the system to render the content data distributed in an encrypted manner reproducible at the user side requires: 1) the scheme to distribute an encryption key in communication, 2) the scheme itself to encrypt distribution data, and 3) a configuration realizing data protection to prevent unauthorized copying of the distributed data.

FIG. 2 is a diagram to describe the characteristics of the key data used for communication in the information distribution system shown in FIG. 1.

According to the structure shown in FIG. 1, the key to control data processing in memory card 100 includes a private decryption key Kmedia common held by all memory cards, and unique to the memory card medium type, a public encryption key KPcard(n) unique to each memory card, and a private decryption key Kcard(n) to decrypt data encrypted by public encryption key KPcard(n).

Here, the natural number n in the parenthesis of private decryption key Kcard(n) and private decryption key KPcard (n) represent the number to identify each user (memory card).

In other words, the data encrypted by public encryption key KPcard(n) can be decrypted using private decryption key Kcard(n) corresponding to each memory card. Therefore, in transferring distribution data between memory cards, basically the three keys Kmedia, Kcard(n), and KPcard(n) are used, as will be described afterwards.

Furthermore, the secret key to maintain secrecy in data transfer with an external source of the memory card and between memory cards includes a public encryption key KPmedia unique to each medium, i.e. common to all memory cards, a private decryption key Kmedia to decrypt data encrypted with public encryption key KPmedia, and a secret symmetric key Ks generated for each communication, for example, for each user access to music server 30.

Regarding secret symmetric key Ks, a structure may be implemented so that the same secret symmetric key is used for every one access to music server 30 by a user. The same secret symmetric key can be used for an unlimited number of songs of the music information as long as the one access is maintained. Alternatively, a structure may be implemented in which the secret symmetric key is changed, for example, for each song and distributed to the user each time.

In the following, this unit of communication, or unit of one access is called "session", and secret symmetric key Ks is also referred to as a "session key".

Therefore, secret symmetric key Ks has a value unique to each communication session, and is administrated at the distribution server and cellular phone.

The data to be distributed includes a license key Kc which is the key to decrypt encrypted content data. Encrypted content data is decrypted by this license key Kc. Further included are license ID data License-ID including information such as an administration code to identify the relevant content data and the limited number of times of reproduction, and user ID data User-ID to identify the receiver. Here, the telephone number or the like of the user, for example, can be used as user ID data User-ID.

By such a structure, control can be provided as to copyright protection at the copyright owner side based on information included in license ID data License-ID while protecting the user's individual information such as inhibiting a third party from obtaining the access history or the like of a user by employing user ID data User-ID.

Content data Dc in distribution data is, for example, music data as mentioned before. Content data that can be decrypted using license key Kc is referred to as encrypted content data[Dc]Kc.

Here, the expression [Y]X implies that data Y is the information converted into encryption that can be decrypted by a key X.

Figure 3:
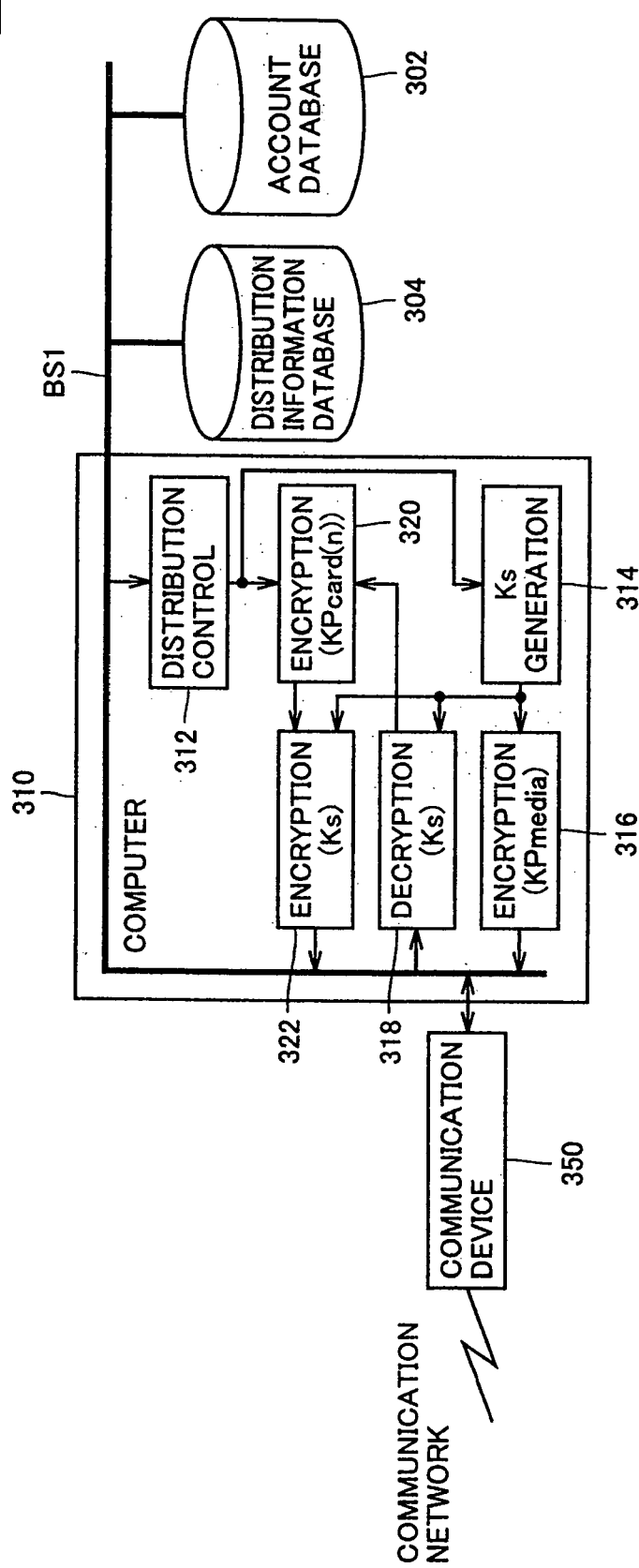
FIG. 3 is a schematic block diagram of a structure of a content server of FIG. 1.

FIG. 3 is a schematic block diagram of a structure of content server 10 of FIG. 1. Content server 10 includes a distribution information database 304 to store content data (music data) encrypted according to a predetermined scheme as well as distribution data such as license ID data License-ID, an account database 302 to store accounting information according to the number of accesses to content data for each user, a data processing unit 310 receiving data through a data bus BS1 from distribution information database 304 and account database 302 to apply a predetermined encryption process, and a communication device 350 to transfer data between distribution carrier 20 and data processing unit 310 through a communication network.

Data processing unit 310 includes a distribution control unit 312 to control the operation of data processing unit 310 according to data on data bus BS1, a session key generation unit 314 to generate a session key Ks under control of distribution control unit 312, an encryption processing unit 316 encrypting session key Ks generated by session key generation unit 314 using public encryption key KPmedia and providing the encrypted session key Ks to data bus BS1, a decryption processing unit 318 receiving through communication device 350 and data bus BS1 transmitted data that is encrypted by session key Ks in the cellular telephone of the each user to apply a decryption process, an encryption processing unit 320 under control of distribution control unit 312 to encrypt data such as the license key and license ID data License-ID using public encryption key KPcard(n) extracted from decryption processing unit 318, and an encryption processing unit 322 further encrypting the output of encryption processing unit 320 using session key Ks and providing the encrypted result to communication device 350 through data bus BS1.

Figure 4:
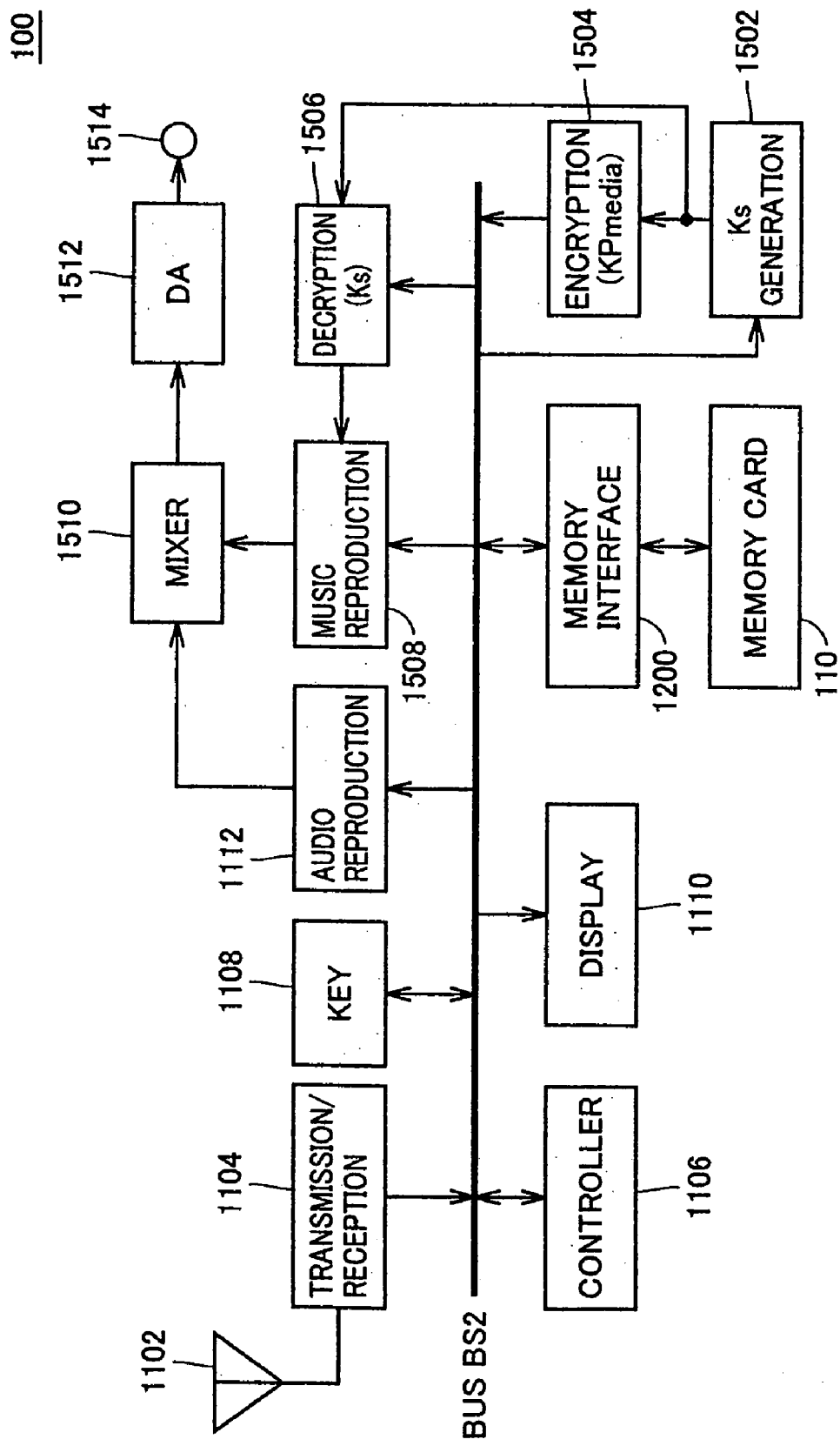
FIG. 4 is a schematic block diagram to describe a structure of a cellular phone 100 shown in FIG. 1.

FIG. 4 is a schematic block diagram to describe a structure of cellular phone 100 of FIG. 1.

Cellular phone 100 includes an antenna 1102 to receive signals transmitted through radio by a cellular phone network, a transmitter/receiver unit 1104 converting received signals from antenna 1102 into base band signals, or modulating and providing to antenna 1102 data from a cellular phone, a data bus BS2 to transfer data among the components in cellular phone 100, a controller 1106 to control the operation of cellular phone 100 through data bus BS2, a touch key unit 1108 to apply a command from an external source to cellular phone 100, a display 1110 to provide information output from controller 1106 and the like as visual information, and an audio reproduction unit 1112 to reproduce speech based on reception data applied through data bus BS2 in a general conversation mode.

Cellular phone 100 further includes a detachable memory card 110 to apply a decryption process on content data from content server 10, a memory interface 1200 to control data transfer between memory card 110 and data bus BS2, a session key generation unit 1502 generating by a random number or the like a session key Ks to encrypt data transferred on data bus BS2 in transferring data between memory card 110 and another component in the cellular phone, an encryption processing unit 1504 encrypting the session key generated by session key generation unit 1502 using public encryption key KPmedia and applying the encrypted session key to data bus BS2, a decryption processing unit 1506 decrypting and providing the data on data bus BS2 using session key Ks based on session key Ks generated by session key generation unit 1502, a music reproduction unit 1508 receiving the output from decryption processing unit 1506 to reproduce music signals, a mixer unit 1510 receiving the output from music reproduction unit 1508 and the output from audio reproduction unit 1112 to selectively provide an output according to the operation mode, a digital-analog conversion unit 1512 receiving and converting the output from mixer unit 1510 into analog signals to be output to an external source, and a connection terminal 1514 for connection with headphone 120, receiving the output from digital-analog conversion unit 1512.

For the sake of simplification, only the blocks related to content data distribution of the present invention are illustrated, and some of the blocks related to the conversation function inherent to a cellular phone are omitted.

Figure 5:
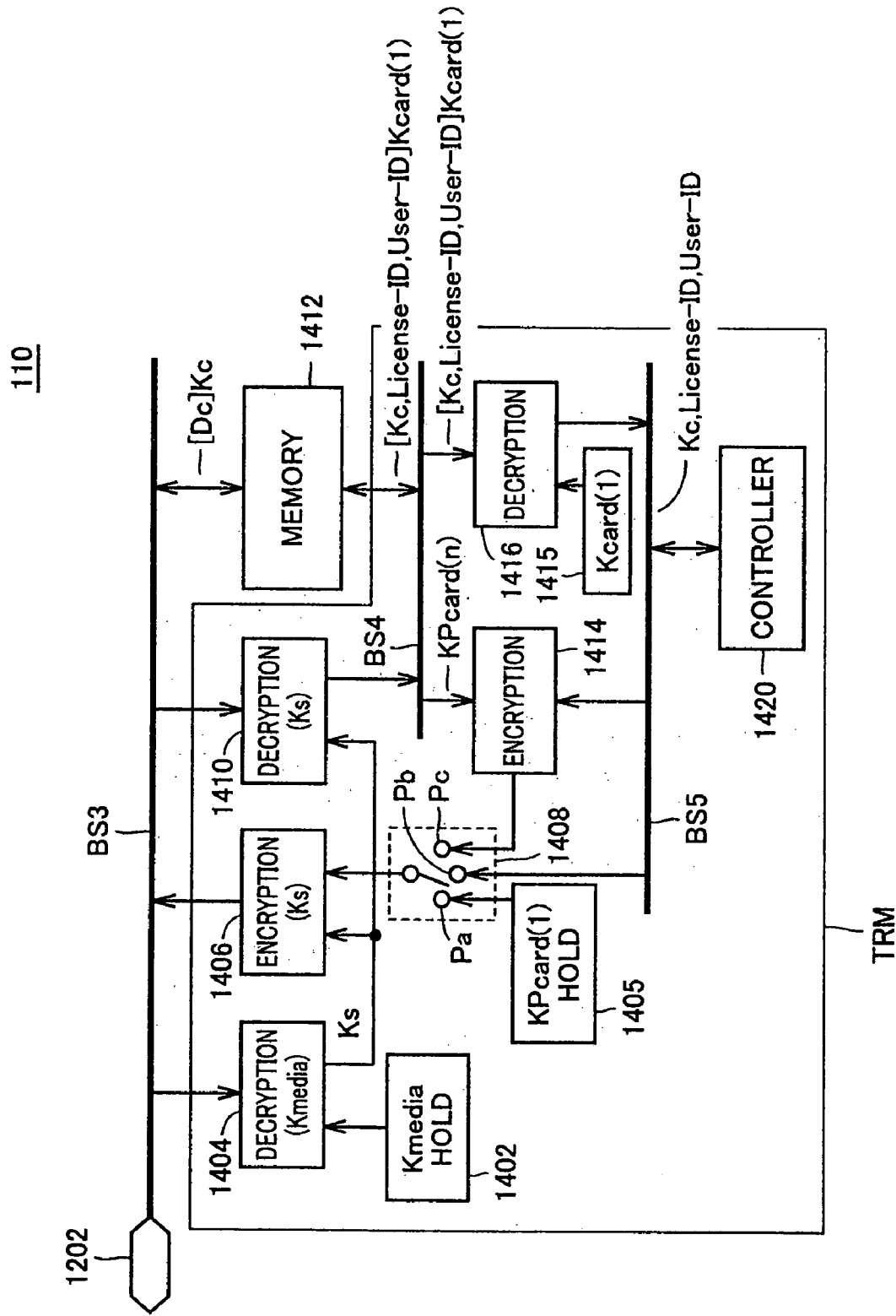
FIG. 5 is a schematic block diagram to describe a structure of a memory card 110 of FIG. 4.

FIG. 5 is a schematic block diagram to describe a structure of memory card 110 of FIG. 4.

Memory card 110 includes a data bus BS3 to send/receive a signal to/from memory interface 1200 via a terminal 1202, a Kmedia hold unit 1402 to store private decryption key Kmedia, a decryption processing unit 1404 extracting a session key Ks by applying a decryption process on the data applied to data bus BS3 from memory interface 1200 using secret encryption key Kmedia, a KPcard(1) hold unit 1405 to store public encryption key KPcard(1), an encryption processing unit 1406 encrypting and applying to data bus BS3 the output from a switch 1408 based on session key Ks extracted by decryption processing unit 1404, a decryption processing unit 1410 to apply a decryption process on the data on data bus BS3 using session key Ks extracted by decryption processing unit 1404 and applying the decrypted data to data bus BS4, and a memory 1412 storing license key Kc encrypted with public encryption key KPcard(n) differing from each memory card from data bus BS4, as well as data such as license ID data License-ID and user ID data User-ID, and receiving encrypted content data [Dc]Kc, encrypted with license key Kc from data bus BS3 for storage.

Switch 1408 includes contacts Pa, Pb and Pc. Encryption key KPcard(1) from KPcard(1) hold unit 1405, the output of data bus BS5, and the output from encryption processing unit 1414 are applied to contacts Pa, Pb and Pc, respectively. Switch 1408 selectively provides the signal applied to respectively contacts Pa, Pb and Pc to encryption processing unit 1406 depending upon whether the operation mode is "distribution mode", "reproduction mode" or "transfer mode".

Memory card 110 further includes a Kcard(1) hold unit 1415 to store the value of private decryption key Kcard(1), a decryption processing unit 1416 applying a decryption process on license key Kc, license ID data License-ID, user ID data User-ID and the like ([Kc, License-ID, User-ID] Kcard(1)) encrypted with public encryption key KPcard(1) and read out from memory 1412, and applying the decrypted data to data bus BS5, an encryption processing unit 1414 receiving from decryption processing unit 1410 a public encryption key KPcard(n) of the memory card of the other party in a data transfer process or the like to encrypt license key Kc, license ID data License-ID, user ID data User-ID and the like output on data bus BS5 based on the received public encryption key KPcard(n) of the other party, and providing the encrypted data to switch 1408, and a controller 1420 receiving license data ID data License-ID, user ID data User-ID and the like on data bus BS5 to control the operation of memory card 110.

It is to be noted that the region enclosed by the solid line in FIG. 5 is incorporated in a module TRM to disable read out by a third party of data and the like in the circuitry residing in this region by erasing internal data or destroying internal circuitry at an attempt of an improper opening process or the like by an external source.

This module is generally referred to as tamper resistance module.

A structure may be implemented wherein memory 1412 is also incorporated in module TRM. However, since the data stored in memory 1412 is completely encrypted according to the structure shown in FIG. 5, a third party will not be able to reproduce the music with just the data in memory 1412. It is not necessary to provide memory 1412 in the expensive tamper resistance module. Thus, the structure of FIG. 5 provides the advantage that the fabrication cost is reduced.

Figure 6:
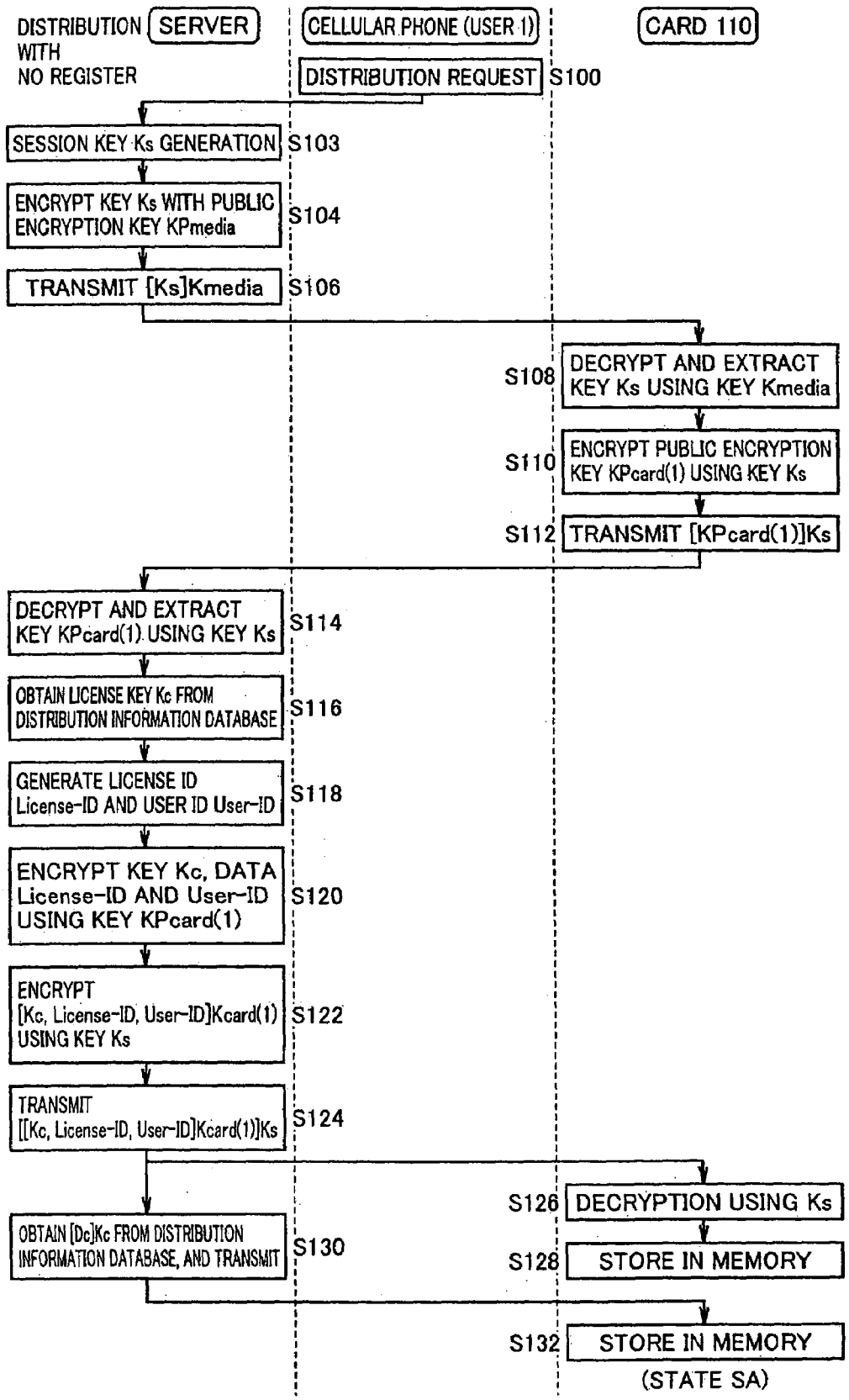
FIG. 6 is a flow chart to describe the distribution mode in the data distribution system of FIG. 1 and FIGS. 3–5.

FIG. 6 is a flow chart to describe the distribution mode in the data distribution system described in FIG. 1 and FIGS. 3–5.

FIG. 6 corresponds to the operation of user 1 receiving distribution of content data from content server 10 using memory card 110.

First, a distribution request is issued towards content server 10 from cellular phone 100 of user 1 through the user's operation of the key button (step S100).

In response to this distribution request, session key generation unit 314 generates a session key Ks at content server 10 (step S103).

Then, encryption processing unit 316 in content server 10 encrypts session key Ks with public encryption key KPmedia, and applies the encrypted session key Ks onto data bus BS1 (step S104).

Communication device 350 transmits encryption session key [Ks]Kmedia from encryption processing unit 316 towards memory card 110 of cellular phone 100 through the communication network (step S106).

At memory card 110, decryption processing unit 1404 decrypts the reception data from data bus BS3 through memory interface 1200 using private decryption key Kmedia from Kmedia hold unit 1402, whereby session key Ks is decrypted and extracted (step S108).

Since switch 1408 is selected in the state where contact Pa is closed in a distribution mode, encryption processing unit 1406 encrypts public encryption key KPcard(1) applied from KPcard(1) hold unit 1405 through contact Pa (the public encryption key of the memory card of user 1) with session key Ks, and provides the encrypted key to data bus BS3 (step S110).

Cellular phone 100 outputs data [KPcard(1)]Ks encrypted by encryption processing unit 1406 towards content server 10 (step S112).

At content server 10, decryption processing unit 318 decrypts data [KPcard(1)]Ks applied onto data bus BS1, received via communication device 350, using session key Ks, whereby public encryption key KPcard(1) is decrypted and extracted (step S114).

Then, distribution control unit 312 fetches license key Kc from distribution information database 304 (step S116), and generates license information such as license ID data License-ID and user ID data User-ID based on the data stored in distribution information database 304 (step S118).

Encryption processing unit 320 receives license key Kc, license ID data License-ID and user ID data User-ID from distribution control unit 312 to apply encryption using public encryption key KPcard(1) from decryption processing unit 318 (step S120).

Encryption processing unit 322 receives the data encrypted by encryption processing unit 320, and further encrypts the received data using session key Ks. The further encrypted data is applied onto data bus BS1 (step S122).

Communication device 350 transmits to card 110 the data encrypted by encryption processing unit 322 [[Kc, License-ID, User-ID]Kcard(1)]Ks.

At memory card 110, decryption processing unit 1410 applies a decryption process using session key Ks to extract data [Kc, License-ID, User-ID]Kcard(1) (step S126), and stores the extracted data in memory 1412 (step S128).

Content server 10 fetches encrypted content data [Dc]Kc from distribution information database 304, and transmits the obtained data to memory card 110 via communication device 350 (step S130).

At memory card 110, the received data [Dc]Kc is directly stored in memory 1412 (step S132).

By the above-described operation, the content data stored in memory card 110 attains a reproducible state. In the following, the status of content data stored in memory card attaining a reproducible state is referred to as "memory card 110 is in a state SA".

Figure 7:
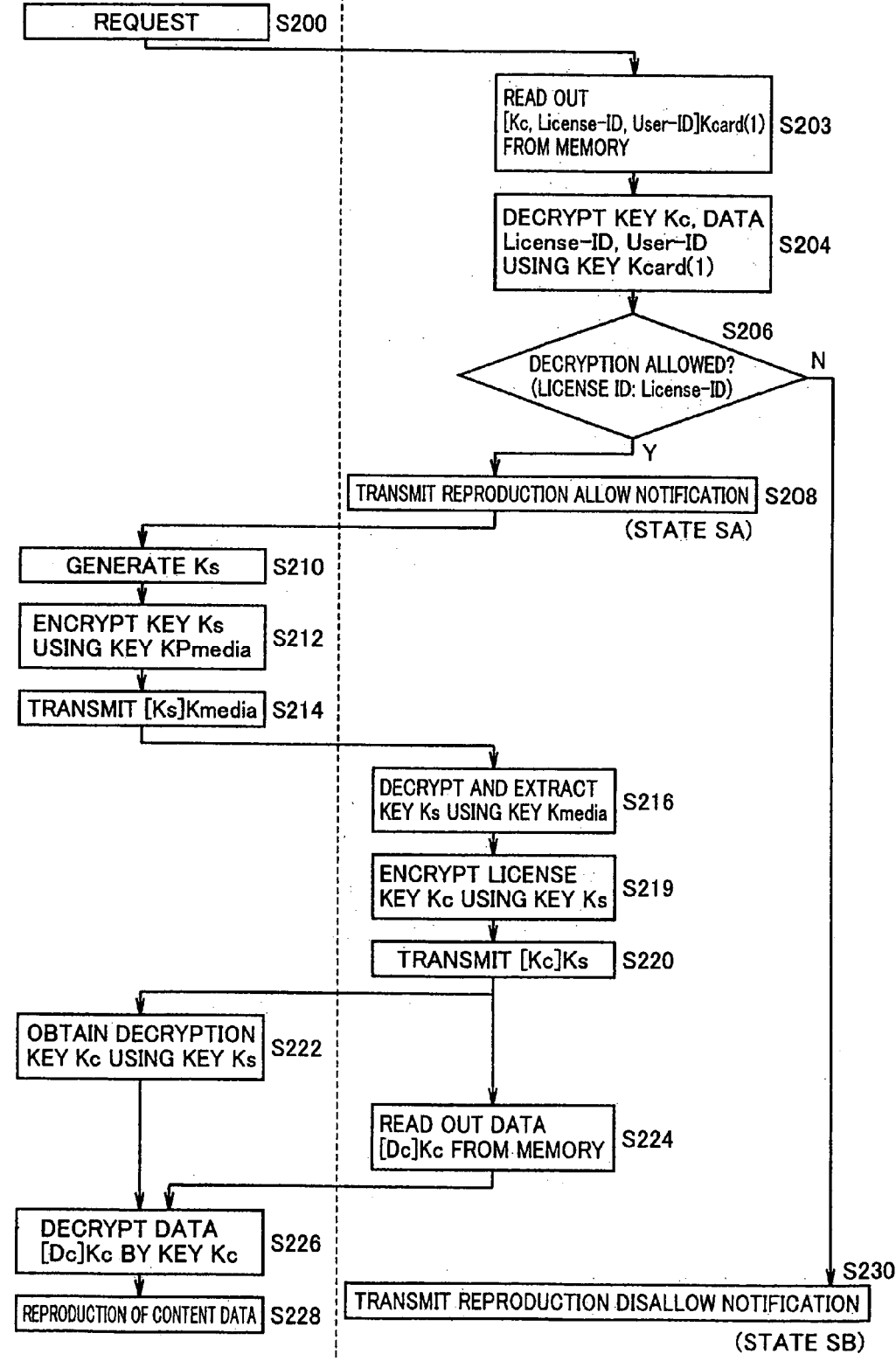
FIG. 7 is a flow chart describing the reproduction mode to decrypt encrypted content data and providing the same as music data output according to a first embodiment.

FIG. 7 is a flow chart to describe the process of decrypting content data from the encrypted content data stored in memory card 110, and reproducing the data as music to an external source.

Referring to FIG. 7, a reproduction request is issued towards memory card 110 by designation from user 1 through touch key 1108 or the like of cellular phone 100 (step S200).

At memory card 110, the encrypted license key Kc, license ID data License-ID, user ID data User-ID and the like are read out from memory 1420 (step S203). Using private decryption key Kcard(1), license key Kc, license ID data License-ID, and user ID data User-ID are decrypted (step S204).

Controller 1420 determines whether the request is directed to data that can be decrypted based on information included in the decrypted license ID data License-ID and the like (step S206). When determination is made that the data can be decrypted, a reproduction allow notification is transmitted towards controller 1106 of the cellular phone (step S208).

At cellular phone 100, session key generation circuit 1502 generates a session key Ks (step S210). Encryption processing unit 1504 encrypts session key Ks with public encryption key KPmedia (step S212). Encryption session key [Ks]Kmedia is output onto data bus BS2 (step S214).

Memory card 110 receives the encryption session key generated from cellular phone 100 through data bus BS2, and decrypts and extracts the session key using private decryption key Kmedia (step S216).

Then, memory card 110 encrypts license key Kc with the extracted session key Ks (step S219), and applies the encrypted license key [Kc]Ks to data bus BS2 (step S220).

Decryption processing unit 1506 of cellular phone 100 applies a decryption process using session key Ks to obtain license key Kc (step S222).

Then, memory card 110 reads out encrypted content data [Dc]Kc from memory 1412, and applies the read out data to data bus BS2 (step S224).

Music reproduction unit 1508 of cellular phone 100 decrypts encrypted content data [Dc]Kc using the extracted license key Kc (step S226), and reproduces the content data, which is applied to mixer unit 1510 (step S228).

When determination is made that the decryption process is disallowed by controller 1420 at step S206, memory card 110 transmits a reproduction disallow notification towards cellular phone 100 (step S230).

Since content data cannot be reproduced at the state of step S230, the expression of "memory card 110 is in state SB" will be used hereinafter for such a state.

Figure 8:
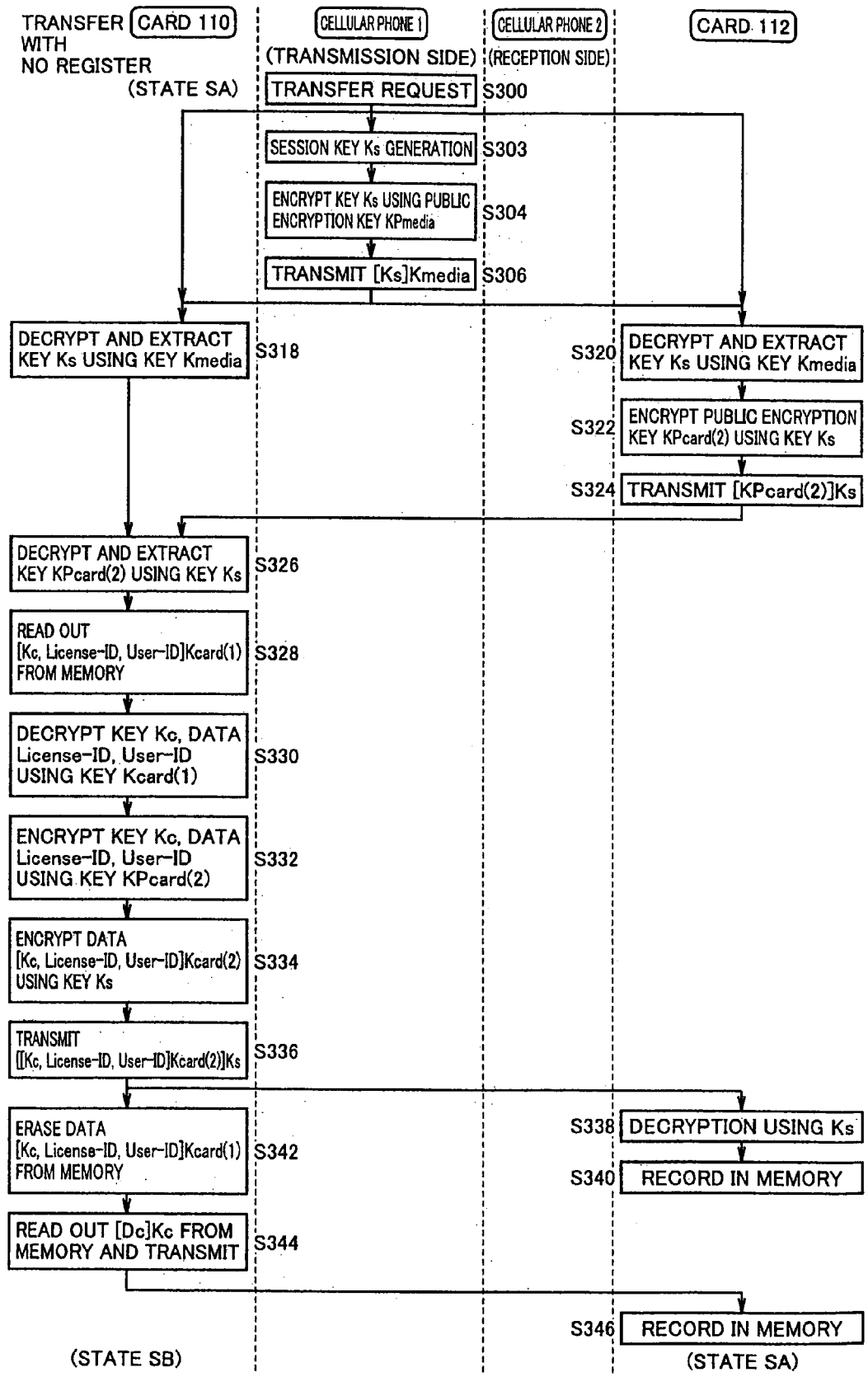
FIG. 8 is a flow chart to describe the mode of transferring content data and key data between two memory cards.

FIG. 8 is a flow chart to describe the process of transferring content data and reproduction data between two memory cards.

It is assumed that cellular phone 100 corresponds to the transmission side whereas cellular phone 102 corresponds to the reception side.

Cellular phone 100 issues a transfer request to its own memory card 110 and to memory card 112 in cellular phone 102 of the reception side (step S300).

At cellular phone 100, session key generation circuit 1502 generates a session key Ks (step S303). Using public encryption key KPmedia, encryption processing unit 1504 encrypts session key Ks (step S304). The encrypted session key [Ks]Kmedia is transmitted to memory card 110 via data bus BS2, and also to memory card 112 in cellular phone 102 via antenna 1102, for example, in a transceiver mode (step S306).

At memory card 110, a session key Ks is decrypted and extracted using private decryption key Kmedia (step S318).

Similarly at card 112, session key Ks is decrypted and extracted using private decryption key Kmedia (step S320). Then, public encryption key KPcard(2) of memory card 112 is encrypted with session key Ks (step S322). The encrypted data [KPcard(2)]Ks is transmitted to memory card 110 (step S324).

At memory card 110, the encrypted data transmitted from memory card 112 is decrypted with session key Ks, whereby public encryption key KPcard(2) of memory card 112 is decrypted and extracted (step S326).

At memory card 110, license key Kc, license ID data License-ID and user ID data User-ID encrypted with public encryption key Kcard(1) of memory card 110 are read out from memory 1412 (step S328).

Then, decryption processing unit 1416 decrypts license key Kc, license ID data License-ID and user ID data User-ID using private decryption key Kcard(1) (step S330).

Encryption processing unit 1414 encrypts license key Kc, license ID data License-ID and user ID data User-ID using public encryption key KPcard(2) of card 112 extracted by decryption processing unit 1410 (step S332).

The data encrypted by encryption processing unit 1414 is applied to encryption processing unit 1406 via switch 1408 (contact Pc closed). Encryption processing unit 1406 encrypts data [Kc, License-ID, User-ID]Kcard(2) using session key Ks (step S334).

Then, memory card 110 transmits the decrypted data [Kc, License-ID, User-ID]Kcard(2) to memory card 112 via cellular phone 100 (step S336).

At memory card 112, the data transmitted from memory card 110 is decrypted based on session key Ks by decryption processing unit 1410 (step S338). The decrypted data is stored in memory 1412 (step S340).

At the transmission side, memory card 110 erases data corresponding to license key Kc, license ID data License-ID and user ID data User-ID from the data in memory 1412 (step S342).

Then, memory card 110 reads out encrypted content data [Dc]Kc from the memory, and transmits the read out data to memory card 112 (step S344).

Memory card 112 stores the received encrypted content data directly into memory 1412 (step S346).

By the above-described process, license key Kc, license ID data License-ID and user ID data User-ID are erased from memory card 110 at step S342. Therefore, memory card 110 is at "state SB".

At the reception side, memory card 112 is in "state SA" since all the data in addition to encrypted content data such as the license key, license ID data License-ID and user ID data User-ID are transferred.

Figure 9:
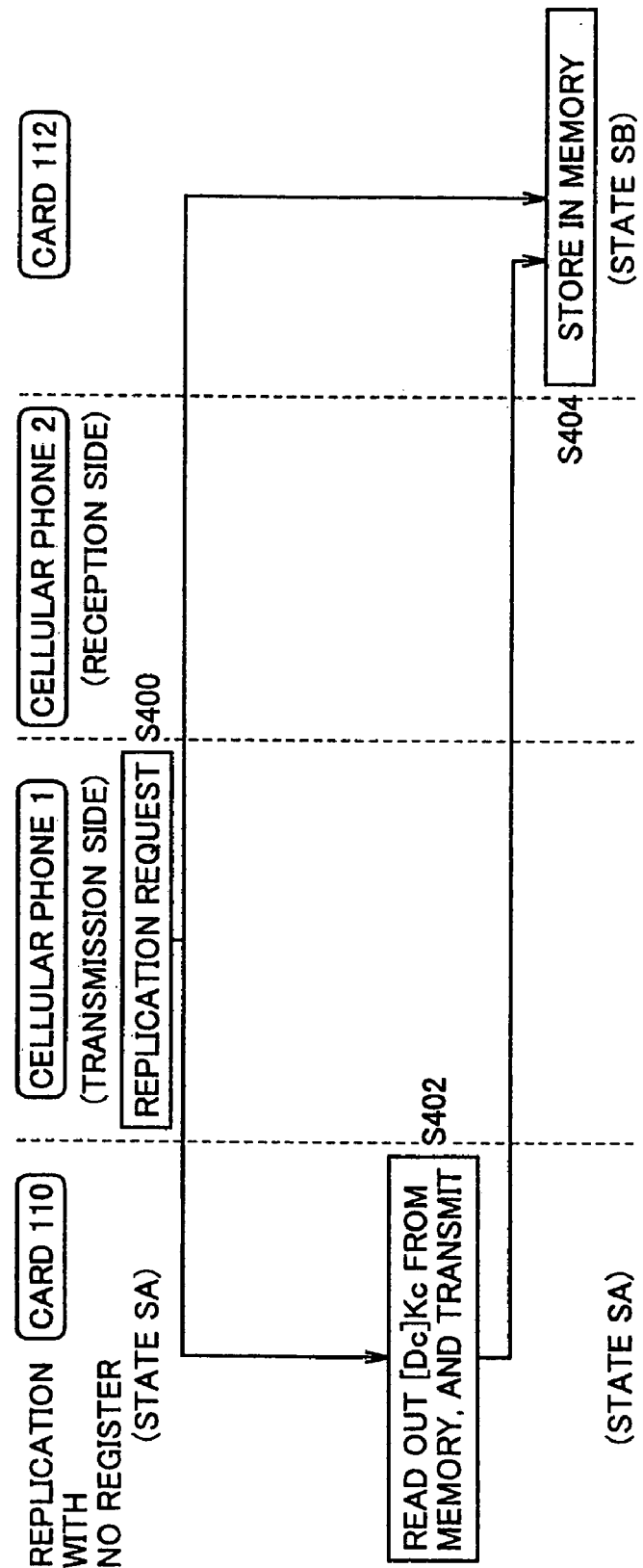
FIG. 9 is a flow chart to describe the mode of replicating encrypted content data.

FIG. 9 is a flow chart to describe the process of replicating encrypted content data from cellular phone 100 to cellular phone 102 in the information distribution system of FIG. 1.

Referring to FIG. 9, cellular phone 100 outputs a replicate request towards memory card 110 and memory card 112 (step S400).

Memory card 110 reads out encrypted content data [Dc] Kc from memory 1412, and provides the read out data to memory card 112 (step S402).

At memory card 112, the encrypted content data transmitted from memory card-110 is directly stored in memory 1412 (step S404).

By the above operation, the entire data such as encrypted content data, license key Kc, user ID data User-ID, and license ID data License-ID remain in memory card 110. Therefore, memory card 110 is in a reproducible state, i.e., "state SA".

In contrast, memory card 112 cannot conduct a reproduction process since only the encrypted content data is stored. Therefore, memory card 112 is in "state SB" at the current stage.

In order to set memory card 112 to state SA, reproduction information such as license key Kc, license ID data License-ID and user ID data User-ID must be obtained from content server 10.

By the above-described configuration, only the proper user with a memory card can receive and store content data (music data) in the memory. Once data is stored in the memory card, the copy operation of the data to another in a reproducible state for that another user will disable data reproduction at the transmission source side. This prevents the copyright owner from incurring improper disbenefit due to unlimited copying.

The present embodiment is described in which the circuitry to decrypt encrypted data from content server 10 is incorporated in a detachable memory card of a cellular phone. Alternatively, the circuitry may be incorporated in the cellular phone. More generally, a structure in which the circuitry is incorporated in a memory card detachable to the terminal equipment that accesses the information server may be employed. Alternatively, a structure in which the circuitry is incorporated in the terminal equipment may be employed.

Second Embodiment

Figure 10:
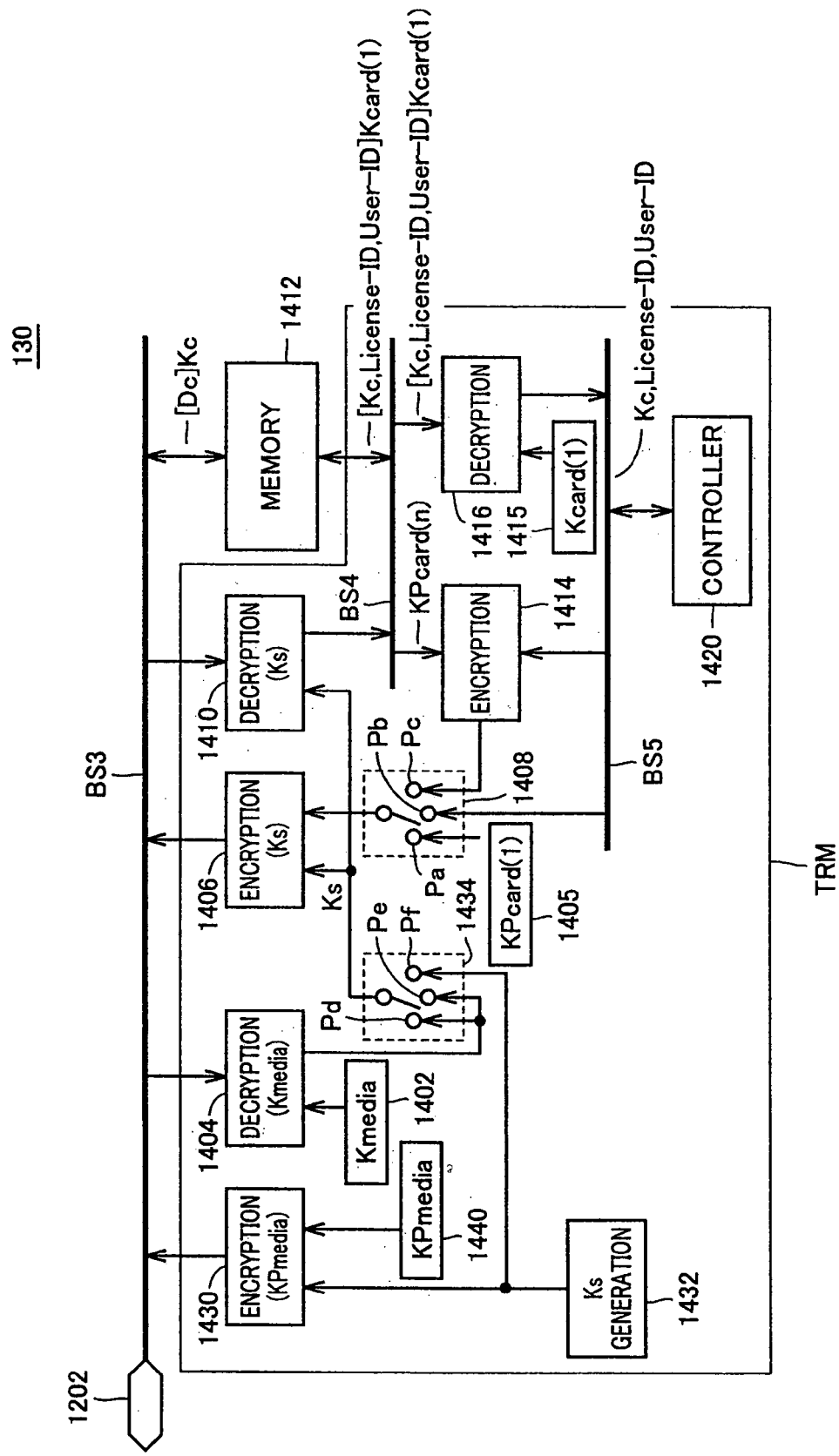
FIG. 10 is a schematic block diagram to describe the structure of a memory card 130 according to a second embodiment of the present invention.

FIG. 10 is a schematic block diagram to describe a structure of memory card 130 according to a second embodiment of the present invention, and is comparable to FIG. 5 of the first embodiment.

One feature differing in structure from memory card 110 of the first embodiment is that a session key generation circuit 1432 to generate a session key Ks is provided in a memory card 130, and a KPmedia hold unit 1440 storing a value of public encryption key KPmedia corresponding to the medium type of a memory card is provided. Accordingly, memory card 130 includes an encryption processing unit 1430 to encrypt session key Ks generated by session key generation circuit 1432 with public encryption key KPmedia, and apply the encrypted key to data bus BS3, and a switch 1434 receiving the outputs from session key generation circuit 1432 and decryption processing unit 1404 to selectively provide the received output to encryption processing unit 1406 and decryption processing unit 1410.

Switch 1434 includes contacts Pd, Pe and Pf. The output of decryption processing unit 1404 is provided to contacts Pd and Pe. The output of session key generation circuit 1432 is provided to contact Pf. Switch 1434 selectively provides the signal applied to contacts Pd, Pe and Pf to encryption processing unit 1406 and decryption processing unit 1410 according to whether the operation mode is the "distribution mode", "reproduction mode" or "transfer mode".

The remaining structure is similar to that of memory card 110 of the first embodiment shown in FIG. 5. Corresponding components have the same reference characters allotted, and description thereof will not be repeated.

The operation of memory card 130 differs from the operation of memory card 110 in the "transfer" process.

Figure 11:
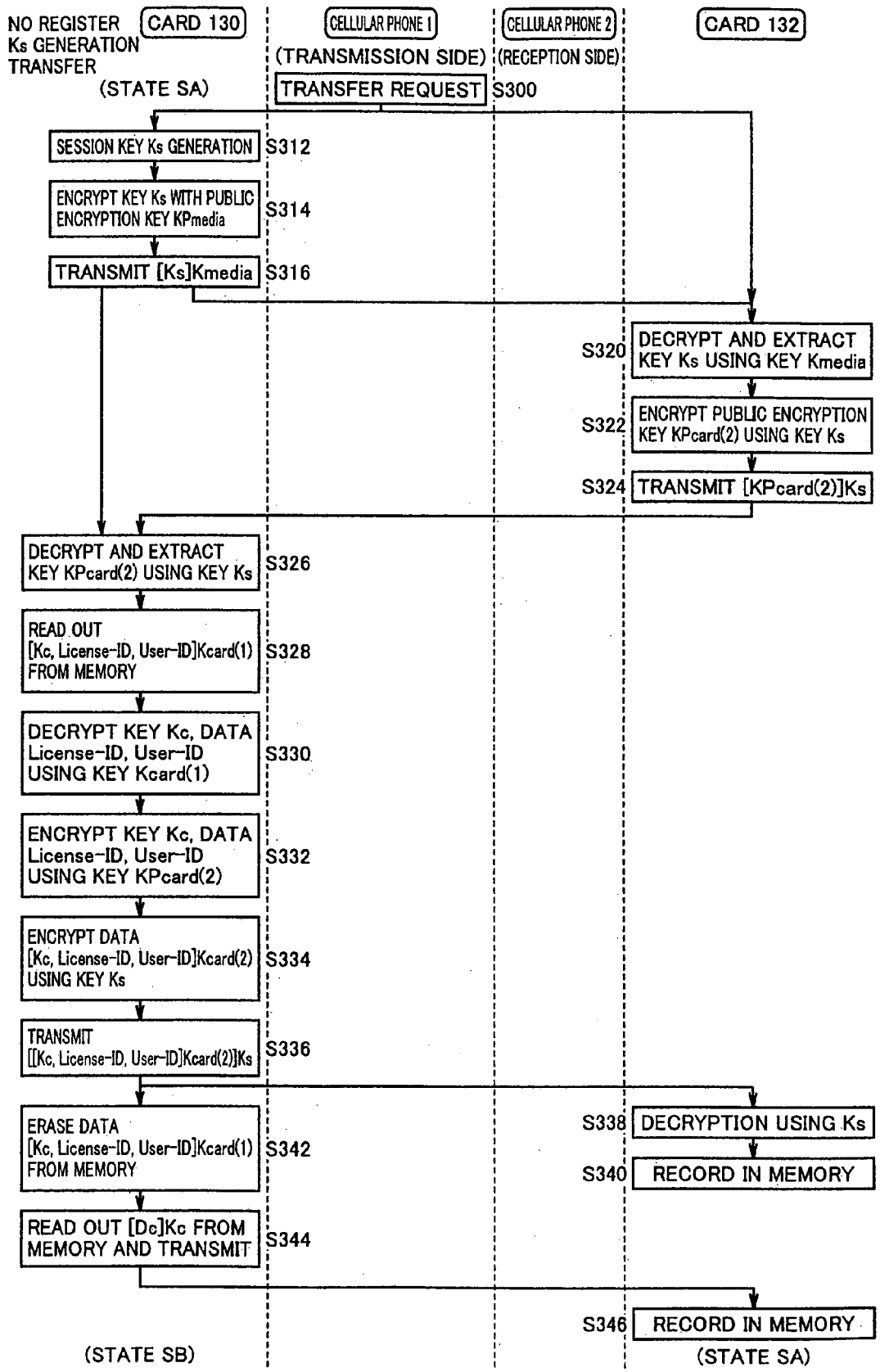
FIG. 11 is a flow chart to describe a transfer mode of memory card 130.

FIG. 11 is a flow chart to describe the transfer process of memory card 130, comparable to FIG. 8 of the first embodiment.

It is assumed that, in FIG. 11, cellular phone 100 corresponds to the transmission side whereas cellular phone 102 corresponds to the reception side. It is also assumed that a memory card 132 having a structure similar to that of memory card 130 is loaded in cellular phone 102.

Cellular phone 100 issues a transfer request to its own memory card 130 and to memory card 132 inserted in cellular phone 102 at the reception side (step S300).

At cellular phone 100, session key generation circuit 1432 in memory card 130 generates a session key Ks (step S312). Using public encryption key KPmedia, encryption processing unit 1430 encrypts session key Ks (step S314). The encrypted session key Ks is transmitted to card 132 via antenna 1102, for example, in a transceiver mode (step S316).

At memory card 132, decryption processing unit 1404 decrypts and extracts session key Ks using private decryption key Kmedia (step S320). Public encryption key KPcard (2) of memory card 132 is encrypted by session key Ks (step S322). The encrypted data [KPcard(2)]Ks is transmitted to memory card 110 (step S324).

At memory card 110, the encrypted data transmitted from memory card 112 is decrypted by session key Ks, whereby public encryption key KPcard(2) of memory card 112 is decrypted and extracted (step S326).

The subsequent process is basically similar to the transfer process of the first embodiment described with reference to FIG. 8. Therefore, description thereof will not be repeated.

By such a process, license key Kc, license ID data License-ID and user ID data User-ID are erased from card 130 at step S342. Therefore, memory card 130 is at "state SB".

In contrast, memory card 132 is in "state SA" since reproduction information such as license key Kc, license ID data License-ID, user ID data User-ID and the like are transferred as well as the encrypted content data.

By the above-described structure, data transfer from memory card 130 to memory card 132 can be carried out through an interface apparatus that can be connected between memory cards without having to use the cellular phone terminal with session key generation circuit 1502 described above. Therefore, the advantage of further improving the convenience for users can be expected in addition to the advantage previously described for the memory card of the first embodiment.

Third Embodiment

Figure 12:
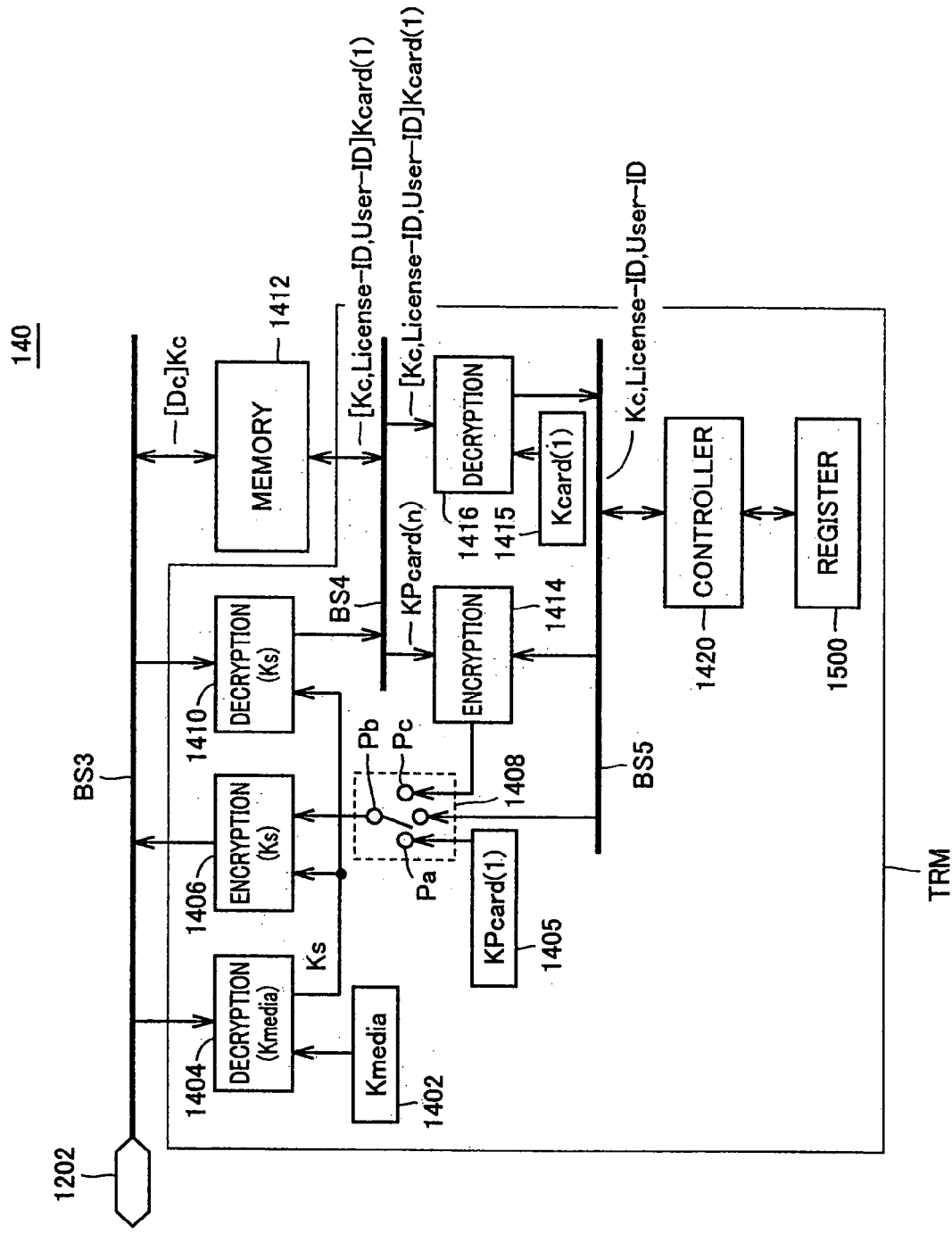
FIG. 12 is a schematic block diagram to describe a structure of a memory card 140 according to a third embodiment of the present invention.

FIG. 12 is a schematic block diagram to describe a structure of a memory card 140 according to a third embodiment of the present invention, and is comparable to FIG. 5 of the first embodiment.

The feature differing in structure from memory card 110 of the first embodiment is that a register 1500 that can send/receive data to/from controller 1420 is provided in memory card 140.

The remaining structure is similar to that of memory card 5 of the first embodiment shown in FIG. 5. Corresponding components have the same reference characters allotted, and description thereof will not be repeated.

FIG. 13 is a flow chart to describe the distribution mode using memory card 140 of FIG. 12.

FIG. 13 corresponds to the operation of user 1 receiving content data distribution from content server 10 using memory card 140.

First, a distribution request is issued to content server 10 from cellular phone 100 of user 1 through the user's operation of touch key 1108 (step S100).

In response to this distribution request, session key generation unit 314 at content server 10 generates a session key Ks (step S103).

Then, encryption processing unit 316 in content server 10 encrypts session key Ks using public encryption key KPmedia, and provides the encrypted key onto data bus BS1 (step S104).

Communication device 350 transmits encrypted content data [Ks]Kmedia from encryption processing unit 316 to memory card 140 of cellular phone 100 through the communication network (step S106).

At memory card 140, decryption processing unit 1404 decrypts the reception data applied onto data bus BS3 via memory interface 1200 using private decryption key Kmedia, whereby session key Ks is decrypted and extracted (step S108).

Since switch 1408 is selected with contact Pa closed in a distribution mode, encryption processing unit 1406 encrypts public encryption key KPcard(1) applied from contact Pa (public encryption key in the memory card of user 1) by session key Ks, and provides the encrypted key to data bus BS3.

Cellular phone 100 provides data [KPcard(1)]Ks encrypted by encryption processing unit 1406 to content server 10 (step S112).

At content server 10, decryption processing unit 318 decrypts data [KPcard(1)]Ks received by communication device 350 and applied onto data bus BS1, using session key Ks, whereby public encryption key KPcard(1) is decrypted and extracted (step S114).

Then, distribution control unit 312 fetches license key Kc from distribution information database 304 (step S116), and generates license ID data License-ID, user ID data User-ID, and the like based on the data stored in distribution information database 304 (step S118).

Encryption processing unit 320 receives the data such as license key Kc, license ID data License-ID and user ID data User-ID from distribution control unit 312 to apply an encryption process using public encryption key KPcard(1) applied from decryption processing unit 318 (step S120).

Encryption processing unit 322 receives the data encrypted by encryption processing unit 320 and further encrypts the same using session key Ks. The encrypted data is provided onto data bus BS1 (step S122).

Communication device 350 transmits data [[Kc, License-ID, User-ID]Kcard(1)]Ks encrypted by encryption processing unit 322 to card 140.

At memory card 140, decryption processing unit 1410 applies a decryption process using session key Ks to extract data [Kc, License-ID, User-ID]Kcard(1) (step S126). The extracted data is stored in memory 1412 (step S128).

At memory card 140, decryption processing unit 1416 decrypts the data [Kc, License-ID, User-ID]Kcard(1) stored in memory 1412. The decrypted data License-ID and User-ID are stored in register 1500 by controller 1420 (step S129).

Server 30 fetches encrypted content data [Dc]Kc from distribution information database 304 via communication device 350, and transmits the same to memory card 140 (step S130).

At memory card 140, the received encrypted content data [Dc]Kc is directly stored in memory 1412 (step S132).

By the above-described operation, memory card 140 attains a music information reproducible state.

Figure 14:
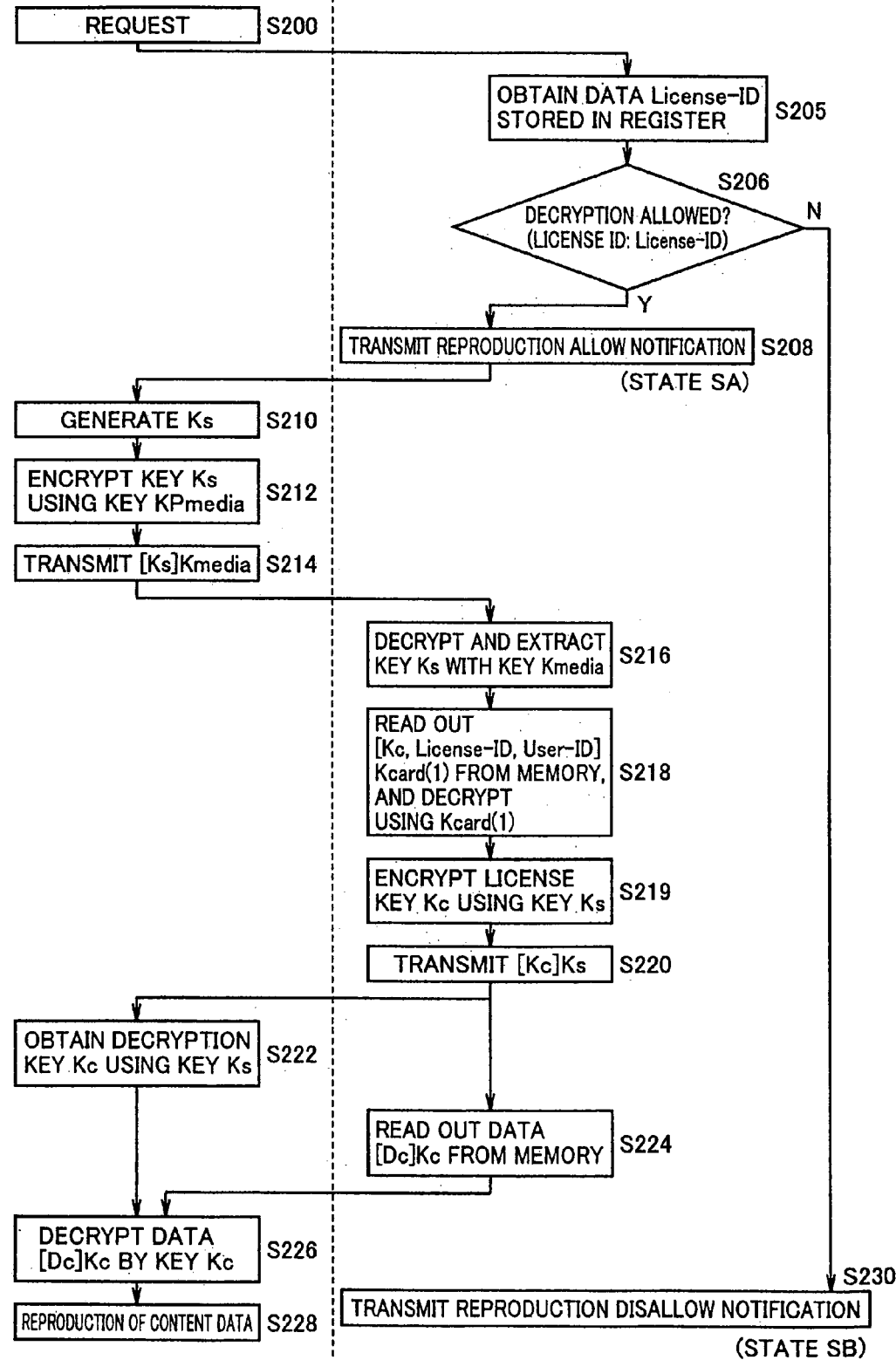
FIG. 14 is a flow chart describing a reproduction mode decrypting encrypted content data and providing the same as music data output according to the third embodiment.

FIG. 14 is a flow chart to describe the process of decrypting music information from the encrypted content data stored in memory card 140 and reproducing the same as music at cellular phone 100.

Referring to FIG. 14, a reproduction request is issued to memory card 140 by designation of user 1 through touch key 1108 of cellular phone 100 (step S200).

At memory card 140, license ID data License-ID, user ID data User-ID and the like are output from register 1500 by controller 1420 (step S205).

Controller 1420 determines whether the request is towards data that can be decrypted based on information included in the license ID data License-ID and the like (step S206). When determination is made that the data can be decrypted, a reproduction allow notification is transmitted towards controller 1106 of the cellular phone (step S208).

At cellular phone 100, session key generation circuit 1502 generates a session key Ks (step S210). Encryption processing unit 1504 encrypts session key Ks with public encryption key KPmedia (step S212). Encryption session key [Ks]Kmedia is output to data bus BS2 (step S214).

Memory card 140 receives the encryption session key [Ks]Kmedia generated from cellular phone 100 through data bus BS2, and decrypts and extracts session key Ks using private decryption key Kmedia (step S216).

Then, memory card 140 reads out encrypted data [Kc, License-ID, User-ID]Kcard(1) from memory 1412. The read out data is decrypted by decryption processing unit 1416 to extract license key Kc (step S218).

Then, license key Kc is encrypted with the extracted session key Ks (step S219). The encrypted license key [Kc]Ks is applied to data bus BS2 (step S220).

Decryption processing unit 1506 of cellular phone 100 applies a decryption process using session key Ks to obtain license key Kc (step S222).

Then, memory card 140 reads out encrypted content data [Dc]Kc from memory 1412, and applies the read out data to data bus BS2 (step S224).

Music reproduction unit 1508 of cellular phone 100 decrypts encrypted content data [Dc]Kc using the extracted license key Kc (step S226), and reproduces the content data, which is applied to mixer unit 1510 (step S228).

When determination is made that the decryption process is disallowed by controller 1420 at step S206, memory card 140 transmits a reproduction disallow notification towards cellular phone 100 (step S230).

At the stage of step S230, memory card 140 is in state SB.

Figure 15:
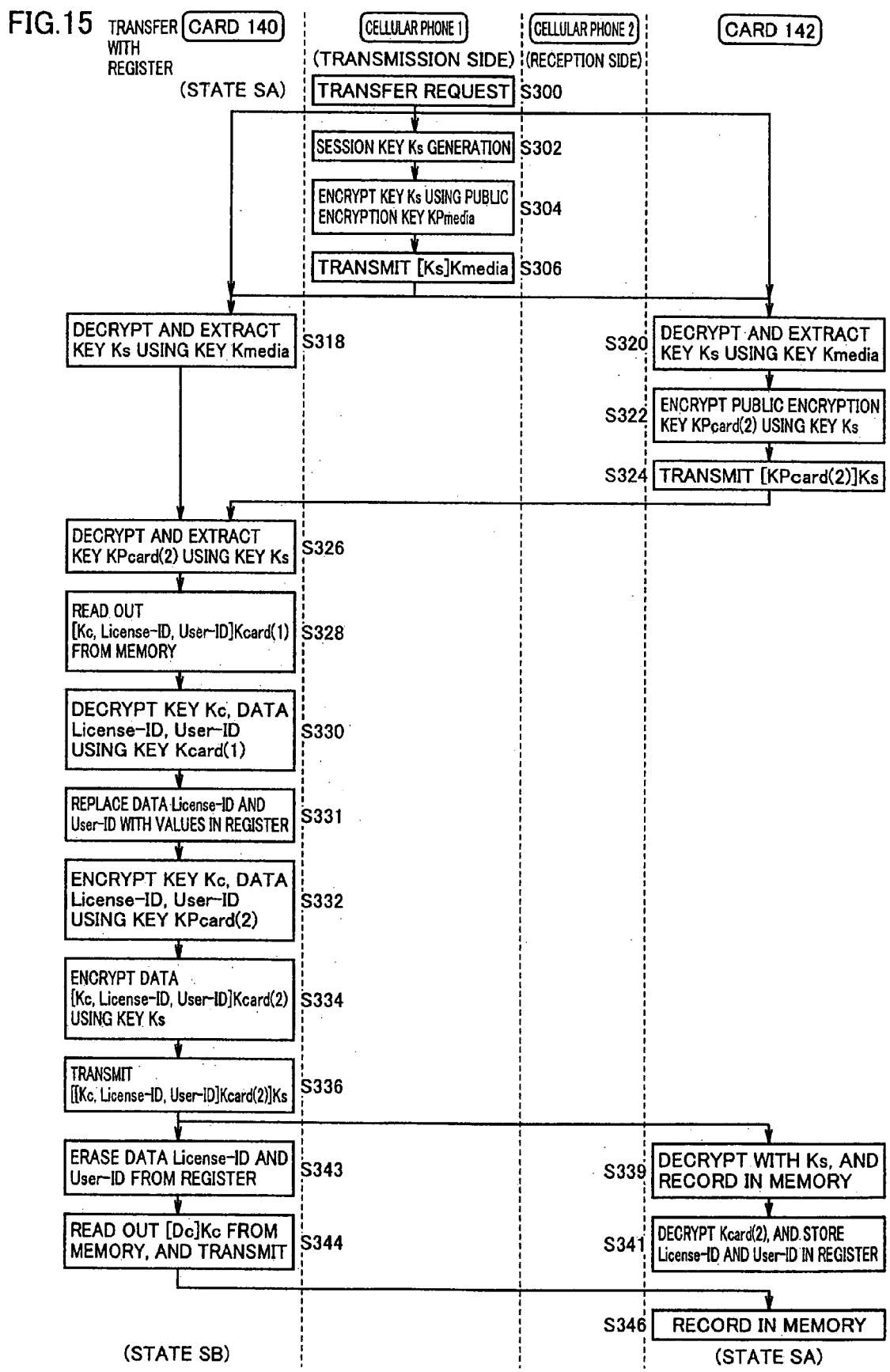
FIG. 15 is a flow chart to describe the process of transferring content data and key data between two memory cards.

FIG. 15 is a flow chart to describe the process of transferring content data and key data between two memory cards.

It is assumed that cellular phone 100 corresponds to the transmission side whereas cellular phone 102 corresponds to the reception side. It is also assumed that a memory card 142 having a structure similar to that of memory card 140 is inserted in cellular phone 102.

Cellular phone 100 issues a transfer request to its own memory card 140 and to memory card 142 in cellular phone 102 of the reception side (step S300).

At cellular phone 100, session key generation circuit 1502 generates a session key Ks (step S303). Using public encryption key KPmedia, encryption processing unit 1504 encrypts session key Ks (step S304). The encrypted session key [Ks]Kmedia is transmitted to memory card 140 via data bus BS2, and also to memory card 142 in cellular phone 102 via antenna 1102, for example, in a transceiver mode (step S306).

At memory card 140, a session key Ks is decrypted and extracted using private decryption key Kmedia (step S318).

Similarly at memory card 142, session key Ks is decrypted and extracted using private decryption key Kmedia (step S320). Then, public encryption key KPcard(2) of memory card 142 is encrypted with session key Ks (step S322). The encrypted data [KPcard(2)]Ks is transmitted to memory card 110 (step S324).

At memory card 110, the encrypted data transmitted from memory card 112 is decrypted with session key Ks, whereby public encryption key KPcard(2) of memory card 142 is decrypted and extracted (step S326).

At memory card 140, license key Kc, license ID data License-ID and user ID data User-ID encrypted with public encryption key Kcard(1) of memory card 140 are read out from memory 1412 (step S328).

Then, decryption processing unit 1416 decrypts license key Kc, license ID data License-ID and user ID data User-ID using private decryption key Kcard(1) (step S330).

Controller 1420 replaces the decrypted license key Kc, license ID data License-ID and user ID data User-ID with the data values in register 1500 (step S331).

Encryption processing unit 1414 encrypts license key Kc, license ID data License-ID and user ID data User-ID using public encryption key KPcard(2) of card 142 extracted by decryption processing unit 1410 (step S332).

The data encrypted by encryption processing unit 1414 is applied to encryption processing unit 1406 via switch 1408 (contact Pc closed). Encryption processing unit 1406 encrypts data [Kc, License-ID, User-ID]Kcard(2) using session key Ks (step S334).

Then, memory card 140 transmits the decrypted data [[Kc, License-ID, User-ID]Kcard(2)]Ks to memory card 142 via cellular phone 100 (step S336).

At memory card 142, decryption processing unit 1410 decrypts the data transmitted from memory card 140 based on session key Ks, and stores the decrypted data in memory 1412 (step S399). At memory card 142, decryption processing unit 1416 decrypts [Kc, License-ID, User-ID]Kcard(2) based on private decryption key Kcard(2), and stores the decrypted license ID data License-ID and user ID data User-ID in the register (step S341).

Memory card 140 deletes license ID data License-ID and user ID data User-ID from register 1500 (step S343).

Then, memory card 140 reads out encrypted content data [Dc]Kc from the memory, and transmits the read out data to memory card 142 (step S344).

Memory card 142 stores the received encrypted content data directly into memory 1412 (step S346).

By the above-described process, license ID data License-ID and user ID data User-ID are erased from memory card 140 at step S343. Therefore, memory card 140 is at "state SB".

At the reception side, memory card 142 is in "state SA" since all the data in addition to encrypted content data such as the license key, license ID data License-ID and user ID data User-ID are transferred.

Figure 16:
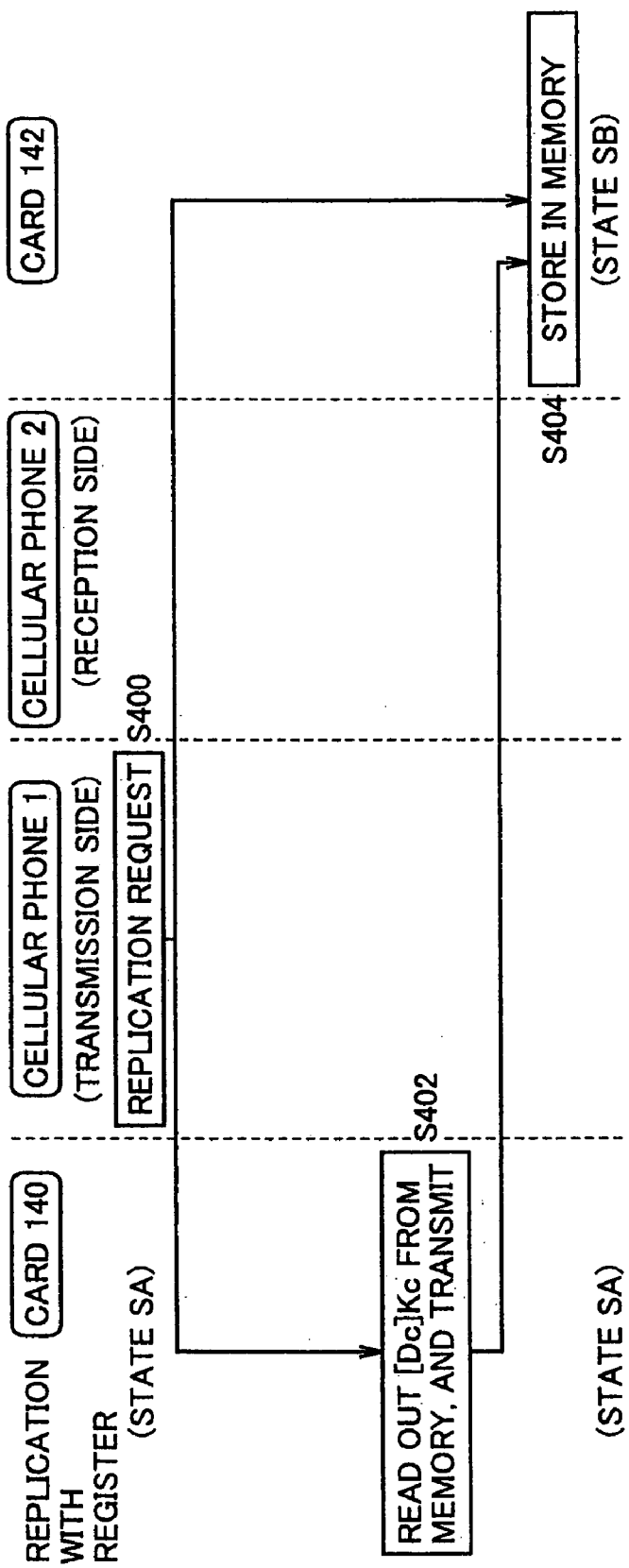
FIG. 16 is a flow chart to describe the mode of replicating encrypted content data.

FIG. 16 is a flow chart to describe the process of replicating encrypted content data from cellular phone 100 to cellular phone 102 in memory card 140 of FIG. 12.

Referring to FIG. 16, cellular phone 100 outputs a replicate request towards memory card 140 and memory card 142 (step S400).

Memory card 140 reads out encrypted content data [Dc]Kc from memory 1412, and provides the read out data to memory card 142 (step S402).

At memory card 142, the encrypted content data transmitted from memory card 140 is directly stored in memory 1412 (step S404).

By the above operation, the entire data such as encrypted content data, license key Kc, user ID data User-ID, and license ID data License-ID remain in memory card 140. Therefore, memory card 140 is in a reproducible state, i.e., "state SA".

In contrast, memory card 142 cannot conduct a reproduction process since only the encrypted content data is stored. Therefore, memory card 142 is in "state SB" at the current stage.

In order to set memory card 142 to state SA, information such as license key Kc, license ID data License-ID and user ID data User-ID must be obtained from content server 10.

By the above-described structure, license ID data License-ID and the like are stored in register 1500, which can be referred to by controller 1420. Therefore, the processing amount required for the operation can be reduced, in addition to the advantage of memory card 110 of the first embodiment.

The present embodiment is described in which the circuitry to decrypt encrypted data from content server 10 is incorporated in a detachable memory card of a cellular phone. Alternatively, the circuitry may be incorporated in the cellular phone. More generally, a structure in which the circuitry is incorporated in a memory card detachable to the terminal equipment that accesses the information server may be employed. Alternatively, a structure in which the circuitry is incorporated in the terminal equipment may be employed.

Modification of Third Embodiment

In the reproduction process of memory card 140 in the third embodiment, determination is made whether decryption is allowed or not by license ID data License-ID. This license ID data License-ID can be implemented to include restriction information as to the number of times of reproduction, in addition to specific information such as the title of a song. A structure can be implemented in which the number of times the user can reproduce content data is limited. Particularly, since memory card 140 employs the structure of storing license ID data License-ID in register 1500, the content of license ID data License-ID can easily be updated every time a reproduction process described afterwards is conducted.

The reproduction process of memory card 140 will be described hereinafter.

FIG. 17 is a flow chart of the process of decrypting content data from the encrypted content data stored in memory card 140 according to a modification of the third embodiment in cellular phone 100, and reproducing the same as music to be output.

Referring to FIG. 17, a reproduction request is issued to memory card 140 by designation of user 1 through touch key 1108 of the cellular phone (step S200).

At memory card 140, controller 1420 reads out license ID data License-ID, user ID data User-ID and the like from register 1500 (step S205).

Controller 1420 determines whether the accumulated number of times of the reproduction process of content data (music data) specified by the data in license ID data License-ID has exceeded the upper limit value of the number of reproducible times based on information included in decrypted license ID data License-ID (step S206). When determination is made that the reproducible number of times has not yet been exceeded, a reproduction allow notification is transmitted to controller 1106 of the cellular phone (step S208).

At cellular phone 100, session key generation circuit 1502 generates a session key Ks (step S210). Encryption processing unit 1504 encrypts session key Ks based on private decryption key KPmedia (step S212). Encryption session data [Ks]Kmedia is output onto data bus BS2 (step S214).

Memory card 140 receives encryption session key [Ks]Kmedia generated by the cellular phone through data bus BS2, and decrypts the received session key based on private decryption key Kmedia, whereby session key Ks is extracted (step S216).

In response to a reproduction process, memory card 140 updates the data related to the accumulated number of times of the reproduction process in license ID data License-ID in register 1500 (step S217).

Then, memory card 140 reads out encrypted data [Kc, License-ID, User-ID]Kcard(1) from memory 1412. The read out data is decrypted by decryption processing unit 1416 to extract license key Kc (step S218).

Then, license key Kc is encrypted by the extracted session key Ks (step S219). The encrypted license key [Kc]Ks is provided to data bus BS2 (step S220).

Decryption processing unit 1506 of cellular phone 100 obtains license Kc by carrying out a decryption process using session key Ks (step S222).

Then, memory card 140 reads out encrypted content data [Dc]Kc from memory 1412, and applies the same to data bus BS2 (step S224).

Music reproduction unit 1508 of cellular phone 100 decrypts encrypted content data [Dc]Kc based on extracted license key Kc (step S226). The content data is reproduced and provided to mixer unit 1510 (step S228).

When determination is made that the decryption process is not allowed by controller 1420 at step S206, memory card 140 issues a reproduction disallow notification to cellular phone 100 (step S230).

By such a structure, the number of times content data can be reproduced by the user can be restricted.

Regarding license ID data License-ID in the reproduction information that restricts the number of times of reproduction in a transfer mode, license ID data License-ID stored in memory 1412 recorded with the number of reproduction times is modified to license ID data License-ID in register 1500 that is altered each time reproduction is conducted, resulting in new reproduction information. Accordingly, even if content data is transferred between memory cards, it is possible to prevent the number of times of reproduction of content data that is limited from exceeding the limited number of times of reproduction determined at the time of distribution.

Fourth Embodiment

Figure 18:
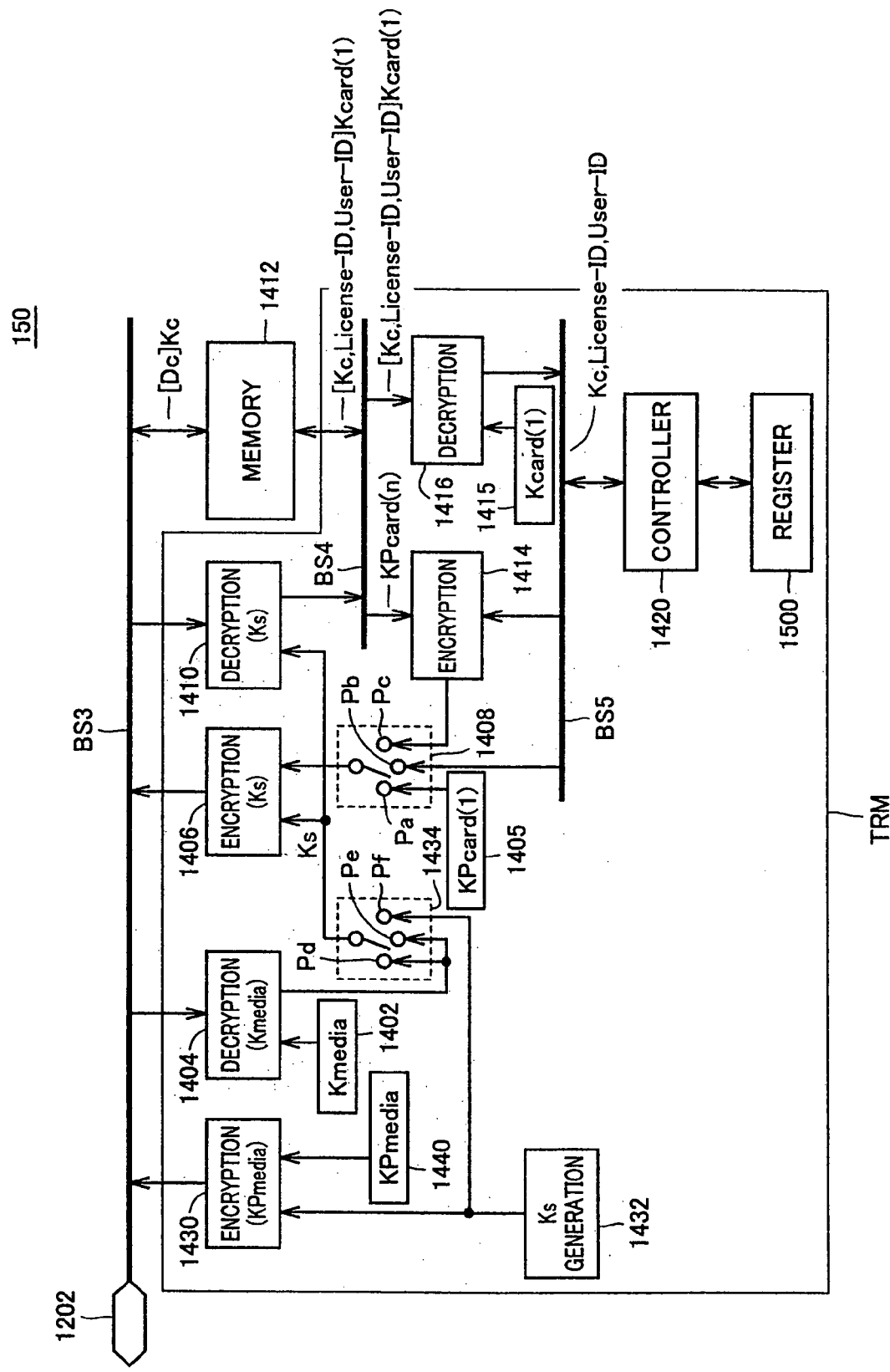
FIG. 18 is a schematic block diagram to describe the structure of a memory card 150 according to a fourth embodiment of the present invention.

FIG. 18 is a schematic block diagram to describe a structure of a memory card 150 of the fourth embodiment of the present invention, and is comparable to FIG. 10 of the second embodiment.

The feature differing from the structure of memory card 130 of second embodiment is that a register 150 that can send/receive data to/from controller 1420 is provided in memory card 150.

The remaining structure is similar to that of memory card 130 of the second embodiment shown in FIG. 10. Corresponding component have the same reference characters allotted, and description thereof will not be repeated.

Figure 19:
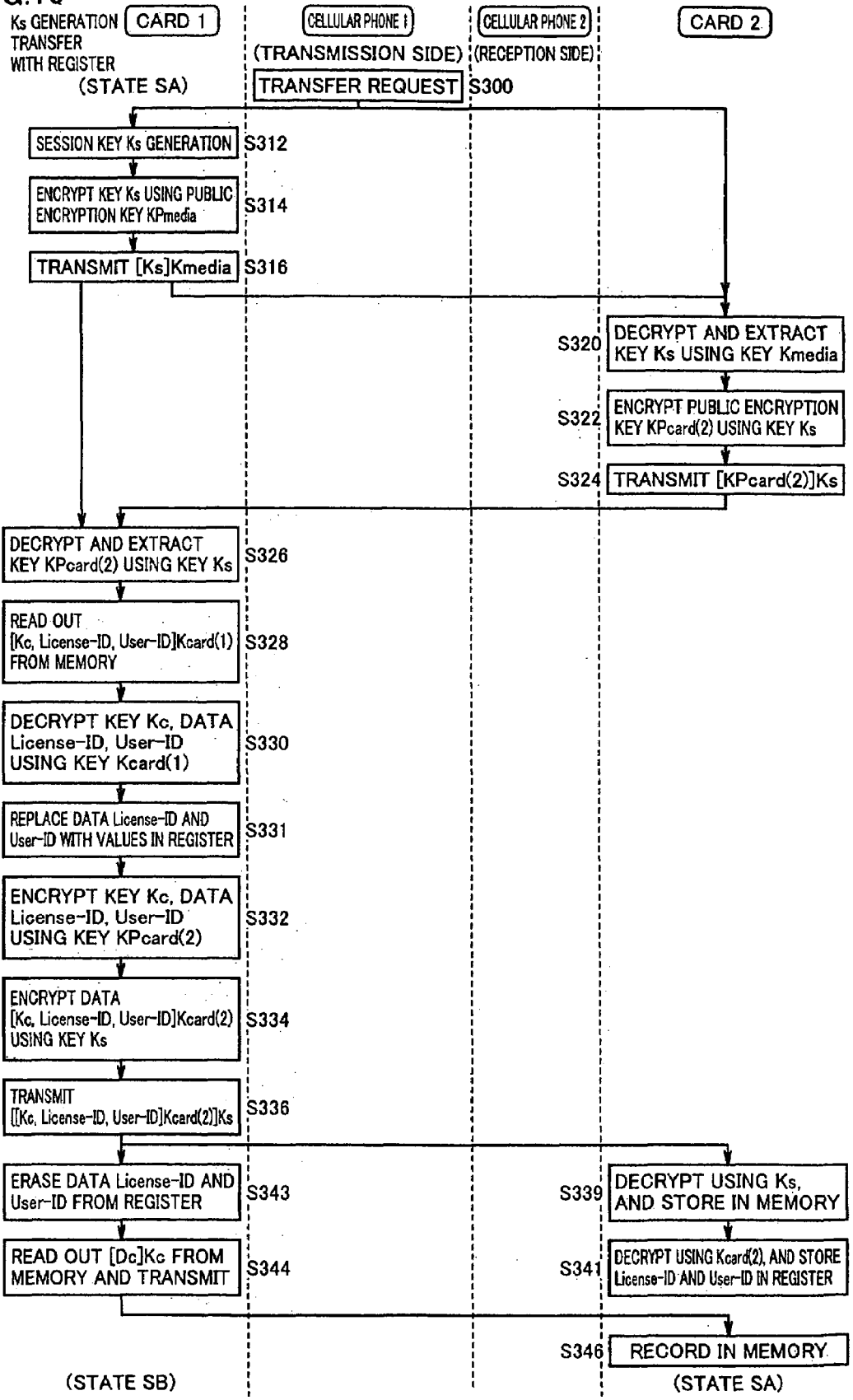
FIG. 19 is a flow chart to describe the transfer mode of memory card 150, comparable to FIG. 11 of the second embodiment.

FIG. 19 is a flow chart to describe the transfer mode of memory card 150, and is comparable to FIG. 11 of the second embodiment.

It is assumed similarly that cellular phone 100 corresponds to the transmission side whereas cellular phone 102 corresponds to the reception side in FIG. 19. It is also assumed that a memory card 152 having a structure similar to that of memory card 150 is loaded in cellular phone 102.

Cellular phone 100 issues a transfer request to its own memory card 150 and to memory card 152 inserted in cellular phone 102 of the reception side (step S300).

At cellular phone 100, session key generation circuit 1432 in memory card 150 generates a session key Ks (step S312). Using public encryption key KPmedia, encryption processing unit 1430 encrypts session key Ks (step S314). The encrypted session key Ks is transmitted to card 152 via antenna 1102, for example, in a transceiver mode (step S316).

Similarly in memory card 152, decryption processing unit 1404 decrypts and extracts session key Ks based on private decryption key Kmedia (step S320). Furthermore, public encryption key KPcard(2) of memory card 152 is encrypted based on session key Ks (step S322). The encrypted data [KPcard(2)]Ks is transmitted to memory card 150 (step S324).

At memory card 150, the encrypted data transmitted from memory card 152 is decrypted based on session key Ks, whereby public encryption key KPcard(2) of memory card 152 is decrypted and extracted (step S326).

At memory card 150, license key Kc, license ID data License-ID and user ID data User-ID encrypted by public decryption key Kcard(1) of memory card 150 are read out from memory 1412 (step S328).

Then, decryption processing unit 1416 decrypts license key Kc, license ID data License-ID and user ID data User-ID based on private decryption key Kcard(1) (step S330).

Controller 1420 replaces the decrypted license key Kc, license ID data License-ID and user ID data User-ID with the data values in register 1500 (step S331). Encryption processing unit 1414 uses public encryption key KPcard(2) of memory card 152 extracted by decryption processing unit 1410 to encrypt license key Kc, license ID data License-ID and user ID data User-ID (step S332).

The data encrypted by encryption processing unit 1414 are provided to encryption processing unit 1406 via switch 1408 (contact Pc closed).

Encryption processing unit 1406 encrypts data [Kc, License-ID, User-ID]Kcard(2) using session key Ks (step S334).

Then, memory card 150 transmits to memory card 152 the encrypted data [[Kc, License-ID, User-ID]Kcard(2)]Ks via cellular phone 100 (step S336).

At memory card 152, the data transmitted from memory card 150 is decrypted using session key Ks by decryption processing unit 1410, and stored in memory 1412 (step S339). Then, memory card 152 decrypts data [Kc, License-ID, User-ID]Kcard(2) based on private decryption key Kcard(2). The decrypted license ID data License-ID and user ID data User-ID are stored in register 1500 (step S341):

Memory card 150 erases license ID data License-ID and user ID data User-ID from register 1500 (step S343).

Memory card 150 reads out encrypted content data [Dc] Kc from the memory and transmits the same to memory card 152 (step S344).

Memory card 152 stores the private decryption key directly in memory 1412 (step S346).

By such a process, license key Kc, license Id data License-ID and user ID data User-ID and the like are erased from memory card 150 at step S342. Therefore, memory card 150 is at "state SB".

In contrast, memory card 152 is in "state SA" since all the data in addition to the encrypted content data such as license Kc, license ID data License-ID and user ID data User-ID are transmitted.

By the above-described structure, data transfer from memory card 150 to memory card 152, for example, can be carried out through an interface apparatus that can be connected between memory cards without having to use the cellular phone with session key generation circuit 1502 as described above. The advantage of further improving the convenience for users is provided in addition to the advantage of memory card 130 of the second embodiment.

Furthermore, license ID data License-ID and the like are stored in register 1500, which can be referred to by controller 1420. Therefore, the amount of processing required for operation can be reduced.

Additionally, a structure can be implemented wherein the number of times content data can be reproduced by the user is restricted.

Fifth Embodiment

Figure 20:
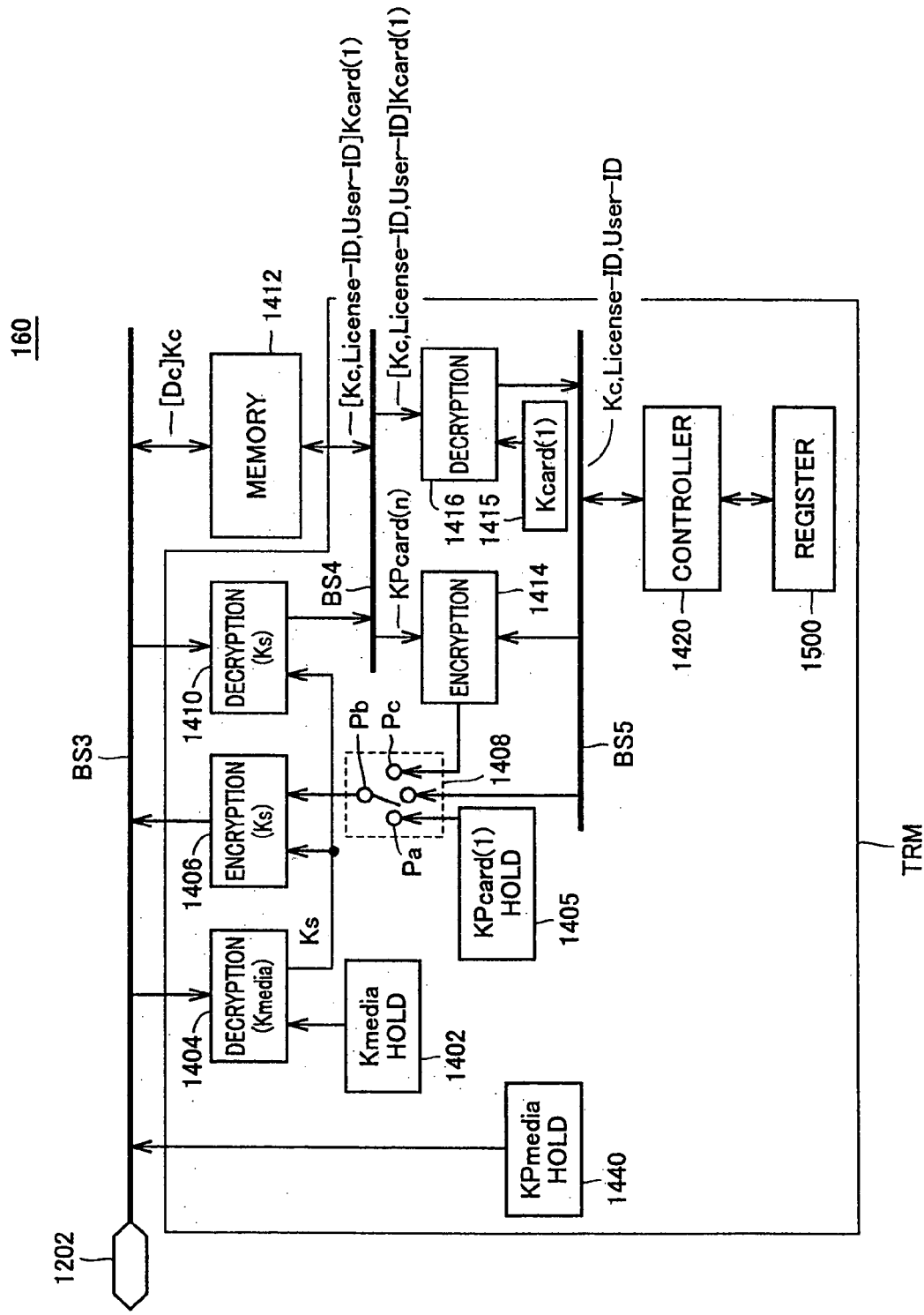
FIG. 20 is a schematic block diagram to describe a structure of a memory card 160 according to a fifth embodiment of the present invention.

FIG. 20 is a schematic block diagram to describe a structure of a memory card 160 according to a fifth embodiment of the present invention, and is comparable to FIG. 12 of the third embodiment.

In the following, public encryption key KPmedia of memory card 160 attached to cellular phone 100 is discriminated from public encryption key KPmedia of memory card 162 inserted in cellular phone 102, and will be referred to as public encryption key KPmedia(1) and public encryption key KPmedia(2) for memory card 160 and memory card 162, respectively.

Correspondingly, the asymmetric private decryption key that can decrypt data encrypted with public encryption key KPmedia(1) is called a private decryption key Kmedia(1), whereas the asymmetric private decryption key that can decrypt data encrypted with public encryption key KPmedia (2), is called a private decryption key Kmedia(2).

By distinguishing a public encryption key for each medium, the case where there are a plurality of types of memory cards as well as the general case where there is a medium other than a memory card as an option in the system can be accommodated, as will be apparent from the description set forth below.

Referring to FIG. 20, a memory card 160 of the fifth embodiment of the present invention differs in structure from memory card 140 of the third embodiment in that a KPmedia hold unit 1440 is provided to store the value of public encryption key KPmedia(1) corresponding to the memory card medium type in memory card 160 and output a public encryption key KPmedia(1) onto data bus BS3.

The remaining structure is similar to that of memory card 140 of the third embodiment shown in FIG. 12. Corresponding components have the same reference characters allotted, and description thereof will not be repeated.

Figure 21:
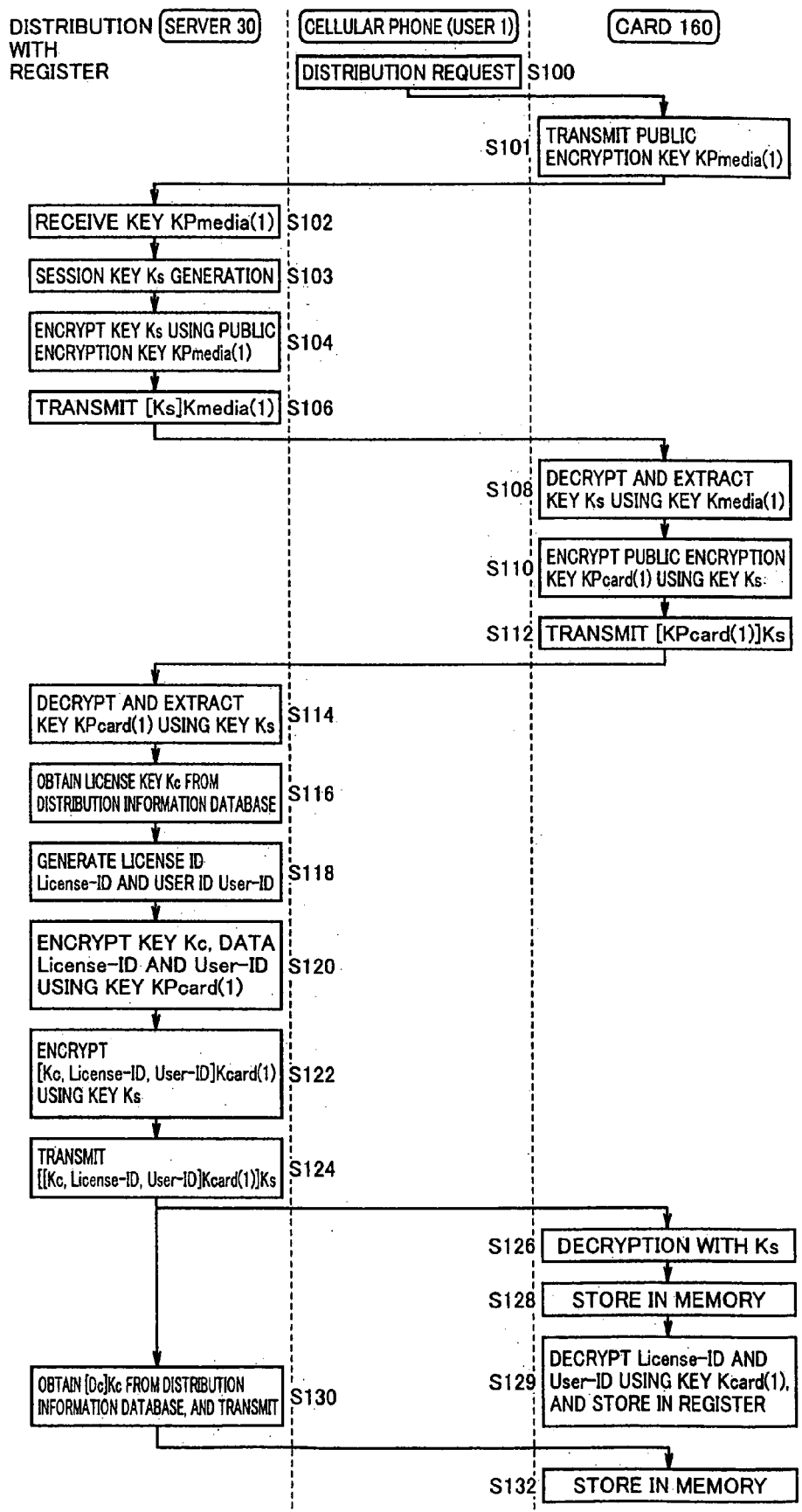
FIG. 21 is a flow chart to describe a distribution mode using memory card 160 of FIG. 20.

FIG. 21 is a flow chart to describe the distribution mode using memory card 160 of FIG. 20.

FIG. 21 corresponds to the operation of user 1 receiving distribution from content server 10 using memory card 160.

First, a distribution request is issued from cellular phone 100 of user 1 by the user's manipulation on the touch key (step S100).

At memory card 160, KPmedia hold unit 1440 responds to the distribution request to transmit public encryption key KPmedia(1) to content server 10 (step S101).

Upon receiving the distribution request transferred from memory card 160 and public encryption key KPmedia(1) at content server 10 (step S102), session key generation unit 314 generates a session key Ks (step S103).

Then, encryption processing unit 316 in content server 10 encrypts session key Ks using public encryption key KPmedia(1), and provides the encrypted session key to data bus BS1 (step S104).

Communication device 350 transmits encrypted section key [Ks]Kmedia(1) from encryption processing unit 316 to memory card 160 of cellular phone 100 via a communication network (step S106).

At memory card 160, decryption processing unit 1404 decrypts the reception data applied onto data bus BS3 via memory interface 1200 using private decryption key Kmedia(1), whereby session key Ks is decrypted and extracted (step S108).

The subsequent process is similar to that of the operation of memory card 140 of the third embodiment described with reference to FIG. 13. Therefore description thereof will not be repeated.

By such a structure, the memory card itself can receive distribution after transmitting public encryption key KPmedia(1) to the side where session key Ks is set (content server 10), so that memory card 160 attains a content data reproducible state.

Figure 22:
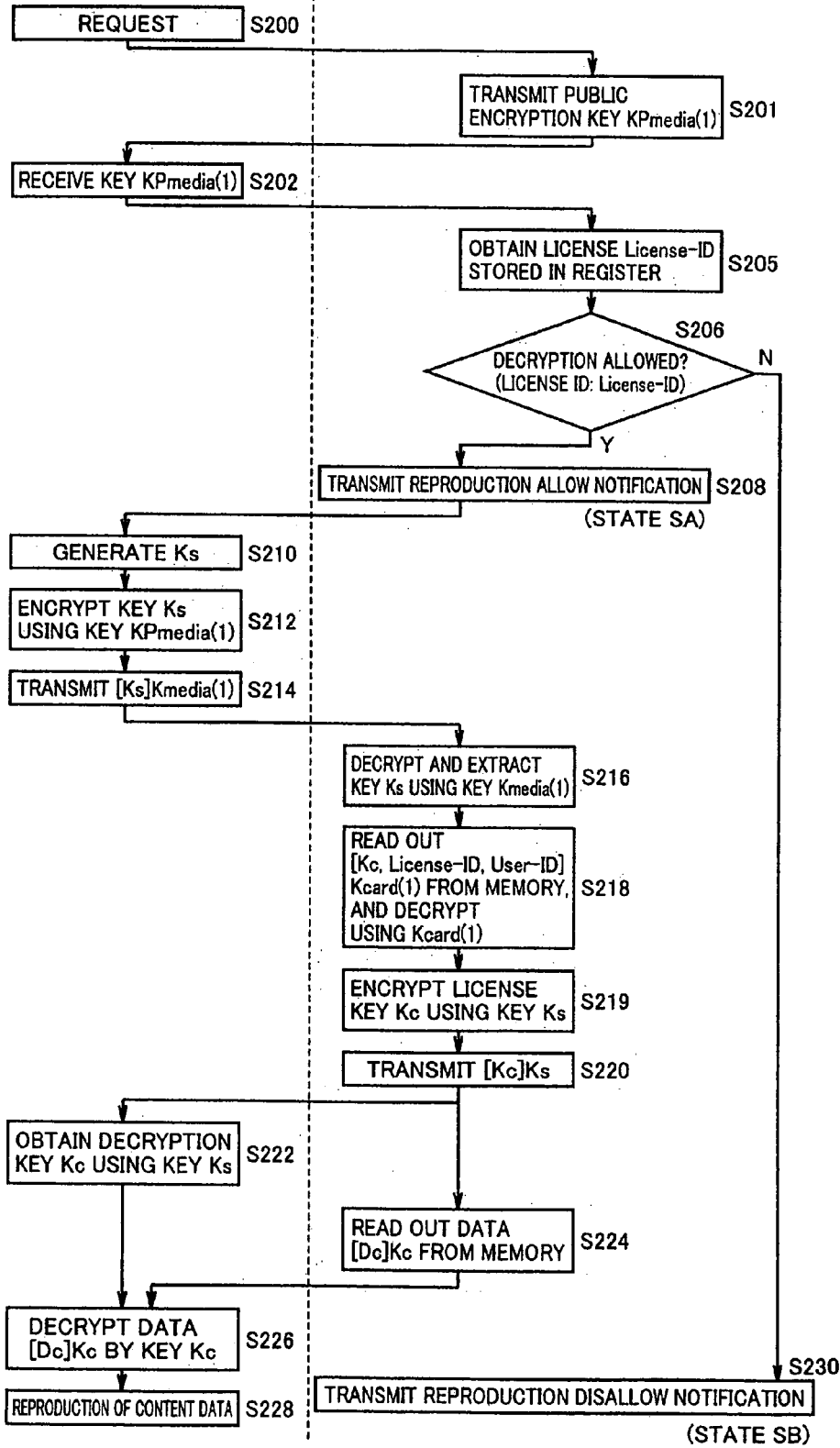
FIG. 22 is a flow chart describing a reproduction mode of decrypting encrypted content data and providing the same as music data output according to the fifth embodiment.

FIG. 22 is a flow chart to describe the process of decrypting content data from the encrypted content data stored in memory card 160 and reproducing the same as music output in cellular phone 100.

Referring to FIG. 22, a reproduction request is issued towards memory card 160 in response to designation from user 1 through touch key 1108 of the cellular phone (step S200).

At memory card 160, public encryption key KPmedia(1) is transmitted to cellular phone 100 from KPmedia hold unit 1440 in response to the reproduction request (step S201).

Cellular phone 100 receives and stores public encryption key KPmedia(1) from memory card 160 (step S202).

At memory card 160, license ID data License-ID, user ID data User-ID and the like are read out by controller 1420 from register 1500 (step S205).

Controller 1420 determines whether the request is towards data that can be decrypted based on the information included in the information such as license ID data License-ID (step S206). When determination is made that decryption can be carried out, a reproduction allow notification is transmitted to controller 1106 of the cellular phone (step S208).

At cellular phone 100, session key generation circuit 1502 generates a session key Ks (step S210). Encryption processing unit 1504 encrypts session key Ks based on private decryption key KPmedia(1) (step S212). Encryption session data [Ks]Kmedia(1) is output to data bus BS2 (step S214).

Memory card 160 receives encryption session key Ks generated by the cellular phone through data bus BS2, and decrypts the received session key based on private decryption key Kmedia(1), whereby session key Ks is extracted (step S216).

The subsequent process is similar to the operation of memory card 140 of the third embodiment described with reference to FIG. 14. Therefore description thereof is not repeated.

By the above structure, the memory card itself can carry out a reproduction operation after transmitting a public encryption key KPmedia(1) to the transmission side of session key Ks (cellular phone 100).

Figure 23:
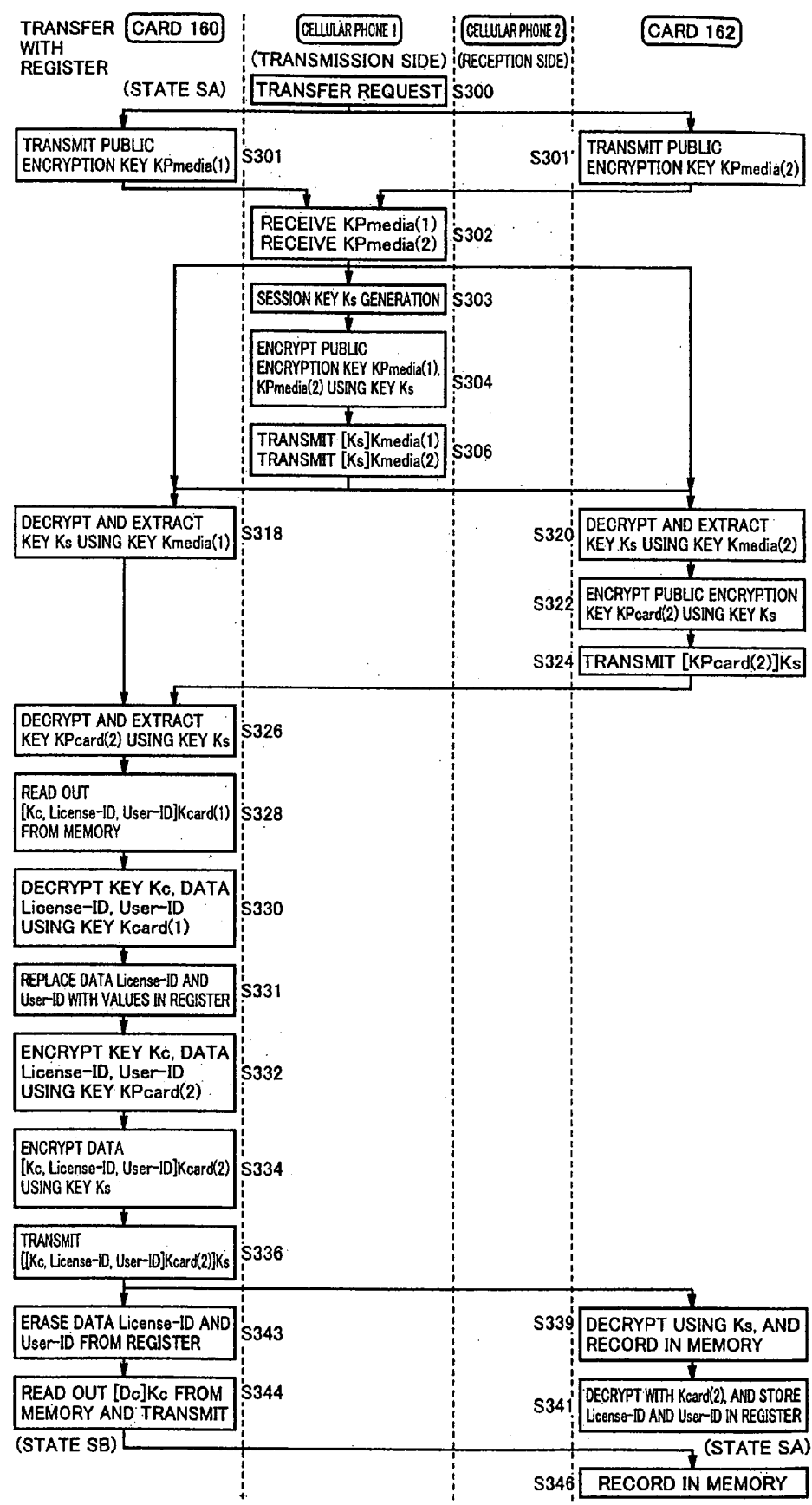
FIG. 23 is a flow chart to describe the mode of transferring content data and key data between two memory cards.

FIG. 23 is a flow chart to describe the operation of transferring content data and key data between two memory cards.

It is assumed that cellular phone 100 corresponds to the transmission side whereas cellular phone 102 corresponds to the reception side. It is also assumed that a memory card 162 having a structure similar to that of memory card 160 is loaded in cellular phone 102.

Cellular phone 100 issues a transfer request to its own memory card 160 and to memory card 162 in cellular phone 102 of the reception side (step S300).

Memory card 160 transmits public encryption key KPmedia(1) to cellular phone 100 (step S301). Memory card 162 transmits public encryption key KPmedia(2) to cellular phone 100 (step S301').

Cellular phone 100 transmits public encryption key KPmedia(1) and public encryption key KPmedia(2) (step S302).

At cellular phone 100, session key generation circuit 1502 generates a session key Ks (step S303). Using public encryption key KPmedia(1) and public encryption key KPmedia(2), encryption processing unit 1504 encrypts session key Ks (step S304). Cellular phone 100 transmits encrypted session key [Ks]Kmedia to memory card 160 via data bus BS2, and also to memory card 162 in cellular phone 102 via antenna 1102, for example, in a transceiver mode (step S306).

At memory card 160, a session key Ks is decrypted and extracted using private decryption key Kmedia (step S318).

Similarly at card 162, session key Ks is decrypted and extracted using private decryption key Kmedia (step S320).

The subsequent process is similar to the operation of memory cards 140 and 142 of the third embodiment described with reference to FIG. 15. Therefore, description thereof will not be repeated.

By such a structure, the memory card itself can carry out a transfer mode upon transmitting public encryption keys KPmedia(1) and KPmedia(2) to the transmission side of session key Ks (cellular phone 100).

As to the replicate mode, the operation of memory cards 160 and 162 is similar to the operation of memory cards 140 and 142 of the third embodiment.

Although the above description is based on a structure in which a register 1500 is provided, a structure absent of register 1500 can be implemented similar to memory card 110 of the first embodiment of FIG. 5.

The present embodiment is described in which the circuitry to decrypt encrypted data from content server 10 is incorporated in a detachable memory card of a cellular phone. Alternatively, the circuitry may be incorporated in the cellular phone. More generally, a structure in which the circuitry is incorporated in a memory card detachable to the terminal equipment that accesses the information server may be employed. Alternatively, a structure in which the circuitry is incorporated in the terminal equipment may be employed.

Similar to the operation of the memory card of the modification of the third embodiment described with reference to FIG. 17, license ID data License-ID can be implemented to include restriction information as to the number of times of reproduction, in addition to specific information such as the title of a song. A structure can be implemented in which the number of times the user can reproduce content data is limited.

Sixth Embodiment

Figure 24:
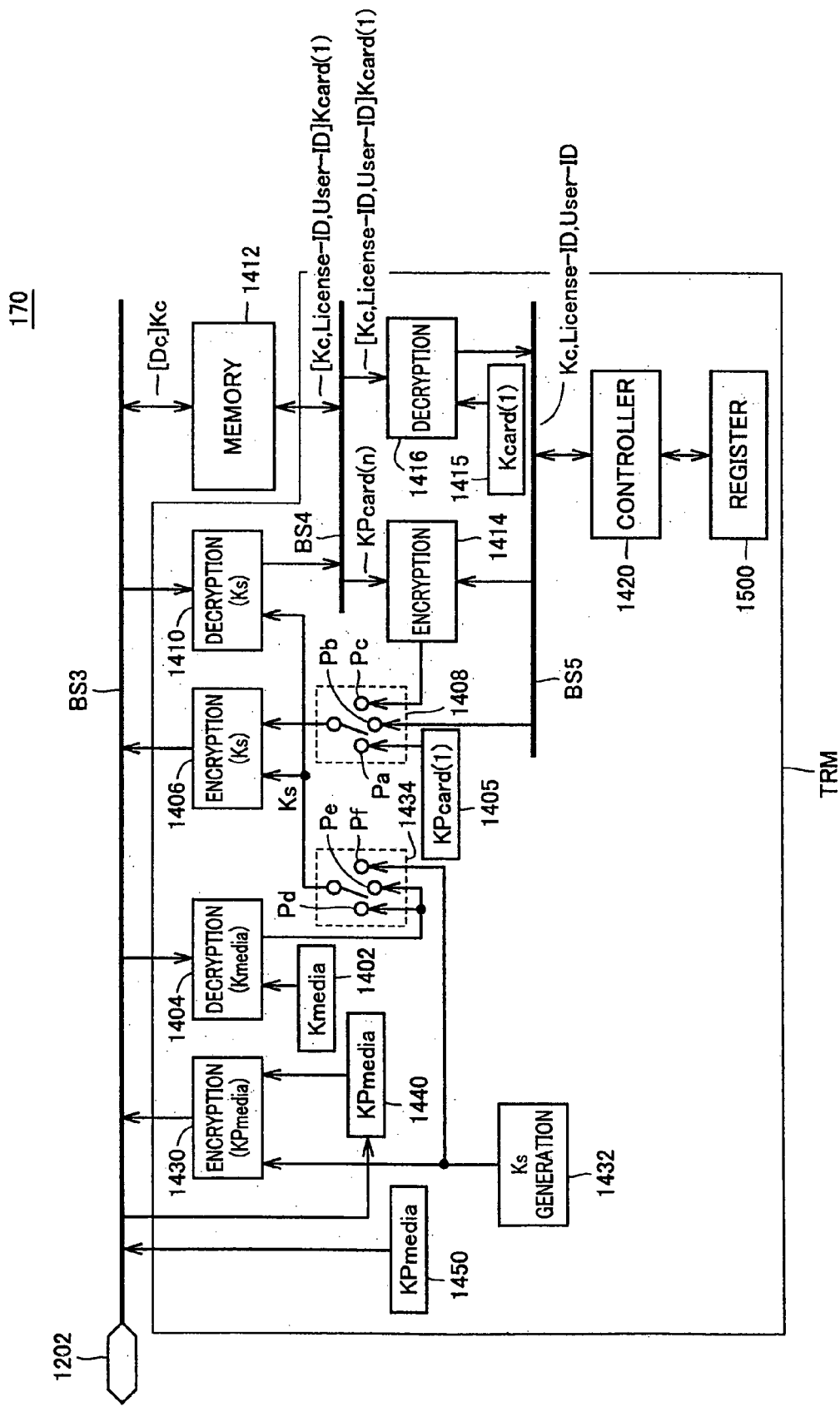
FIG. 24 is a schematic block diagram to describe a structure of a memory card 170 according to a sixth embodiment of the present invention.

FIG. 24 is a schematic block diagram to describe a structure of memory card 170 of the sixth embodiment of the present invention, and is comparable to FIG. 18 of the fourth embodiment.

The feature differing in structure from memory card 150 of the fourth embodiment is that a first KPmedia hold unit 1440 receives and stores through data bus BS3 a public encryption key transmitted from another medium such as public encryption key KPmedia(2), and encryption processing unit 1430 uses this public encryption key KPmedia(2) to encrypt session key Ks and provide the encrypted session key Ks to data bus BS3.

Furthermore, memory card 170 includes a second KPmedia hold unit 1450 storing a public encryption key KPmedia (1) corresponding to its own self, and providing the encryption key to data bus BS3.

The remaining structure is similar to that of memory card 150 of the fourth embodiment shown in FIG. 18. Corresponding component have the same reference characters allotted, and description thereof will not be repeated.

Figure 25:
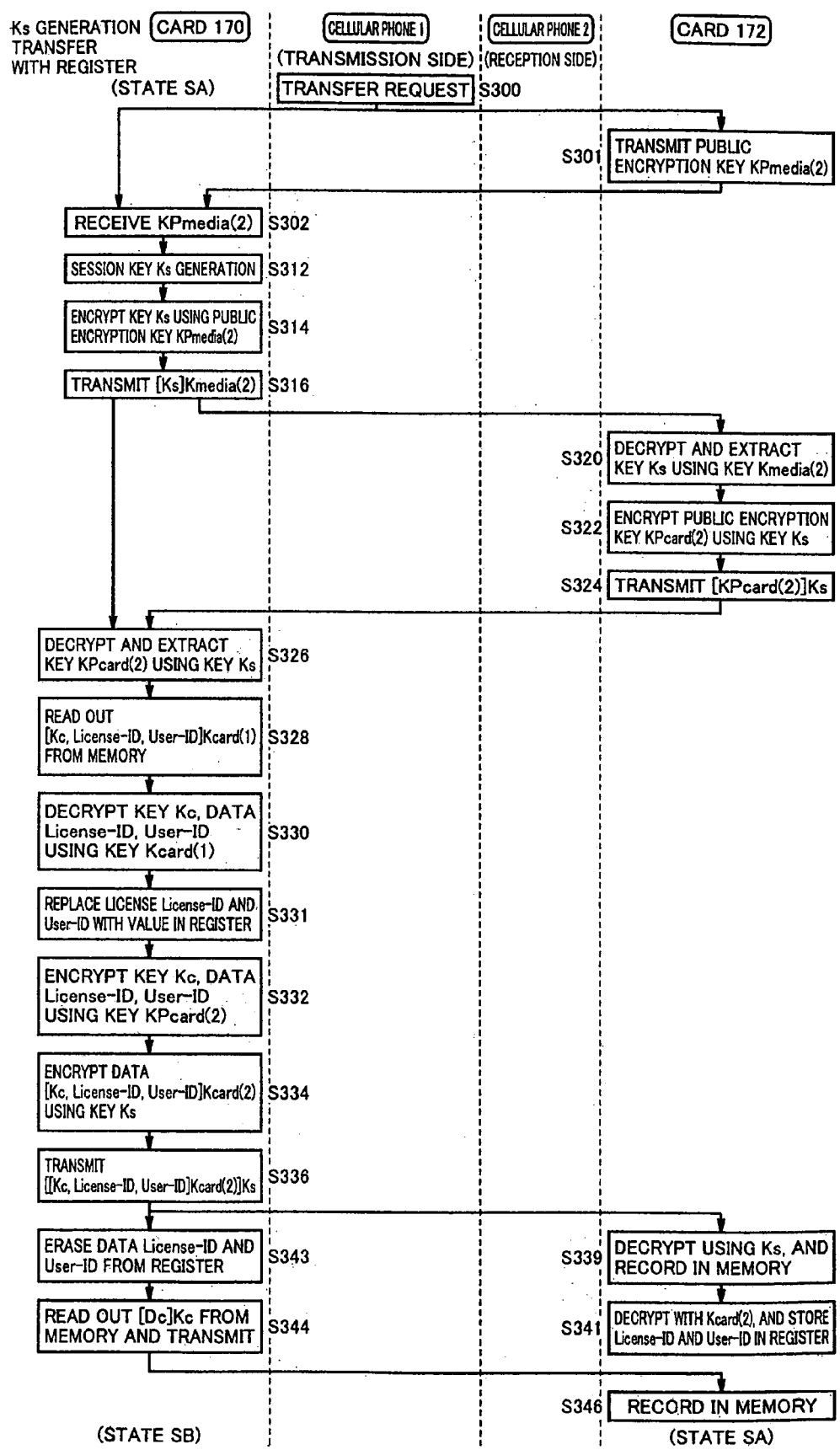
FIG. 25 is a flow chart to describe a transfer mode of memory card 170.

FIG. 25 is a flow chart to describe the transfer process of memory card 170, and is comparable to FIG. 19 of the fourth embodiment.

It is assumed that cellular phone 100 corresponds to the transmission side whereas cellular phone 102 corresponds to the reception side in FIG. 25. It is also assumed that cellular phone 102 is loaded with a memory card 172 having a structure similar to that of memory card 170.

Cellular phone 100 issues a transfer request towards its own memory card 170 and to memory card 172 inserted in cellular phone 102 of the reception side (step S300).

Memory card 172 transmits to memory card 170 its own public encryption key KPmedia(2) from second KPmedia hold unit 1450 through cellular phones 102 and 100 (step S301). Memory card 170 receives public encryption key KPmedia(2), and stores the same in first KPmedia hold unit 1440 (step S302).

On the part of cellular phone 100, session generation circuit 1432 in memory card 170 generates a session key Ks (step S312). Encryption processing unit 1430 encrypts session key Ks using public encryption key KPmedia(2) (step S314). The encrypted session key [Ks]Kmedia(2) is transmitted to memory card 172 via antenna 1102, for example, in a transceiver mode (step S316).

At memory card 172, decryption processing unit 1404 decrypts and extracts session key Ks using private decryption key Kmedia(2) (step S320).

The subsequent operation is similar to that of memory cards 150 and 152 shown in FIG. 19. Therefore, described thereof will not be repeated.

By the above structure, data transfer from memory card 170 to memory card 172 can be carried out through an interface apparatus that can be connected between the memory cards without using the cellular phone with the previously described session key generation circuit even in the case where the public encryption key KPmedia differs according to the type of memory card 150. There is the advantage that the convenience of the user is further improved in addition to the advantage of the memory card of the fourth embodiment.

Furthermore, since license ID data License-ID and the like are stored in register 1500, which can be referred to by controller 1420, the amount of processing required for the operation can be reduced.

A structure can be implemented in which the number of times the user can reproduce content data is restricted in the present embodiment.

Similar to memory card 130 of the second embodiment shown in FIG. 10, a structure absent of register 1500 can also be implemented in the present embodiment.

Seventh Embodiment

A memory card 180 according to the seventh embodiment of the present invention differs in structure from memory card 150 of the fourth embodiment in that each of the distribution server, cellular phone and memory card has a structure that generates its unique session key. More specifically, the session key generated by the distribution server or cellular phone is Ks, the session key generated by one memory card 180 is Ks1, and the session key generated by the other memory card 182 having a structure similar to that of memory card 180 is Ks2.

In the reproduction mode, the public encryption key for cellular phone side to receive the session key generated by the memory card is called KPp and the private decryption key that can decrypt data encrypted using this public encryption key KPp is called Kp.

Figure 26:
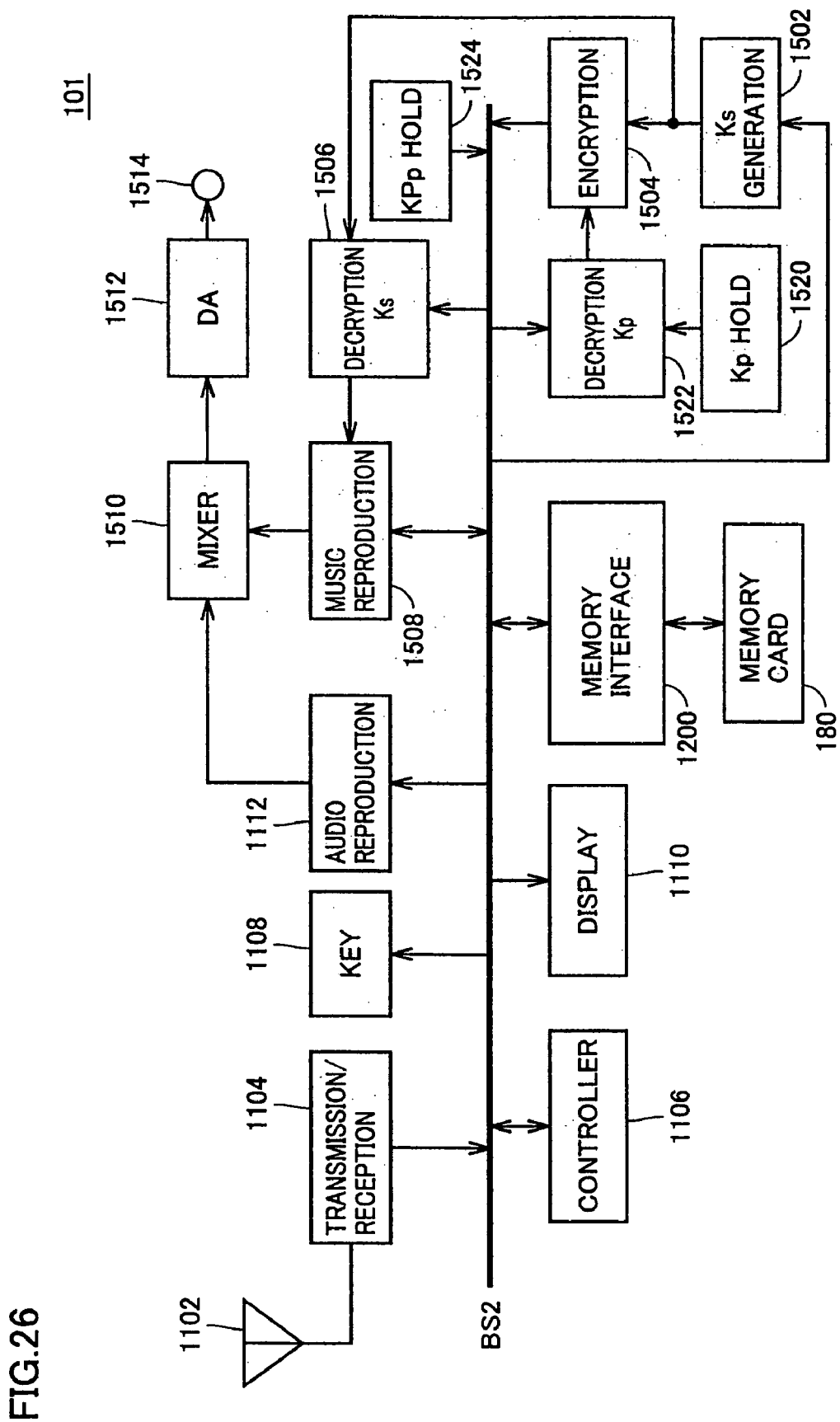
FIG. 26 is a schematic block diagram to describe a structure of a cellular phone 101 according to a seventh embodiment.

FIG. 26 is a schematic block diagram to describe a structure of cellular phone 101 according to the seventh embodiment.

The feature differing from cellular phone 100 of FIG. 5 in structure is that, in addition to the mounting of memory card 180, cellular phone 101 includes a KPp hold unit 1524 storing a public encryption key KPp, which is output to data bus BS2 in a reproduction mode.

Cellular phone 101 further includes a Kp hold unit 1520 storing a private decryption key Kp, and a decryption processing unit 1522 decrypting and extracting session key Ks1 encrypted using key KPp applied from memory card 180 via data bus BS2, based on key Kp applied from Kp hold unit 1520. Encryption processing unit 1504 encrypts and provides to data bus BS2 its own session key Ks from Ks generation unit 1502 using session key Ks1 applied from decryption processing unit 1522.

The remaining elements of cellular phone 101 are similar to those of cellular phone 100 of the first embodiment shown in FIG. 5. Corresponding components have the same reference characters allotted, and description thereof will not be repeated.

Figure 27:
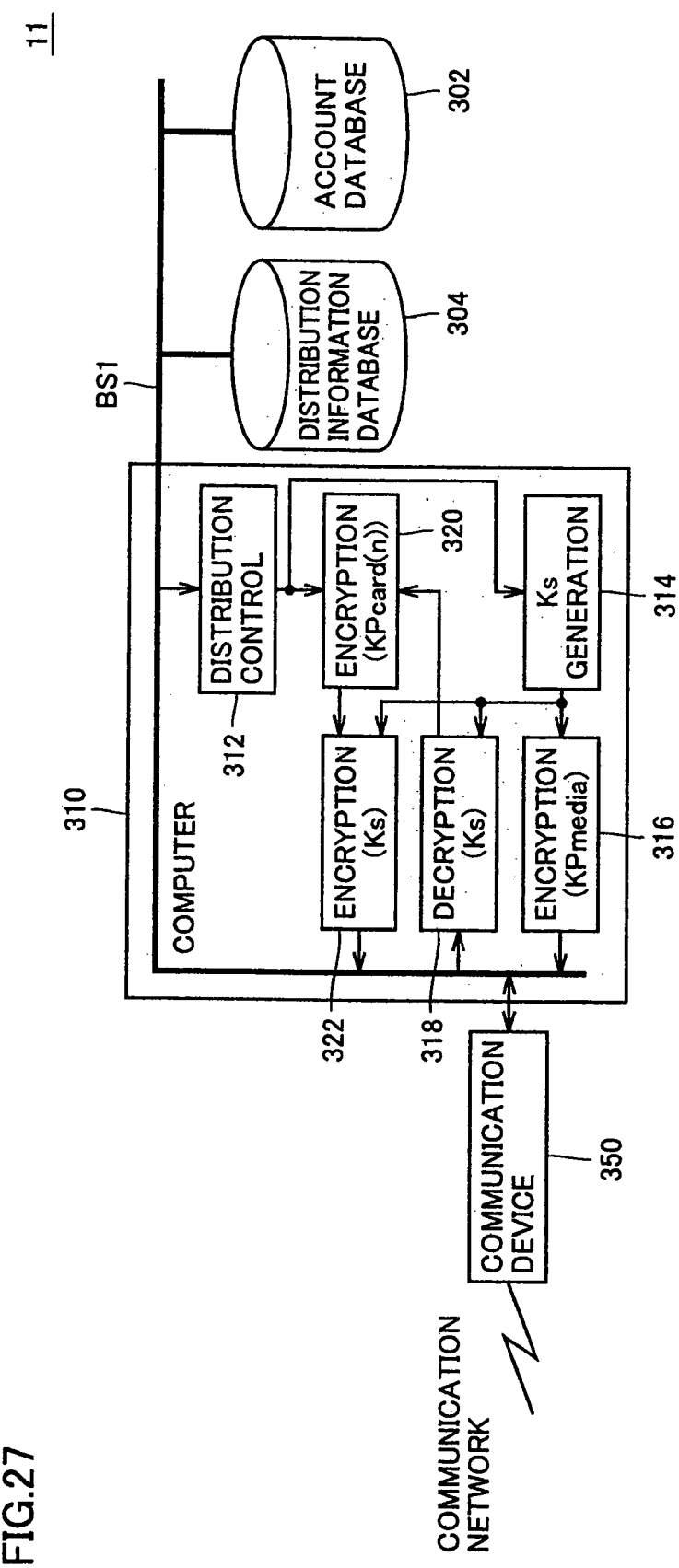
FIG. 27 is a schematic block diagram showing a structure of a content server 11 corresponding to memory card 180 of the seventh embodiment.

FIG. 27 is a schematic block diagram showing a structure of content server 11 corresponding to memory card 180 of the seventh embodiment. Content server 11 differs in structure from content server 10 of FIG. 3 in that encryption processing unit 322 in data processing unit 310 further decrypts the output of encryption processing unit 320 based on a session key encrypted with session key Ks from the memory card loaded in the cellular phone and transmitted, and decrypted and extracted by decode processing unit 318, for example based on session key Ks1, instead of session key Ks from Ks generation unit 314.

The remaining elements of content server 11 are similar to those of content server 10 of the first embodiment shown in FIG. 3. Corresponding components have the same reference characters allotted, and description thereof will not be repeated.

Figure 28:
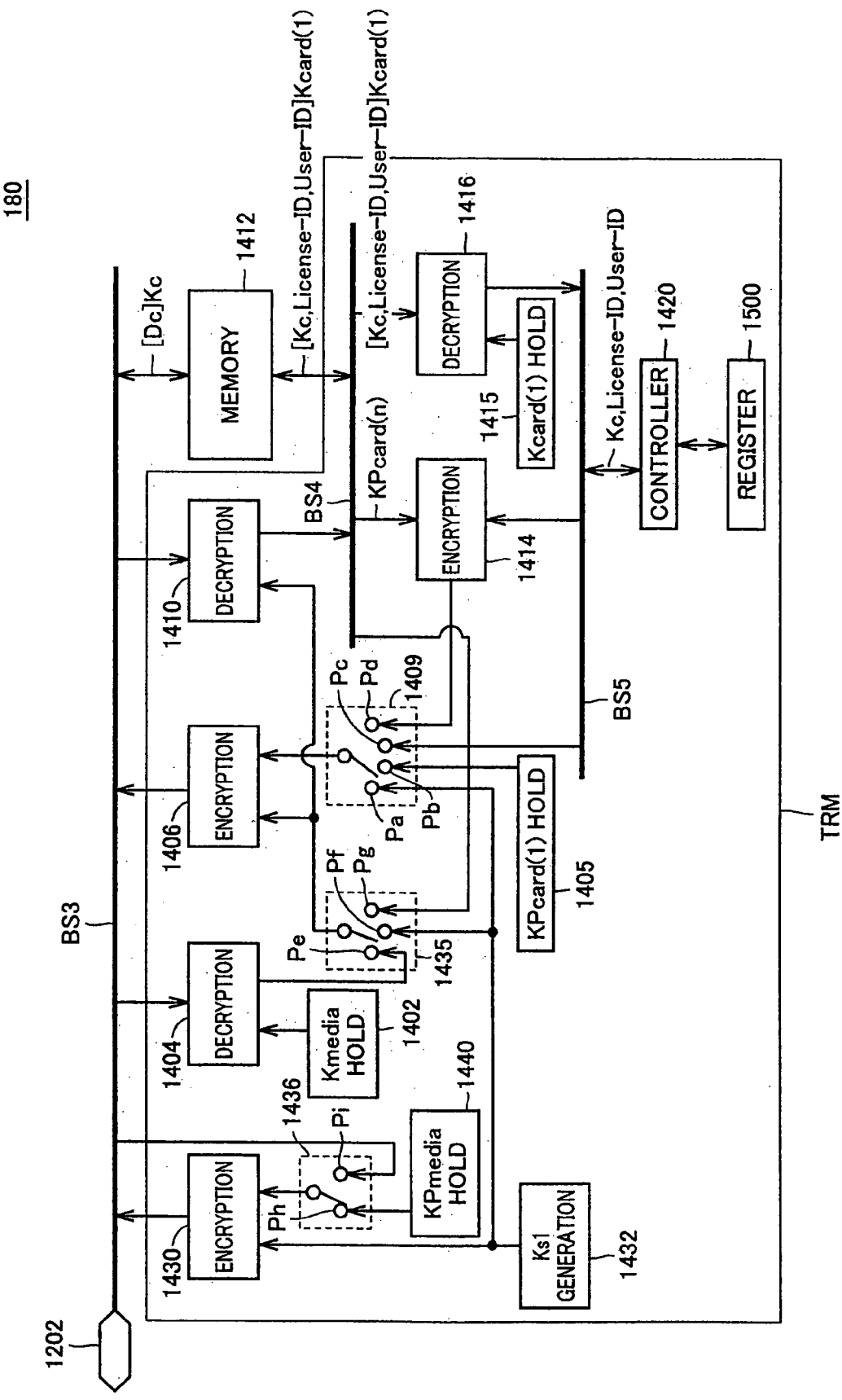
FIG. 28 is a schematic block diagram to describe a structure of memory card 180 according to the seventh embodiment of the present invention.

FIG. 28 is a schematic block diagram to describe the structure of memory card 180 of the seventh embodiment of the present invention, and is comparable to FIG. 18 of the fourth embodiment.

Memory card 180 differs in structure from memory card 150 in that a session key Ks1 generation unit 1432 generates a session key Ks1 unique to its own card.

Memory card 180 further includes a switch 1436 receiving the output of KPmedia hold unit 1440 storing a public encryption key KPmedia unique to the card medium type, and public encryption key KPp applied from cellular phone 101 via data bus BS3 to provide either output according to the operation mode. Switch 1436 includes contacts Pi and Ph. Contact Pi and contact Ph connect to data bus BS3 and KPmedia hold unit 1440, respectively. Encryption processing unit 1430 decrypts session key Ks1 from Ks1 generation unit 1432 using either public encryption key KPmedia or KPp applied from switch 1436 to provide the encrypted session key to data bus BS3.

Specifically, switch 1436 is in an unused state when in a distribution mode or when in a transfer destination in a transfer mode, and is closed to the side of contact Pi when in a reproduction mode, and closed to the side of contact Ph when it is the transfer source in a transfer mode.

Memory card 180 includes, instead of switch 1434, a switch 1435 having contacts Pe, Pf and Pg, and receiving session key Ks from content server 11 applied from decryption processing unit 1404, the output of Ks1 generation unit 1432, and session key Ks from cellular phone 101 applied from data bus BS4 to selectively output one thereof according to the operation mode. Contacts Pe, Pf and Pg are connected to the output of decryption processing unit 1404, the output of Ks1 generation unit 1432, and data bus BS4, respectively. Therefore, encryption processing unit 1406 and decryption processing unit 1410 carry out an encryption process and decryption process based on the key applied from switch 1435.

Switch 1435 has contact Pe closed when the session key from content server 11 is to be extracted when in a distribution mode, and has contact Pf closed when license key Kc, license ID data License-ID and user ID data User-ID are to be decrypted using key Ks1. Switch 1435 has contact Pf closed when a decryption process is to be carried out in a reproduction mode, and has contact Pg closed when an encryption process is to be carried out in a reproduction mode. Switch 1435 is connected to the side of contact Pf and contact Pg to carry out decryption process and an encryption process, respectively, when functioning as the transfer source when in a transfer mode. Switch 1435 is closed to the side of contact Pe and contact Pf when receiving the session key of the transfer source and receiving license key, license ID data License-ID and user ID data User-ID, respectively, when functioning as a transfer destination in a transfer mode.

Memory card 180 further includes, instead of switch 1408, a switch 1409 with contacts Pa, Pb, Pc and Pe, receiving its own session key Ks1 applied from Ks1 generation unit 1432, the output of KPcard hold unit 1405, license key Kc from data bus BS5, and license key Kc, license ID data License-ID and user ID data User-ID applied from encryption processing unit 1414, and decrypted using public encryption key KPcard(n) of the other party. Contacts Pa, Pb, Pc and Pd are connected to the output from Ks 1 generation unit 1432, the output from KPcard hold unit 1405, data bus BS5, and the output from encryption processing unit 1414, respectively. Therefore, encryption processing unit 1406 applies an encryption process on the data applied from switch 1406.

Specifically, switch 1409 has contact Pb and contact Pa closed, sequentially in transmitting its own public encryption key KPcard(1) and its own session key Ks 1 to content server 11 when functioning as a distribution destination in a distribution mode. Switch 1409 has contact Pc closed in a reproduction mode, and contact Pd closed when functioning as a transfer source in a transfer mode. Switch 1409 has contact Pb and contact Pa closed sequentially in transmitting its own public encryption key KPcard(1) and its own session key Ks1 to the transfer source when functioning as a transfer destination in a transfer mode.

Figure 29:
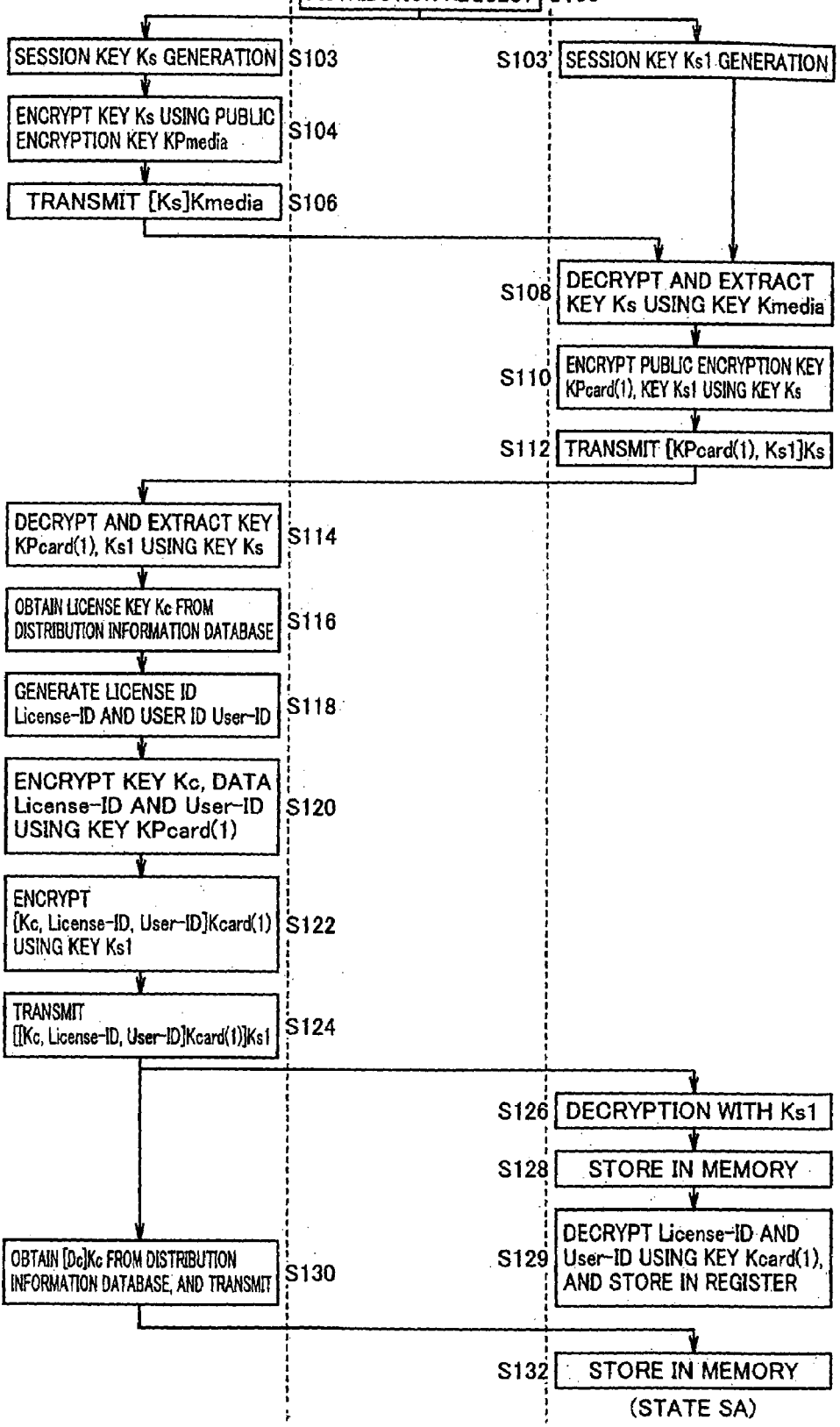
FIG. 29 is flow chart to describe a distribution mode using memory card 180 of the seventh embodiment of the present invention.

FIG. 29 is a flow chart to describe a distribution mode using memory card 180 of FIG. 28.

FIG. 28 corresponds to the operation of user 1 receiving content data distribution from content server 11 using memory card 180.

First, a distribution request is issued from cellular phone 101 to content server 11 through the user's manipulation through touch key 1108 (step S100).

At content server 11, session key generation unit 314 responds to this distribution request to generate a session key Ks (step S103). On the part of memory card 180, Ks1 generation unit 1432 generates a session key Ks1 (step S103').

Then at content server 11, encryption processing unit 316 in content server 11 encrypts session key Ks using public encryption key KPmedia, and applies the encrypted session key to data bus BS1 (step S104).

Communication device 350 transmits encrypted session key [Ks]Kmedia from encryption processing unit 316 to memory card 180 of cellular phone 101 through the communication network (step S106).

At memory card 180, decryption processing unit 1404 decrypts the reception data applied to data bus BS3 via memory interface 1200 using private decryption key Kmedia, whereby session key Ks is decrypted and extracted (step S108).

Since switch 1409 is selected at a closed state of contact Pb in a distribution mode, encryption processing unit 1406 receives public encryption key KPcard(1) (the public encryption key in the memory card of user 1) applied from KPcard(1) hold unit 1405 via contact Pb. Then, switch 1409 attains a state where contact Pa is closed. Encryption processing unit 1406 receives session key Ks1 applied from Ks1 hold unit 1432 via contact Pa. Since switch 1435 is selected at the state where contact Pe is closed, encryption processing unit 1406 encrypts public encryption key KPcard(1) and session key Ks1 using session key Ks from decryption processing unit 1404, and provides the decrypted keys to data bus BS3.

Cellular phone 101 provides data [KPcard(1), Ks1]Ks encrypted by encryption processing unit 1406 to content server 11 (step S112).

At server 31, decryption processing unit 318 decrypts data [KPcard(1), Ks1]Ks received by communication device 350 and applied onto data bus BS2 using session key Ks, whereby public encryption key KPcard(1) and session key Ks1 are decrypted and extracted (step S114).

Then, distribution control unit 312 obtains license key Kc from distribution information database 304 (step S116), and generates license ID data License-ID and user ID data User-ID based on the data stored in distribution information database 304 (step S118).

Encryption processing unit 320 receives license key Kc, license ID data License-ID and user ID data User-ID from distribution control unit 312 to apply an encryption process using public encryption key KPcard(1) applied from decryption processing unit 318 (step S120).

Encryption processing unit 322 receives the data encrypted by encryption processing unit 320, and further encrypts the received data using session key Ks1, and provides the encrypted data to data bus BS1 (step S122).

Communication device 350 transmits data [[Kc, License-ID, User-ID]Kcard(1)]Ks1 encrypted by encryption processing unit 322 to card 180.

Since switch 1435 is switched to the state where contact Pf is closed at card 180, decryption processing unit 1410 applies a decryption process using session key Ks1 from Ks1 generation unit 1432 to extract data [Kc, License-ID, User-ID]Kcard(1) (step S126). The extracted data is stored in memory 1412 (step S128).

At memory card 180, decryption processing unit 1416 decrypts the data [Kc, License-ID, User-ID]Kcard(1) stored in memory 1412. The decrypted data License-ID and User-ID are stored in register 1500 by controller 1420 (step S129).

Content server 11 obtains encrypted content data [Dc]Kc from distribution information database 304, and transmits the obtained data to memory card 180 via communication device 350 (step S130).

At memory card 180, the received encrypted content data [Dc]Kc is directly stored in memory 1412 (step S132).

By the above operation, memory card 180 attains a reproducible state of the content data.

Figure 30:
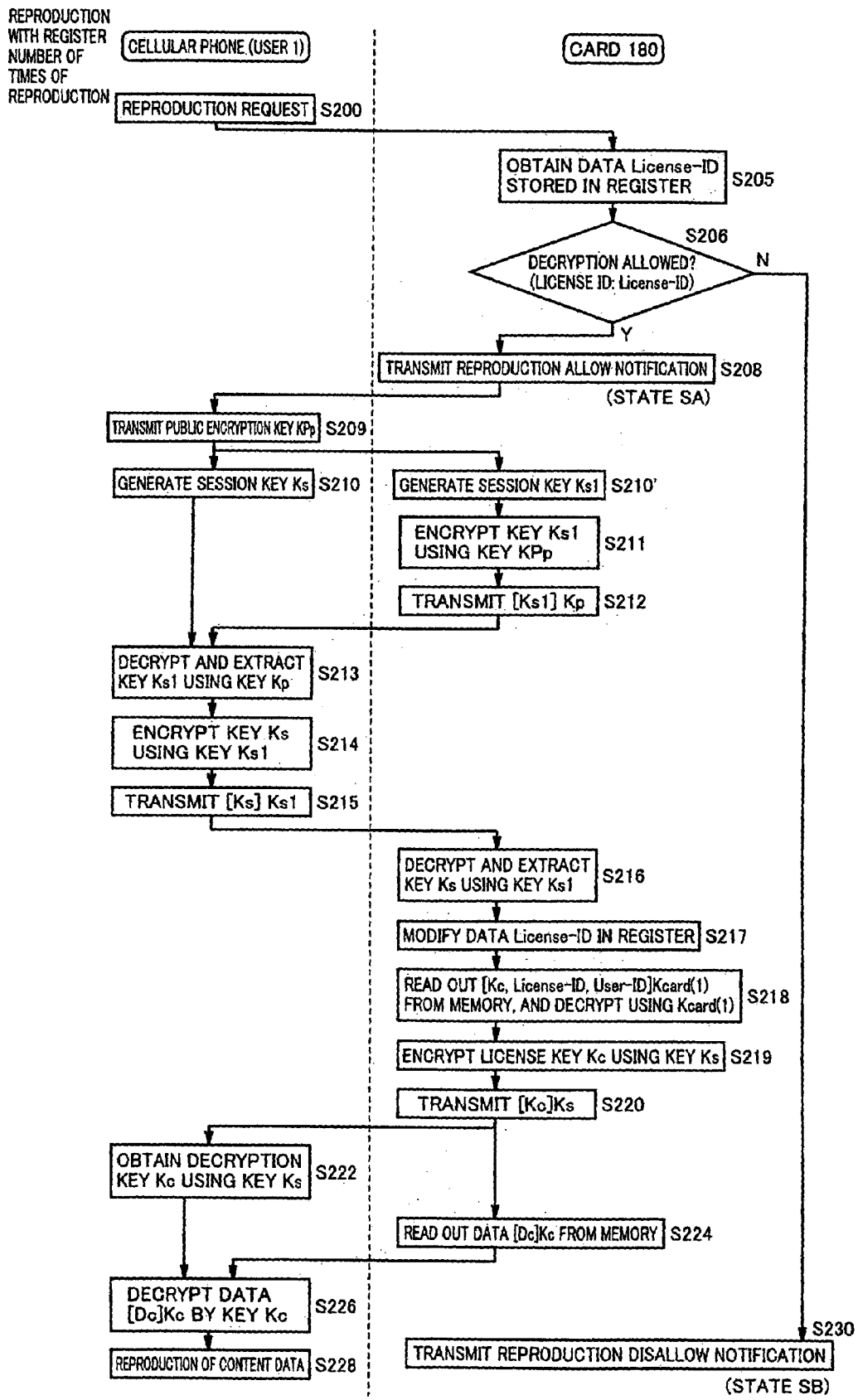
FIG. 30 is a flow chart describing a reproduction mode of decrypting encrypted content data and providing the same as music data output according to the seventh embodiment.

FIG. 30 is a flow chart to describe the process of decrypting content data from the encrypted content data stored in memory card 180 of the seventh embodiment in cellular phone 101 and reproducing the decoded data as music output.

Referring to FIG. 30, a reproduction request is issued towards memory card 180 by designation from user 1 through touch key 1108 of the cellular phone (step S200).

At memory card 180, controller 1420 reads out license ID data License-ID, user ID data User-ID and the like from register 1500 (step S205).

Controller 1420 determines whether the accumulated number of times of the reproduction process of content data (music data) specified by the data in license ID data License-ID has exceeded the upper limit of the reproducible number of times based on the information included in the decrypted license ID data License-ID (step S206). When determination is made that the reproducible number of times is not exceeded, a reproduction allow notification is transmitted towards controller 1106 of cellular phone 101 (step S208).

At cellular phone 101, public encryption key KPp is transmitted towards memory card 180. Session key circuit 1502 generates a session key Ks (step S210).

On the part of memory card 180, session key Ks1 is generated (step S210'). Session key Ks1 is encrypted using public encryption key KPp (step S211). Encrypted session key [Ks1]Kp is transmitted to cellular phone 101 (step S212).

At cellular phone 101, decryption processing unit 1522 decrypts encrypted session key [Ks1]Kp applied from memory card 180 via data bus BS2 using secret encryption key Kp, whereby session key Ks1 is extracted (step S213). Encryption processing unit 1504 encrypts session key Ks using session key Ks1 (step S214). Encrypted session key [Ks]Ks1 is output onto data bus BS2 (step S215).

Memory card 180 receives encrypted session key [Ks]Ks1 generated by cellular phone 101 via data bus BS3 to decrypt the same using session key Ks1, whereby session key Ks is extracted (step S216).

According to the conduction of a reproduction process, memory card 180 updates the data related to the accumulated number of reproduction processes in license ID data License-ID in register 1500 (step S217).

Then, memory card 180 reads out data [Kc, License-ID, User-ID]Kcard(1) encrypted from memory 1412. Decryption processing unit 1416 applies a decryption process to extract license key Kc (step S218).

Then, license key Kc is encrypted using the extracted session key Ks (step S219). Encrypted license key [Kc]Ks is applied to data bus BS2 (step S220).

Decryption processing unit 1506 of cellular phone 101 obtains license key Kc by applying a decryption process using session key Ks (step S222).

Then memory card 180 reads out encrypted content data [Dc]Kc from memory 1412, and provide the same to data bus BS2 (step S224).

Music reproduction unit 1508 of the cellular phone applies a decryption process on encrypted content data [Dc]Kc using extracted license key Kc (step S226). Content data is reproduced and applied to mixer unit 1510 (step S228).

When determination is made that a decryption process is not allowed by controller 1420 at step S206, memory card 180 issues a reproduction disallow notification to cellular phone 101 (step S230).

By the above structure, it is possible to limit the number of times the content data can be reproduced by the user even in the case where the memory card and cellular phone generate their own session keys.

Figure 31:
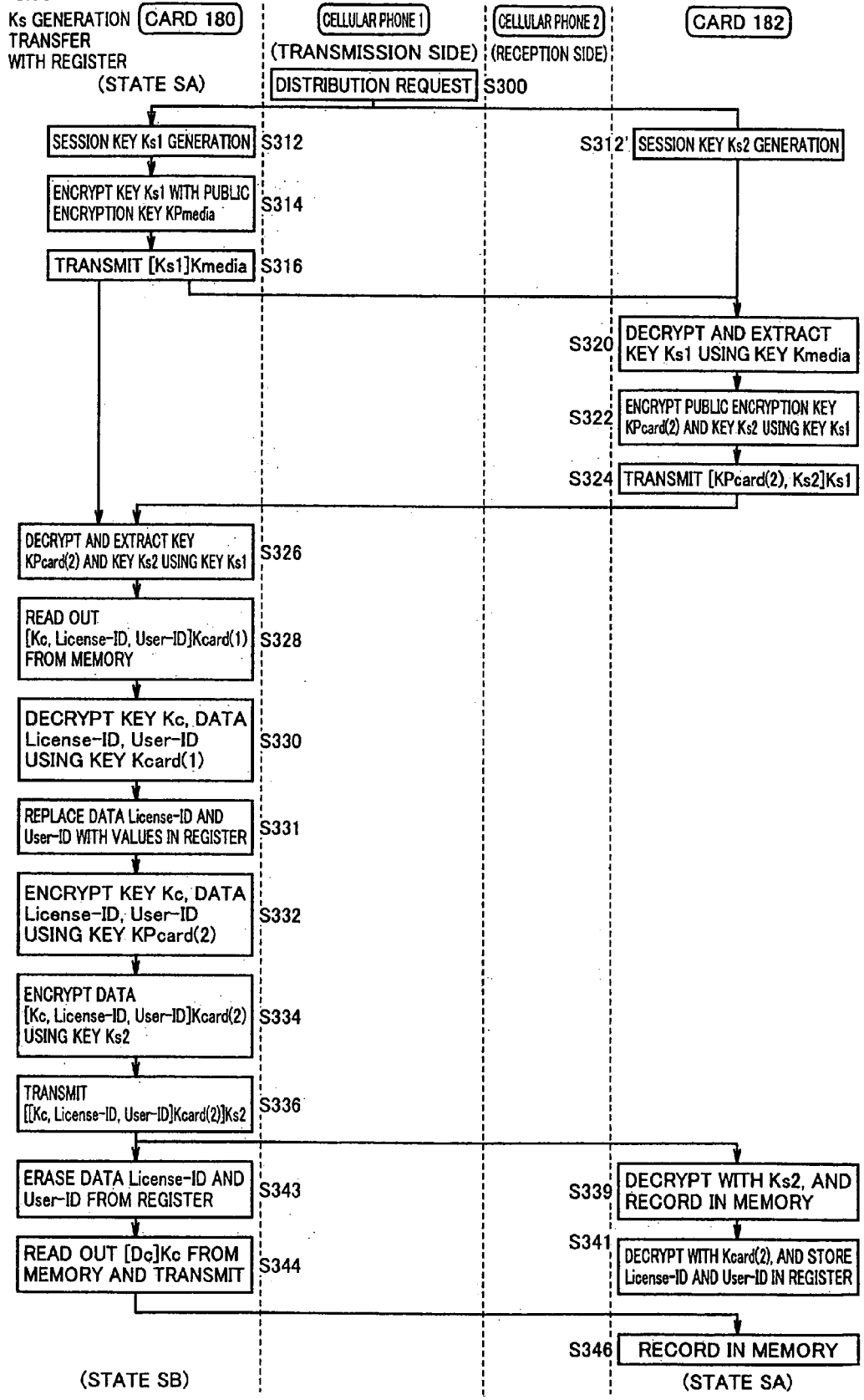
FIG. 31 is a flow chart to describe a mode of transferring content data and key data between two memory cards.

FIG. 31 is a flow chart to describe the process of transferring content data and key data and the like between two memory cards in the seventh embodiment.

Referring to FIG. 31, it is assumed that cellular phone 101 corresponds to the transmission side whereas cellular phone 103 having a similar structure corresponds to the reception side. It is also assumed that a memory card 182 having a structure similar to that of memory card 180 is loaded in cellular phone 103.

Cellular phone 101 issues a transfer request to its own memory card 180 and to memory card 182 inserted in cellular phone 103 of the reception side (step S300).

In response, session key generation circuit 1432 in memory card 180 at cellular phone 101 generates a session key Ks1 (step S312). At cellular phone 103, session key generation circuit 1432 in memory card 182 generates a session key Ks2 (step S312').

At cellular phone 101, encryption processing unit 1430 in memory card 180 encrypts session key Ks1 using public encryption key KPmedia (step S314). Encrypted session key [Ks]Kmedia is transmitted to memory card 182 via antenna 1102, for example, in a transceiver mode (step S316).

At memory card 182, decryption processing unit 1404 decrypts and extract session key Ks1 using private decryption key Kmedia (step S320). Public encryption key KPcard (2) and session key Ks2 of memory card 182 are encrypted using session key Ks1 (step S322). Encrypted data [KPcard (2), Ks2]Ks1 is transmitted to memory card 180 (step S324).

At memory card 180, decryption processing unit 1410 decrypts encrypted data transmitted from memory card 182 using session key Ks1. Public encryption key KPcard(2) and session key Ks2 of memory card 182 are decrypted and extracted (step S326). At this stage, switch 1435 has contact Pf closed, so that key Ks 1 from Ks 1 generation circuit 1432 is applied to decryption processing unit 1410.

At memory card 180, license key Kc, license ID data License-ID and user ID data User-ID are read out from memory card 1412 encrypted by public encryption key Kcard(1) of memory card 150 (step S328).

Then, decode processing unit 1416 uses private decryption key Kcard(1) to decrypt license key Kc, license ID data License-ID and user ID data User-ID (step S330).

Controller 1420 replaces the values of the decrypted license key Kc, license ID data License-ID and user ID data User-ID with the data values in register 1500 (step S331).

Encryption processing unit 1414 further encrypts license key Kc, license ID data License-ID and user ID data User-ID using public encryption key KPcard(2) of card 182 extracted by decryption processing unit 1410 (step S332).

The data encrypted by encryption processing unit 1414 is further applied to encryption processing unit 1406 via switch 1409 (contact Pd closed). Encryption processing unit 1406 encrypts data [Kc, License-ID, User-ID]Kcard(2) using session key Ks2 of memory card 182 (step S334). Here, switch 1435 has contact Pg closed, so that session key Ks2 from decryption processing circuit 1410 is applied to encryption processing unit 1406.

Then, memory card 180 transmits encrypted data [[Kc, License-ID, User-ID]Kcard(2)]Ks2 to memory card 152 via cellular phone 101 (step S336).

At memory card 182, decryption processing unit 1410 decrypts the data transmitted from memory card 180 based on session key Ks2, and stores the decrypted data in memory 1412 (step S339). Memory card 182 decrypts data [Kc, License-ID, User-ID]Kcard(2) using license key Kcard(2), and stores the decrypted license Id data License-ID and user ID data User-ID in register 1500 (step S341).

Memory card 180 erases license ID data License-ID and user ID data User-ID from register 1500 (step S343).

Then, memory card 180 reads out encrypted content data [Dc]Kc from the memory, and transmits the same to memory card 182 (step S344).

Memory card 182 stores the received encrypted content data directly into memory 1412 (step S346).

By the above process, license key Kc, license ID data License-ID and user ID data User-ID and the like are erased from memory card 180 at step S342. Therefore, memory card 180 attains "state SB".

Since all the data in addition to the encrypted content data such as license data Kc, license ID data License-ID and user ID data User-ID are transferred in memory card 182, memory card 182 attains "state SA".

By the above structure, data transfer from memory card 180 to memory card 182 can be carried out through an interface apparatus that can be connected between the memory cards without using the cellular phone with session key generation circuit 1502 as described above. There is the advantage of the convenience of the user being further improved.

Furthermore, since license ID data License-ID and the like are stored in register 1500 which can be referred to by controller 1420, the amount of processing required for the operation can be reduced.

The communication security can further be improved since the session key differs between each cellular phone and memory card.

Regarding license ID data License-ID in the reproduction information that restricts the number of times of reproduction in a transfer mode, license ID data License-ID stored in memory 1412 recorded with the number of reproduction times is modified to license ID data License-ID in register 1500 that is altered each time reproduction is conducted, resulting in new reproduction information. Accordingly, even if content data is transferred between memory cards, it is possible to prevent the number of times of reproduction of content data that is limited from exceeding the limited number of times of reproduction determined at the time of distribution.

Eighth Embodiment

A cellular phone 105 and a memory card 190 of the eighth embodiment of the present invention differ in structure from those of cellular phone 101 and memory card 180 of the seventh embodiment as set forth below.

Cellular phone 105 of the eighth embodiment includes means for recording and storing, in registering cellular phone 105 in an administration section such as the authentication mechanism of the distribution system, a public encryption key KPp assigned to cellular phone 105 and authentication data Crtf in a form encrypted by a public decryption key (public authentication key) KPmaster.

Similarly, memory card 190 of the eighth embodiment has the means for recording and storing, in registering memory card 190 in an administration section of the authentication mechanism of the distribution system, a public encryption key KPmedia and authentication data Crtf assigned to memory card 190 in a form encrypted by a public decryption key (public authentication key) KPmaster.

Here, memory card 190 and content server 120 of the eighth embodiment includes means for recording and storing this public decryption key (public authentication key) KPmaster. This public decryption key (public authentication key) KPmaster is a key common to the system used in verifying the authenticity of the apparatuses that conduct data output in the system with respect to each other as to the transfer of a session key and obtaining a secret key used in transmitting a session key to the other party.

The structure of cellular phone 105, memory card 190 and content server 12 of the eighth embodiment will be described in further detail hereinafter.

Figure 32:
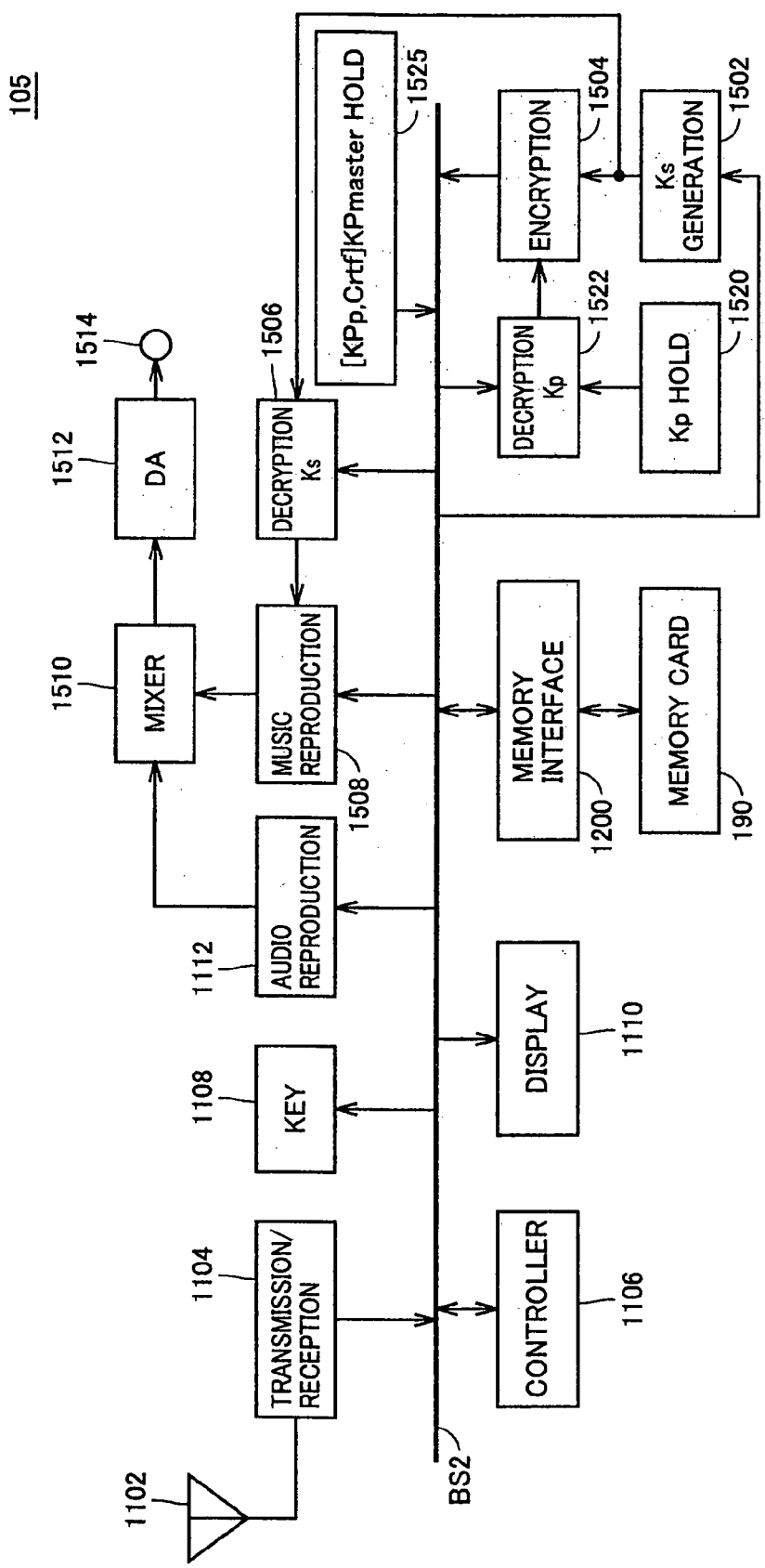
FIG. 32 is a schematic block diagram to describe a structure of a cellular phone 105 according to an eighth embodiment.

FIG. 32 is a schematic block diagram to describe the structure of cellular phone 105 of the eighth embodiment.

Cellular phone 105 differs in structure from cellular phone 101 of FIG. 26 in that a [KPp, Crtf]KPmaster hold unit 1525 is provided instead of KPp hold unit 1524 to store public encryption key and authentication data Crtf encrypted by public decryption key (public authentication key) KPmaster.

The remaining elements of cellular phone 105 are similar to those of cellular phone 101 of the seventh embodiment shown in FIG. 26. Corresponding components have the same reference characters allotted, and their description will not be repeated.

Figure 33:
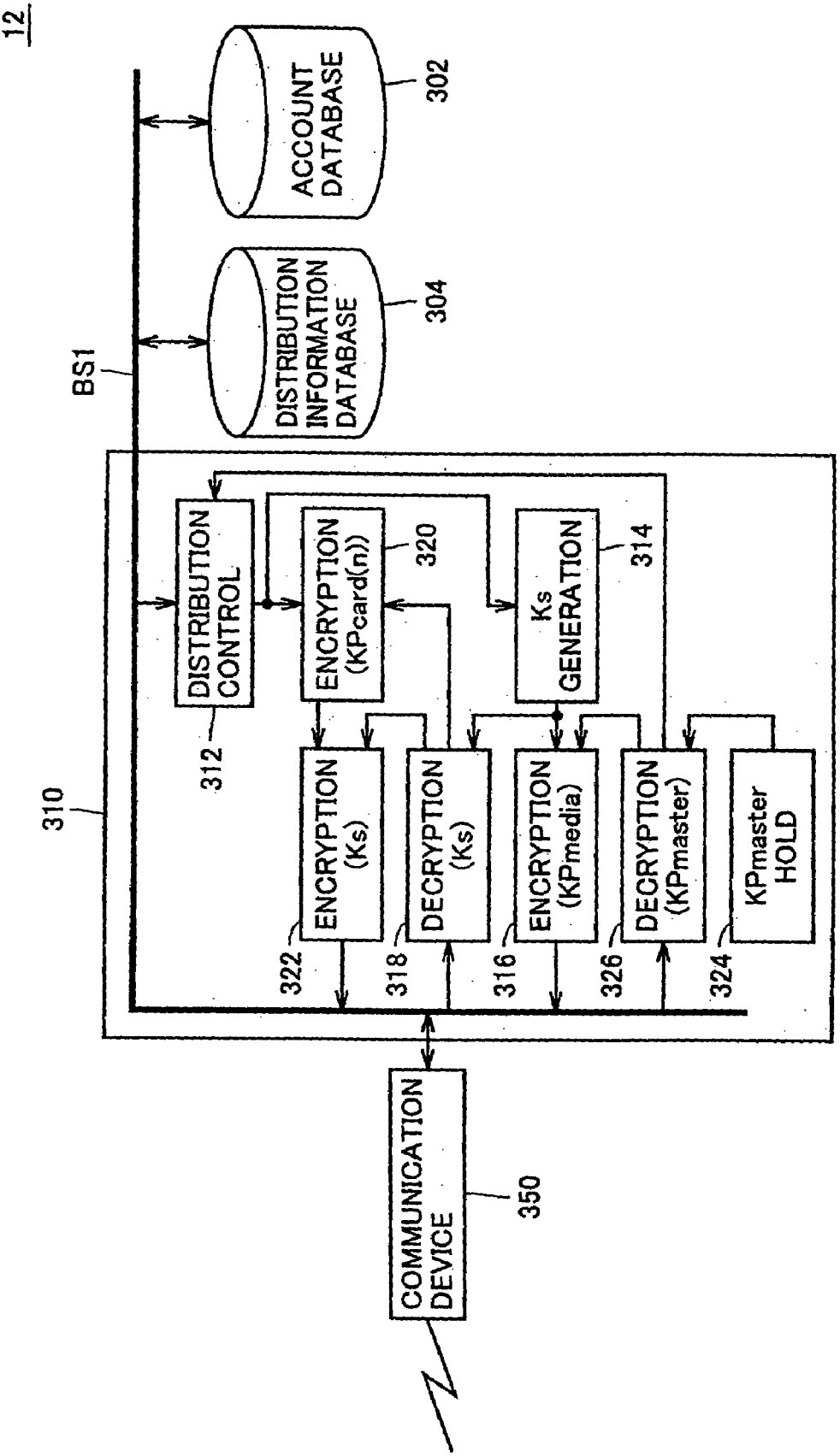
FIG. 33 is a schematic block diagram showing a structure of a content server 120 corresponding to a memory card 190 of the eighth embodiment.

FIG. 33 is a schematic block diagram showing a structure of content server 12 corresponding to memory card 190 of the eighth embodiment. Content server 12 differs in structure from content server 11 of FIG. 27 in that data processing unit 310 further includes a KPmaster hold unit 324 storing a public decryption key KPmaster, and a decryption processing unit 326 to decrypt data applied onto data bus BS1 from the communication network through communication device 350, based on public decryption key KPmaster output from KPmaster hold unit 324. Encryption processing unit 316 encrypts section key Ks generated at Ks generation unit 314 using public encryption key KPmedia extracted by the decryption process at decryption processing unit 326. Distribution control unit 312 conducts authentication whether the memory card requesting distribution is a proper memory card based on authentication data Crtf extracted by the decryption process at decryption processing unit 326.

The remaining elements of content server 12 are similar to those of content server 11 of the seventh embodiment shown in FIG. 27. Corresponding components have the same reference characters allotted, and description thereof will not be repeated.

Figure 34:
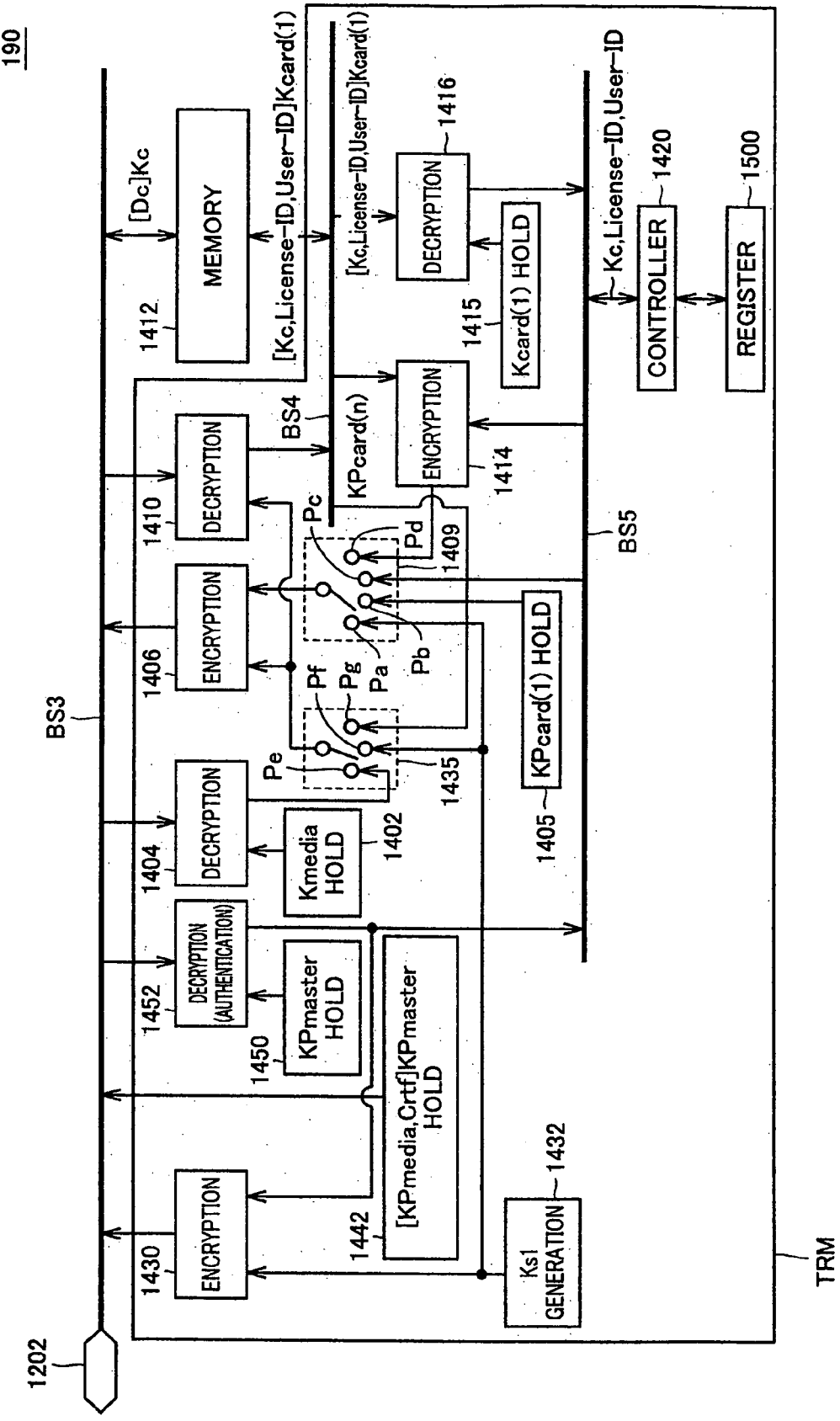
FIG. 34 is a schematic block diagram to describe a structure of memory card 190 according to the eighth embodiment of the present invention.

FIG. 34 is a schematic block diagram to describe the structure of memory card 190 of the eighth embodiment, comparable to FIG. 28 of the seventh embodiment.

Memory card 190 of the eighth embodiment differs in structure from memory card 180 of the seventh embodiment in that a [KPmedia, Crtf]KPmaster hold unit 1442 is provided. [KPmedia, Crtf]KPmaster hold unit 1442 records and stores public encryption key KPmedia and authentication data Crtf in a form encrypted by public decryption key (public authentication key) KPmaster. Furthermore, switch 1436 is omitted, so that the output of [KPmedia, Crtf] KPmaster hold unit 1442 is applied directly onto data bus BS3.

Memory card 190 further includes a KPmaster hold unit 1450 to record and store a public decryption key KPmaster, and a decryption processing unit 1452 to decrypt data on data bus BS3 based on public decryption key KPmaster output from KPmaster hold unit 1450.

As to public encryption key KPmedia and authentication data Crtf extracted by the decryption process of decryption processing unit 1452, public encryption key KPmedia is applied to encryption processing unit 1430 whereas authentication data Crtf is applied to controller 1420 via data bus BS5.

The remaining structure of the memory card 190 is similar to memory card 180 of FIG. 28. Corresponding components have the same reference characters allotted, and description thereof will not be repeated.

Figure 35:
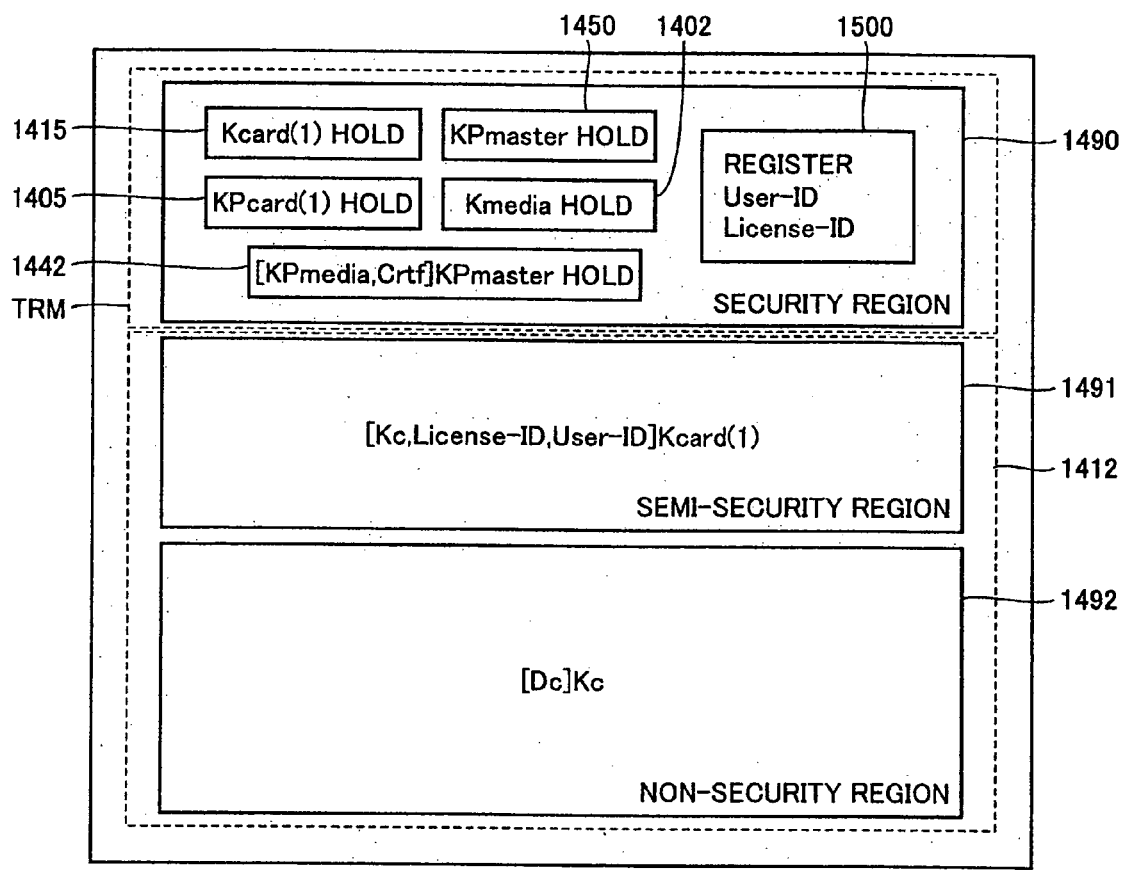
FIG. 35 is a schematic diagram showing an arrangement of a recording region of memory card 190 of the eighth embodiment.

FIG. 35 is a schematic diagram showing a structure of the recording space in memory card 190 of FIG. 34. Memory card 190 includes a security region 1490 formed of a TRM module, administered uniquely by the memory card so that the user cannot rewrite or read out the contents arbitrarily, and has the internal data destroyed in response to an improper opening process, a semi-security region 1491 having data encrypted and recorded through encryption unique to the memory card, i.e., encryption using public encryption key KPcard(1), so that data rewriting cannot be carried out arbitrarily, while allowing the user to confirm the presence of the data, and a non-security region 1492 where the contents can be read out and rewritten arbitrarily by the user.

Security region 1490 includes key hold units storing the keys obtained from the time of shipment of memory card 190, i.e., a Kmedia hold unit 1402, a KPcard(1) hold unit 1405, a Kcard(1) hold unit 1415, a [KPmedia, Crtf]KPmaster hold unit 1442, a KPmaster hold unit 1450, and a register 1500 where license information in plaintext is stored.

Semi-security region 1491 is provided in memory 1412, and stores encrypted data[Kc, License-ID, User-ID]Kcard (1) unique to memory card 1900.

Non-security region 1493 is provided in memory 1412, and stores encrypted content data [Dc]Kc. Thus, a structure is implemented in which encrypted content data [Dc]Kc can be replicated arbitrarily while data required for reproduction cannot be replicated. Even if the license information stored in semi-security region 1491 is replicated to another memory card, the encryption on public encryption key KPcard(1) unique to memory card 1900 cannot be replicated with another memory card that does not have the corresponding secret code key Kcard(1).

Although description is provided so that all the key hold units are provided in the security region, only Kmedia hold unit 1402 and Kcard(1) hold unit 1415 storing private decryption keys need to be arranged in the security region. The keys stored in the other key hold units may be arranged in a ROM (Read Only Memory) that can be referred to from an external source.

Figure 36:
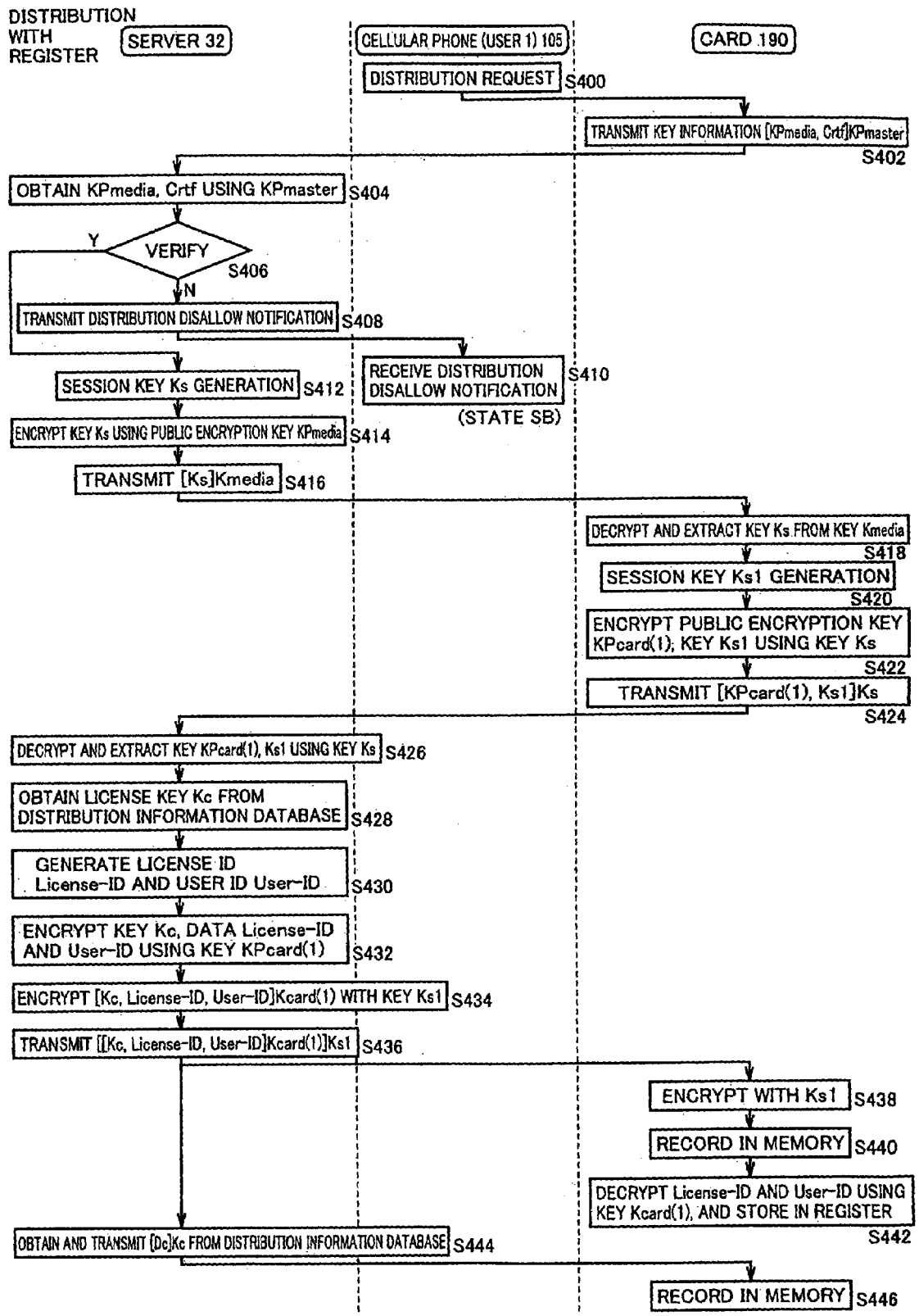
FIG. 36 is a flow chart to describe a distribution mode using memory card 190 of FIG. 35.

FIG. 36 is a flow chart to describe the distribution mode using memory card 190 described with reference to FIG. 35.

FIG. 36 corresponds to the operation where user 1 receives content distribution from content server 12 using memory card 190.

First, a distribution request is issued from cellular phone 105 of user 1 to memory card 190 through operation of touch panel 1108 by the user (step S400).

Memory card 190 transmits encrypted data [KPmedia, Crtf]KPmaster towards content server 12 via cellular phone 105 from [KPmedia, Crtf]KPmaster hold unit 1442 (step S402).

Upon receiving encrypted data [KPmedia, Crtf]KPmaster at content server 12, decryption processing unit 326 applies a decryption process based on public decryption key KPmaster stored in KPmaster hold unit 324, whereby public encryption key KPmedia and authentication data Crtf are obtained (step S404).

At content server 12, authentication of memory card 190 is conducted using authentication data Crtf (step S406). When the authenticity of memory card 190 is verified, control proceeds to S412. When the authenticity of memory card 190 is not verified, content server 12 transmits a distribution disallow notification (step S408). Cellular phone 105 receives the distribution disallow notification (step S410).

When the authenticity of memory card 190 is verified, session key generation unit 314 of content server 12 generates a session key Ks (step S412).

At content server 12, encryption processing unit 316 in content server 12 encrypts session key Ks using public encryption key KPmedia and provides the encrypted key onto data bus BS1 (step S414).

Communication device 350 transmits encrypted session key [Ks]Kmedia from encryption processing unit 316 to memory card 190 of cellular phone 105 through the communication network (step S416).

At memory card 190, decryption processing unit 1404 decrypts the reception data from data bus BS3 via memory interface 1200 using private decryption key Kmedia, whereby session key Ks is decrypted and extracted (step S418). Then, Ks1 generation unit 1432 of memory card 190 generates session key Ks1 (step S420).

Since switch 1409 has contact Pb closed in a distribution mode, encryption processing unit 1406 receives public encryption key KPcard(1) applied from KPcard(1) hold unit 1405 via contact Pb. Then, switch 1409 has contact Pa closed, so that encryption processing unit 1406 receives session key Ks1 from Ks1 generation unit 4132 through contact Pa. Since switch 1435 has contact Pe closed, encryption processing unit 1406 encrypts public encryption key KPcard(1) and session key Ks1 using session key Ks from decryption processing unit 1404, and provides the same to data bus BS3 (step S422).

Data [KPcard(1), Ks1]Ks encrypted by encryption processing unit 1406 is transmitted to content server 12 via cellular phone 105 (step S424).

At content server 12, decryption processing unit 318 decrypts data [KPcard(1), Ks 1]Ks applied to data bus BS1, received by communication device 350 using session key Ks, whereby public encryption key KPcard(1) and session key Ks1 are decrypted and extracted (step S426).

Then, distribution control unit 312 obtains license key Kc from distribution information database 304 (step S428), and generates data such as license ID data License-ID and user ID data User-ID based on the data stored in distribution information database 304 (step S430).

Encryption processing unit 320 receives data such as license key Kc, license ID data License-ID and user ID data User-ID from distribution control unit 312 to apply an encryption process using public encryption key KPcard(1) applied from decryption processing unit 318 (step S432).

Encryption processing unit 322 receives the data encrypted by encryption processing unit 320 to further encrypt the same using session key Ks1. The encrypted data is applied to data bus BS1 (step S434).

Communication device 350 transmits to memory card 190 data [[Kc, License-ID, User-ID]Kcard(1)]Ks1 encrypted by encryption processing unit 322 (step S436).

Since switch 1435 has contact Pf closed at memory card 190, decryption processing unit 1410 applies a decryption process using session key Ks1 from Ks1 generation unit 1432, whereby data [Kc, License-ID, User-ID]Kcard(1) is extracted (step S438), and stored in memory 1412 (step S440).

At memory card 190, decryption processing unit 1416 decrypts data [Kc, License-ID, User-ID]Kcard(1) stored in memory 1412. The decrypted data License-ID and User-ID are stored in register 1500 by controller 1420 (step S442).

Content server 12 obtains encrypted content data [Dc]Kc from distribution information database 304, and transmits the same to memory card 180 via communication device 350 (step S444).

At memory card 190, the received encrypted content data [Dc]Kc is directly stored in memory 1412 (step S446).

By the above operation, memory card 190 attains a state in which content data can be reproduced.

Figure 37:
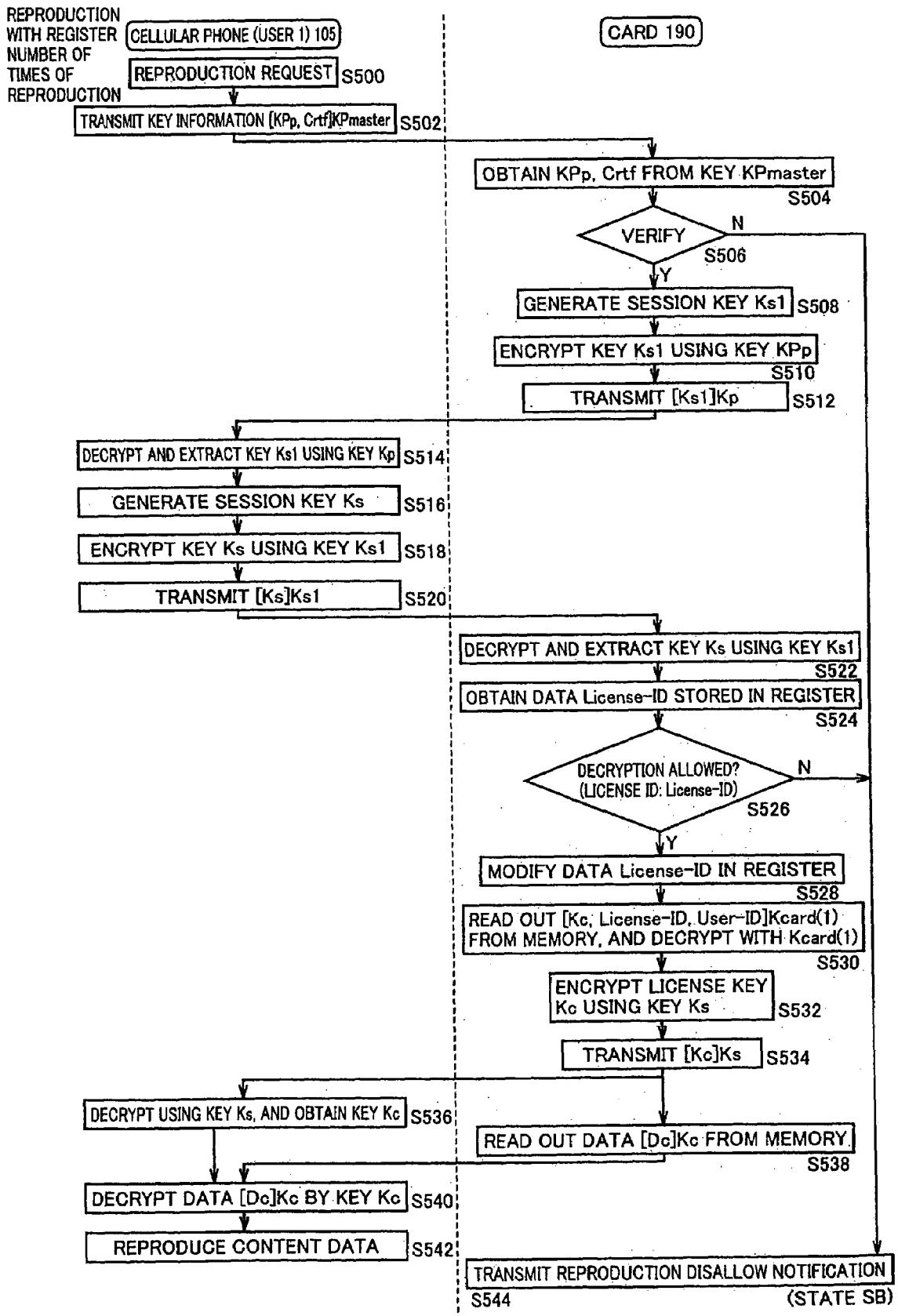
FIG. 37 is a flow chart describing a reproduction mode of providing music output from encrypted content data stored in memory card 190.

FIG. 37 is a flow chart to describe a reproduction mode of decoding content data from encrypted content data stored in memory card 190 of the eighth embodiment, and reproducing the same as music output in cellular phone 105.

Referring to FIG. 37, upon application of a reproduction request to cellular phone 105 by designation from user 1 through keyboard 1108 of the cellular phone (step S500), encrypted data [KPp, Crtf]KPmaster is transmitted to memory card 190 from cellular phone 105 (step S502).

At memory card 190, public encryption key KPp and authentication data Crtf are obtained by the decryption process using public decryption key KPmaster at decryption processing unit 1452 (step S504). Controller 1420 conducts authentication whether cellular phone 105 is a proper apparatus or not based on authentication data Crtf (step S506). When the authenticity of cellular phone 105 is verified, control proceeds to step S508. When cellular phone 105 is not verified as a proper apparatus, a reproduction disallow notification is transmitted to cellular phone 105 (step S544).

When the authenticity of cellular phone 105 is verified (step S506), session key generation unit 1432 generates a session key Ks1 (step S508). Encryption processing unit 1430 encrypts session key Ks1 based on public encryption key KPp from decryption processing unit 1452 (step S510). Encrypted session key [Ks1]Kp is transmitted from memory card 190 to cellular phone 105 (step S512).

At cellular phone 105, session key Ks1 is decrypted and extracted by the decryption process of decryption processing unit 1522 (step S514). Then, session key Ks is generated at session key generation unit 1502 (step S516). Encryption processing unit 1504 encrypts key Ks using session key Ks1 (step S518). Encrypted session key [Ks]Ks1 is transmitted to memory card 190 from cellular phone 105 (step S520).

At memory card 190, decryption processing unit 1410 applies a decryption process on encrypted session key [Ks]Ks1 using session key Ks1, whereby session key Ks is extracted (step S522). At memory card 190, controller 1420 reads out license ID data License-ID, user ID data User-ID, and the like from register 1500 (step S524).

Controller 1420 determines whether the accumulated number of reproduction processes of content data (music data) specified by the data in license ID data License-ID has exceeded the upper limit of the number of reproducible times based on the information included in decrypted license ID data License-ID (step S526). When determination is made that the reproducible number of times has not yet being exceeded, memory card 190 updates the data related to the accumulated number of reproduction processes in license ID data License-ID in register 1500 in response to a conduction of a reproduction process (step S528).

Then, memory card 190 reads out [Kc, License-ID, User-ID]Kcard(1) from memory 1412. Decryption processing unit 1416 applies a decryption process, whereby license key Kc is extracted (step S530).

Then, using session key Ks extracted at step S522, license key Kc is encrypted (step S532). The encrypted license key [Kc]Ks is applied to data bus BS2 (step S534).

Decryption processing unit 1506 of cellular phone 105 applies a decryption process using session key Ks to obtain license key Kc (step S536).

Then, memory card 190 reads out encrypted content data [Dc]Kc from memory 1412, and provides the read out data to data bus BS2 (step S538).

Music reproduction unit 1508 of the cellular phone decrypts encrypted content data [Dc]Kc using the extracted license key Kc. The content data is reproduced and applied to mixer unit 1510 (step S542).

When determination is made that a decryption process is not allowed by controller 1420 at step S526, memory card 190 sends a reproduction disallow notification to cellular phone 105 (step S544).

By the above structure, the number of times the user can reproduce the content data can be limited even in the case where the memory card and cellular phone generate their own unique session keys.

Figure 38:
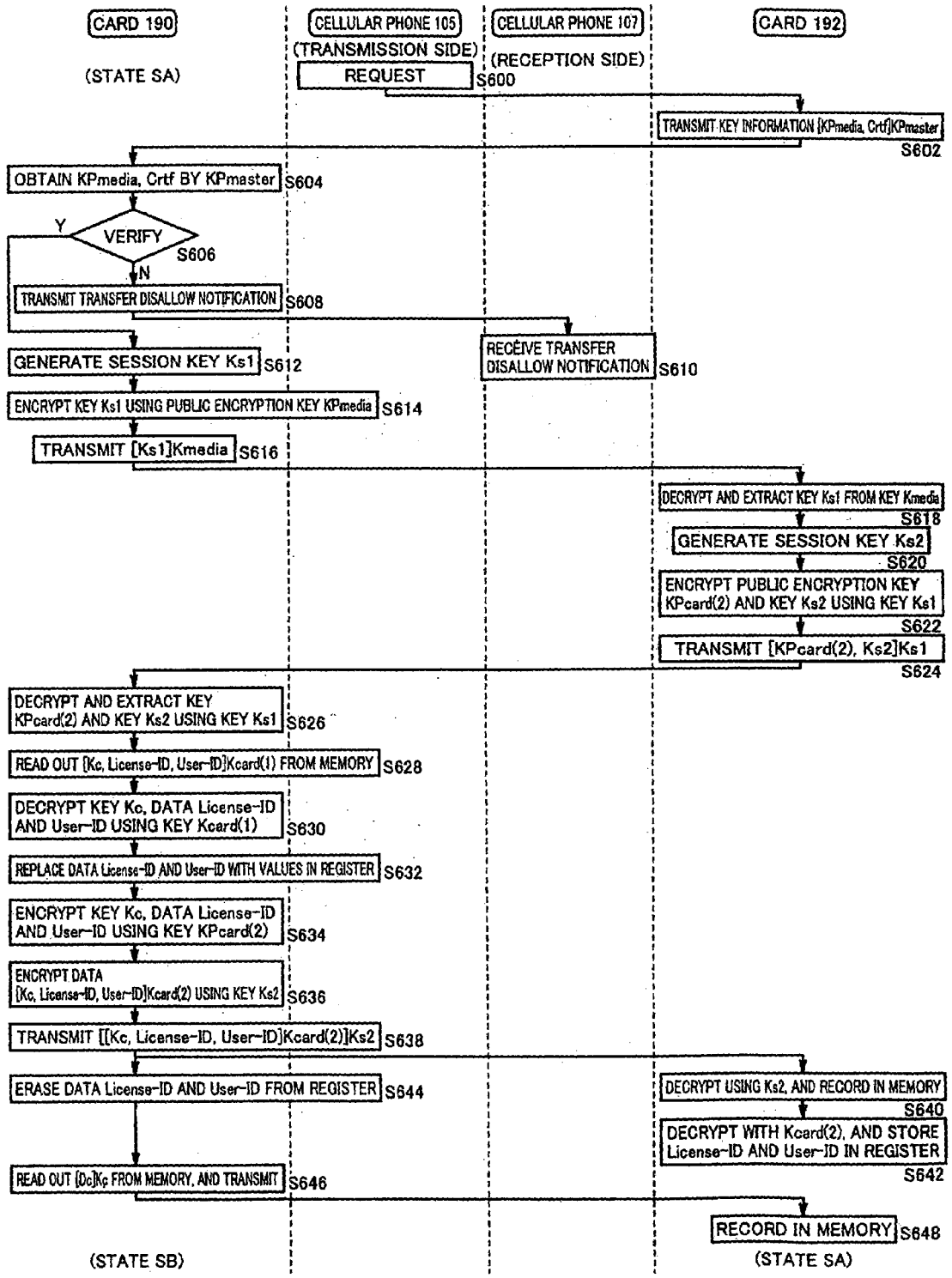
FIG. 38 is a flow chart to describe a transfer process between two memory cards of the eighth embodiment.

FIG. 38 is a flow chart to describe the process of transferring content data and key data between two memory cards in the eighth embodiment.

It is assumed that cellular phone 105 corresponds to the transmission side whereas cellular phone 107 corresponds to the reception side in FIG. 38. It is also assumed that a memory card 192 having a structure similar to that of memory card 190 is loaded in cellular phone 107.

First, cellular phone 105 issues a transfer request to memory card 192 inserted in cellular phone 107 of the reception side (step S600).

In response, memory card 192 loaded in cellular phone 107 transmits encrypted data [KPmedia, Crtf]KPmaster to memory card 190 (step S602).

When memory card 190 receives encrypted data [KPmedia, Crtf]KPmaster, decryption processing unit 1452 applies a decryption process based on public decryption key KPmaster stored in KPmaster hold unit 1450, whereby public encryption key KPmedia and authentication data Crtf are obtained (step S604).

At memory card 190, authentication of memory card 192 is conducted using authentication data Crtf (step S606). When the authenticity of memory card 192 is verified, control proceeds to S612. When the authenticity of memory card 190 is not verified, memory card 190 sends a transfer disallow notification (step S608). Cellular phone 107 receives the transfer disallow notification (step S610).

When the authenticity of memory card 192 is verified, session key generation unit 1432 at memory card 190 generates a session key Ks1 (step S612).

At memory card 190, encryption processing unit 1430 encrypts session key Ks1 using public encryption key KPmedia, and provides the encrypted key to data bus BS3 (step S614).

Encrypted session key [Ks]Kmedia from encryption processing unit 1430 is transmitted from memory card 190 towards memory card 192 of cellular phone 107 via cellular phone 105 (step S616).

At memory card 192, decryption processing unit 1404 applies a decryption process on the reception data applied to data bus BS3 via memory interface 1200 using private decryption key Kmedia, whereby session key Ks is decrypted and extracted (step S618). At memory card 192, a Ks2 generation unit 1432' having a structure similar to that of Ks1 generator 1432 generates a session key Ks2 (step S620).

Since switch 1409 has contact Pb closed at memory card 192, encryption processing unit 1406 receives public encryption key KPcard(1) from KPcard(1) hold unit 1405 via contact Pb. Then, switch 1409 has contact Pa closed. Encryption processing unit 1406 receives session key Ks2 applied from Ks2 generation unit 1432' via contact Pa. Since switch 1435 has contact Pe closed, encryption processing unit 1406 encrypts public encryption key KPcard(1) and session key Ks2 using session key Ks1 from decryption processing unit 1404 and applies the encrypted keys to data bus BS3 (step S622).

Data [KPcard(1), Ks2]Ks1 encrypted by encryption processing unit 1406 is transmitted to memory card 190 via cellular phone 107 (step S624).

At memory card 190, decryption processing unit 1410 decrypts the encrypted data transmitted from memory card 192 using session key Ks1, whereby public encryption key KPcard(2) and session key Ks2 of memory card 192 are decrypted and extracted (step S626). Here, switch 1435 has contact Pf closed. Key Ks1 from Ks1 generation circuit 1432 is applied to decryption processing unit 1410.

Then, at memory card 190, license key Kc, license ID data License-ID and user ID data User-ID encrypted by public encryption key Kcard(1) of memory card 190 are read out from memory 1412 (step S628).

Then, at memory card 190, decryption processing unit 1416 decrypts license key Kc, license ID data License-ID and user ID data User-ID using private decryption key Kcard(1) (step S630).

Controller 1420 of memory card 190 replaces the values of the decrypted license key Kc, license ID data License-ID and user ID data User-ID with the data values in register 1500 (step S632).

Encryption processing unit 1414 of memory card 190 further encrypts license key Kc, license ID data License-ID and user ID data User-ID using public encryption key KPcard(2) of memory card 192 extracted by decryption processing unit 1410 (step S634).

The data encrypted by encryption processing unit 1414 of memory card 190 is applied to encryption processing unit 1406 via switch 1409 (contact Pd closed). Encryption processing unit 1406 encrypts data [Kc, License-ID, User-ID]Kcard(2) using session key Ks2 of memory card 192 (step S636). Here, switch 1435 has contact Pg closed. Session key Ks2 from decryption processing circuit 1410 is applied to encryption processing unit 1406.

Then, memory card 190 transmits the encrypted data [[Kc, License-ID, User-ID]Kcard(2)]Ks2 towards memory card 192 via cellular phone 105 (step S638).

At memory card 192, decryption processing unit 1410 decrypts the data transmitted from memory card 190 using session key Ks2. The decrypted data is stored in memory 1412 (step S640). Memory card 192 further decrypts data [Kc, License-ID, User-ID]Kcard(2) using license key Kcard (2). The decrypted license key Kc, license ID data License-ID and user ID data User-ID are stored in register 1500 (step S642).

Memory card 190 erases license ID data License-ID and user ID data User-ID from register 1500 (step S644).

Then, memory card 190 reads out encrypted content data [Dc]Kc from memory 1412, and transmits the read out data to memory card 192 (step S646).

Memory card 192 stores the received encrypted content data directly in memory 1412 (step S648).

By the above process, license key Kc, license ID data License-ID and user ID data User-ID and the like are erased from memory card 190 at step S644. Therefore, memory card 190 is in "state SB".

Memory card 192 has all data in addition to encrypted content data such as license key Kc, license ID data License-ID and user ID data User-ID transferred. Therefore, memory card 192 is in "state SA".

Similar to the seventh embodiment, license ID data License-ID and the like are stored in register 1500, which can be referred to by controller 1420. Therefore the processing amount required for operation can be reduced.

Furthermore, since the session key differs for each cellular phone and memory card, the communication security is further improved.

Regarding license ID data License-ID in the reproduction information that restricts the number of times of reproduction in a transfer mode, license ID data License-ID stored in memory 1412 recorded with the number of reproduction times is modified to license ID data License-ID in register 1500 that is altered each time reproduction is conducted, resulting in new reproduction information. Accordingly, even if content data is transferred between memory cards, it is possible to prevent the number of times of reproduction of content data that is limited from exceeding the limited number of times of reproduction determined at the time of distribution.

Ninth Embodiment

Figure 39:
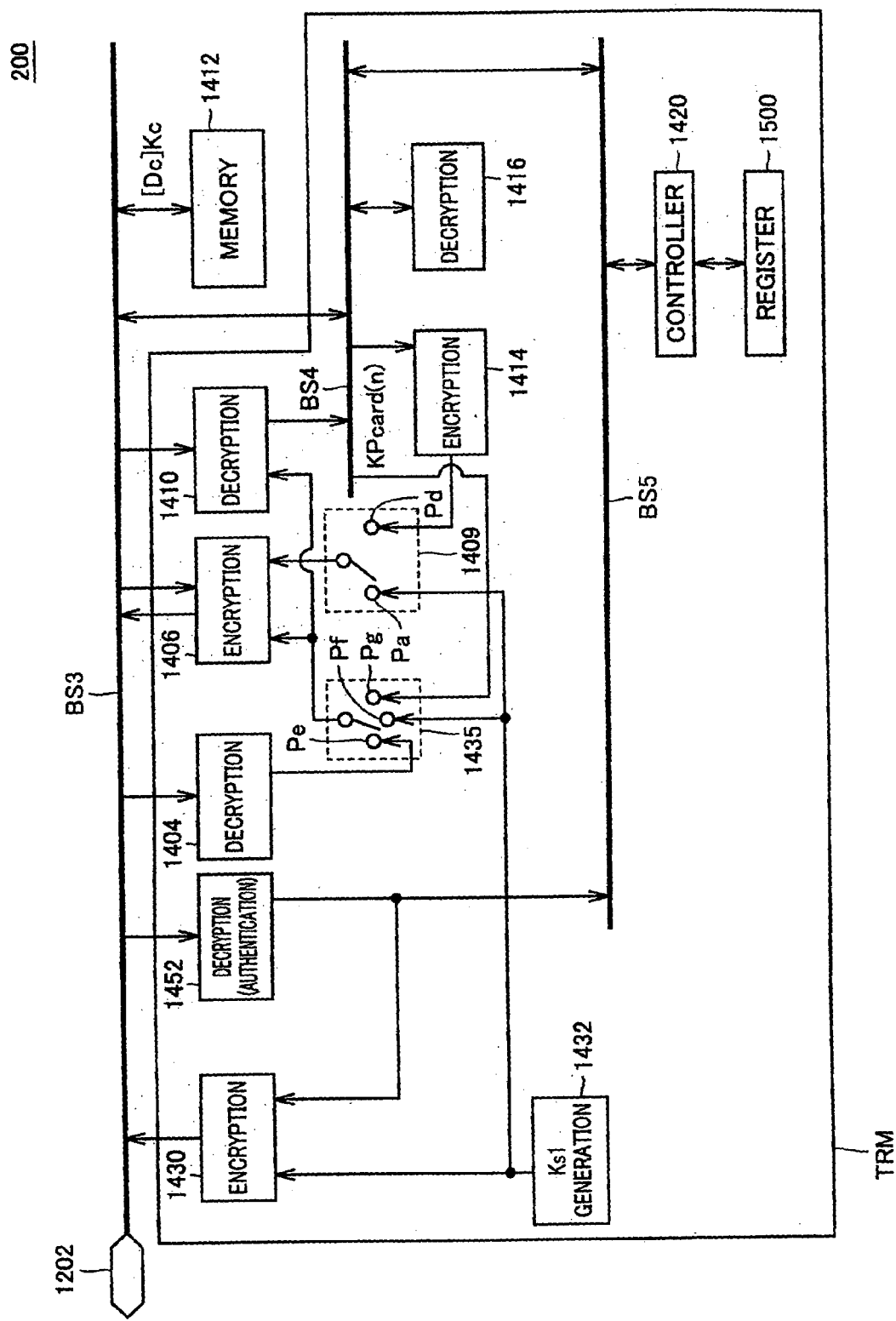
FIG. 39 is a schematic block diagram showing a structure of a memory card 200 of a ninth embodiment.

FIG. 39 is a schematic block diagram of a structure of a memory card 200 of the ninth embodiment.

Memory card 200 of the ninth embodiment differs in structure from memory card 190 of the eighth embodiment as set forth below.

Specifically, memory card 200 of the ninth embodiment has, in the structure of memory card 190 of the eighth embodiment, Kmedia hold unit 1402, KPcard(1) hold unit 1405, Kcard(1) hold unit 1415, [KPmedia, Crtf]KPmaster hold unit 1442, KPmaster hold unit 1450 and register 1500 provided in a predetermined region in memory 1412. Accordingly, switch 1409 is absent of contacts Pb and Pc. Direct data transfer between data bus BS4 and memory 1412 is not carried out. Data is transferred only between memory 1412 and data bus BS3. Data bus BS4 sends/receives data to/from memory 1412 via data bus BS3.

Figure 40:
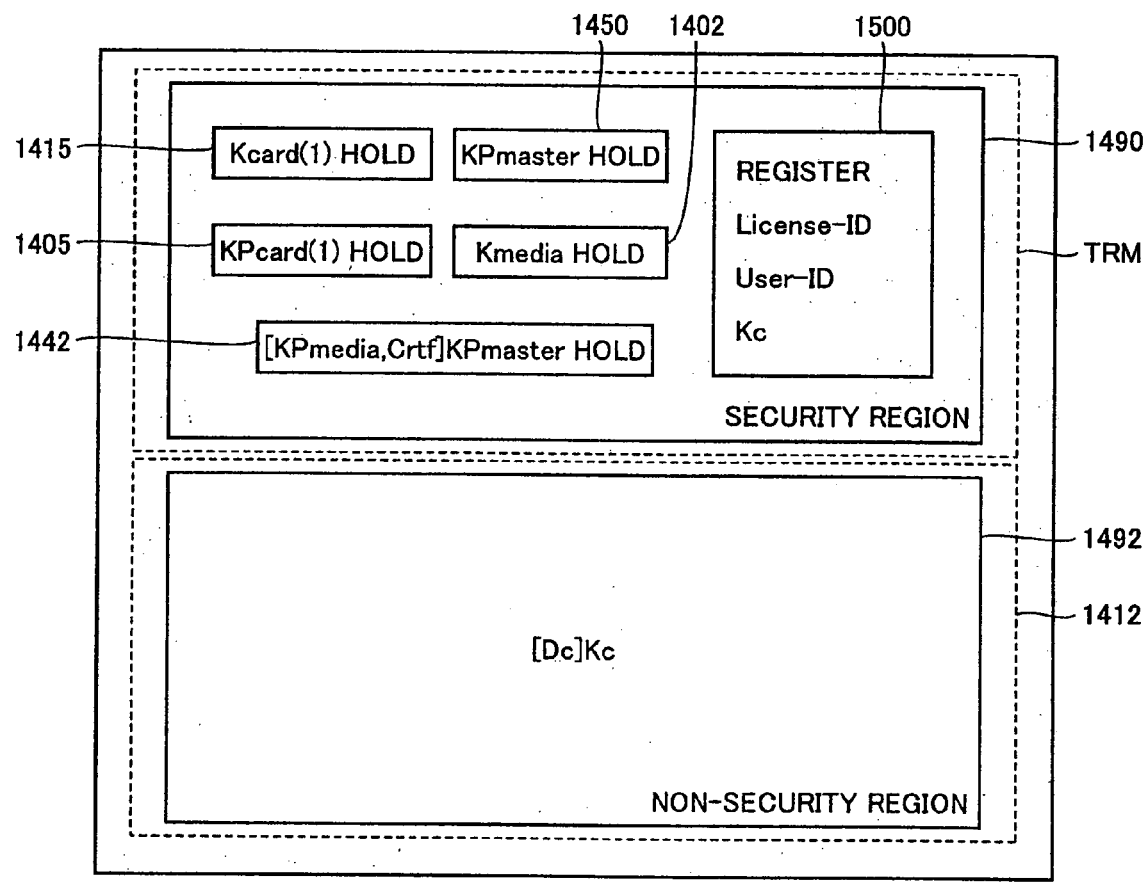
FIG. 40 is a schematic block diagram showing an arrangement of a recording region in memory card 200 of the ninth embodiment.

FIG. 40 is a schematic diagram showing a structure of the recording space in memory card 200 of FIG. 39. Memory card 200 includes a security region 1490 formed of a TRM module, administered uniquely by the memory card so that the user cannot rewrite or read out the contents arbitrarily, and has the internal data destroyed in response to an improper opening process, and a non-security region 1492 where the contents can be read out and rewritten arbitrarily by the user.

Security region 1490 includes hold units storing keys obtained from the time of shipment of memory card 200, i.e., a Kmedia hold unit 1402, a KPcard(1) hold unit 1405, a Kcard(1) hold unit 1415, a [KPmedia, Crtf]KPmaster hold unit 1442, a KPmaster hold unit 1450, and a register 1500 where license information in plaintext is stored. The memory card differs from the memory card of the eighth embodiment shown in FIG. 35 in that a semi-security region is not provided. Regarding license key Kc, license ID data License-ID and user ID data User-ID in the form of plaintext corresponding to a decrypted version of [Kc, License-ID, User-ID]Kcard(1) stored in semi-security region 1491 based on Kcard(1), content key Kc that was not stored in register 1500 in the eighth embodiment is stored in security region 1490 in the form of plaintext. Therefore, security region 1490 requires recording space larger than that of the eighth embodiment.

Non-security region 1493 stores encrypted content data [Dc]Kc, and corresponds to memory 1412. Therefore, a structure is implemented wherein encrypted content data [Dc]Kc can be replicated arbitrarily whereas the data required for reproduction cannot be replicated.

Although description is provided so that all the key hold units are provided in the security region, only Kmedia hold unit 1402 and Kcard(1) hold unit 1415 storing private decryption keys need to be arranged in the security region. The keys stored in the other key hold units may be arranged in a ROM (Read Only Memory) that can be referred to from an external source.

Figure 41:
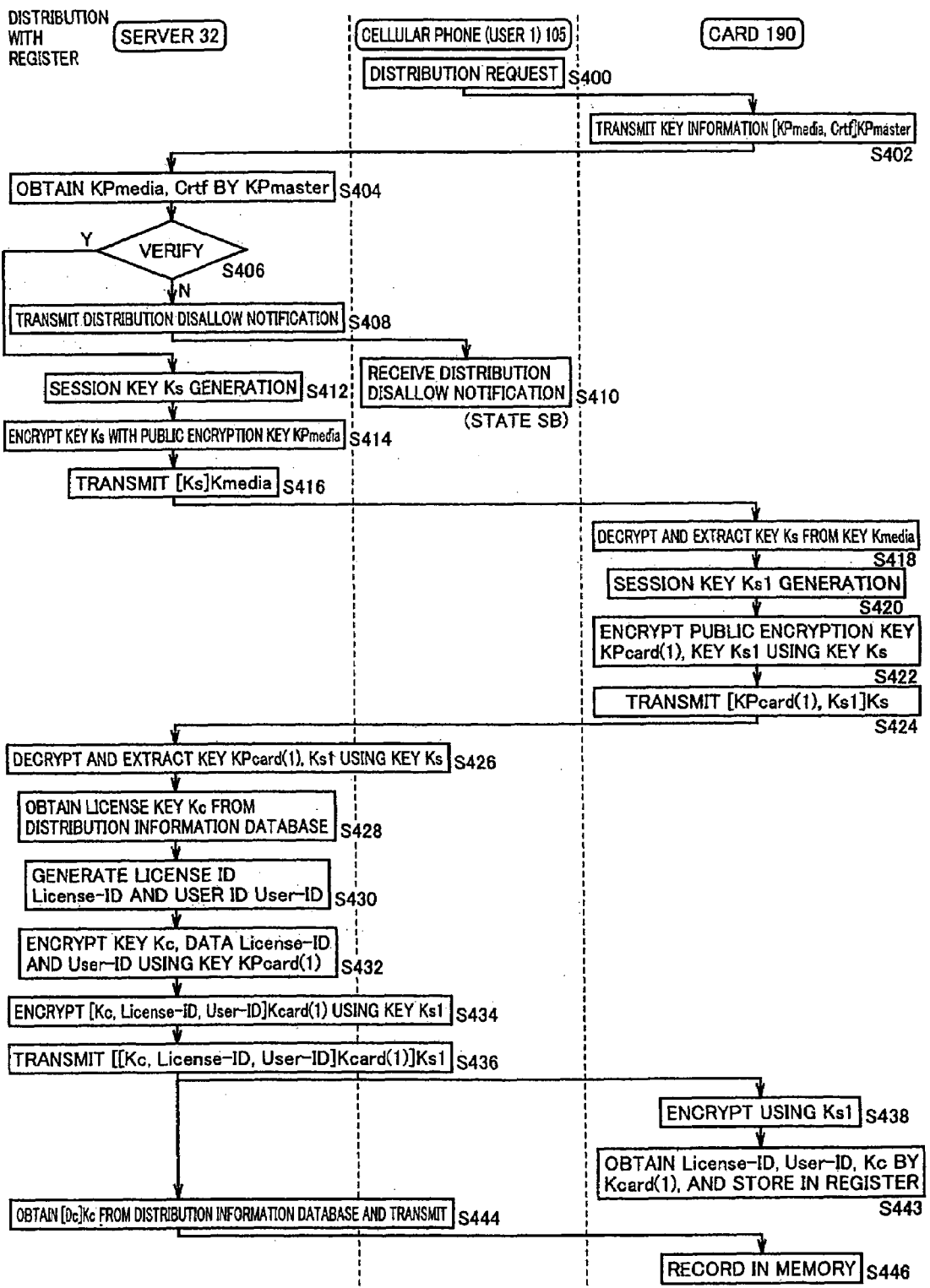
FIG. 41 is a flow chart to describe a distribution mode using memory card 200 of FIG. 38.

FIG. 41 is a flow chart to describe the distribution mode using memory card 200 of FIG. 39, and is comparable to FIG. 36 of the eighth embodiment.

FIG. 41 corresponds to the operation of user 1 receiving content data distribution from content server 12 using memory card 200.

First, a distribution request is issued from cellular phone 105 of user 1 towards memory card 200 through the user's operation of touch key 1108 (step S400).

Encrypted data [KPmedia, Crtf]KPmaster is transmitted from [KPmedia, Crtf]KPmaster hold unit 1442 from memory card 200 via cellular phone 105 (step S402).

When encrypted data [KPmedia, Crtf]KPmaster is received at content server 12, decryption processing unit 326 applies a decryption process based on public decryption key KPmaster stored in KPmaster hold unit 324, whereby public decryption key KPmedia and authentication data Crtf are obtained (step S404).

At content server 12, authentication of memory card 200 is conducted using authentication data Crtf (step S406). When the authenticity of memory card 200 is verified, control proceeds to S412.

When the authenticity of memory card 200 is not verified, content server 12 transmits a distribution disallow notification (step S408). Cellular phone 105 receives the distribution disallow notification (step S410).

When the authenticity of memory card 200 is verified, session key generation unit 314 of content server 12 generates a session key Ks (step S412).

At content server 12, encryption processing unit 316 in content server 12 encrypts session key Ks using public encryption key KPmedia, and applies the encrypted session key onto data bus BS1 (step S414).

Communication device 350 transmits encrypted session key [Ks]Kmedia from encryption processing unit 316 towards memory card 200 of cellular phone 105 through the communication network (step S416).

At memory card 200, decryption processing unit 1404 decrypts the reception data applied to data bus BS3 via memory interface 1200 using private decryption key Kmedia applied from memory 1412 via data bus BS3, whereby session key Ks is decrypted and extracted (step S418). At memory card 200, Ks1 generation unit 1432 generates session key Ks1 (step S420).

In the distribution mode, encryption processing unit 1406 receives public encryption key KPcard(1) applied from KPcard(1) hold unit 1405 in memory 1412 via data bus BS3. Since switch 1409 has contact Pa closed, encryption processing unit 1406 receives session key Ks1 applied from Ks1 generation unit 1432 via contact Pa. Since switch 1435 has contact Pe closed, encryption processing unit 1406 encrypts public encryption key KPcard(1) and session key Ks1 using session key Ks from decryption processing unit 1404. The encrypted keys are provided to data bus BS3 (step S422).

Data [KPcard(1), Ks1]Ks decrypted by decryption processing unit 1406 is transmitted to content server 12 via cellular phone 105 (step S424).

At content server 12, decryption processing unit 318 decrypts data [KPcard(1), Ks1]Ks received by communication device 350 and applied to data bus BS1 using session key Ks, whereby public encryption key KPcard(1) and session key Ks1 are decrypted and extracted (step S426).

Then, distribution control unit 312 obtains license key Kc from distribution information database 304 (step S428), and generates the data such as license ID data License-ID and user ID data User-ID based on the data stored in distribution information database 304 (step S430).

Encryption processing unit 320 receives license key Kc, license ID data License-ID and user ID data User-ID from distribution control unit 312, and applies an encryption process using public encryption key KPcard(1) applied from decryption processing unit 316 (step S432).

Encryption processing unit 322 receives data encrypted by encryption processing unit 320 and applies an encryption process using session key Ks1. The encrypted data is applied to data bus BS1 (step S434).

Communication device 350 transmits data [[Kc, License-ID, User-ID]Kcard(1)]Ks 1 encrypted by encryption processing unit 322 to memory card 200 (step S436).

Since switch 1435 has contact Pf closed in memory card 200, decryption processing unit 1410 applies a decryption process using session key Ks1 from Ks1 generation unit 1432, whereby data [Kc, License-ID, User-ID]Kcard(1) is extracted (step S438).

At memory card 200, decryption processing unit 1416 decrypts data [Kc, License-ID, User-ID]Kcard(1) from decryption processing unit 1410 based on the output from Kcard(1) hold unit 1415 in memory 1412. The decrypted license key Kc, license ID data License-ID and user ID data User-ID are stored in register 1500 in memory 1412 (step S443).

Content server 12 obtains encrypted content data [Dc]Kc from distribution information database 304, and applies the obtained data to memory card 180 via communication device 350 (step S444).

At memory card 200, the received encrypted content data [Dc]Kc is directly stored in memory 1412 (step S446).

By the above operation, content data can be reproduced at memory card 200.

Figure 42:
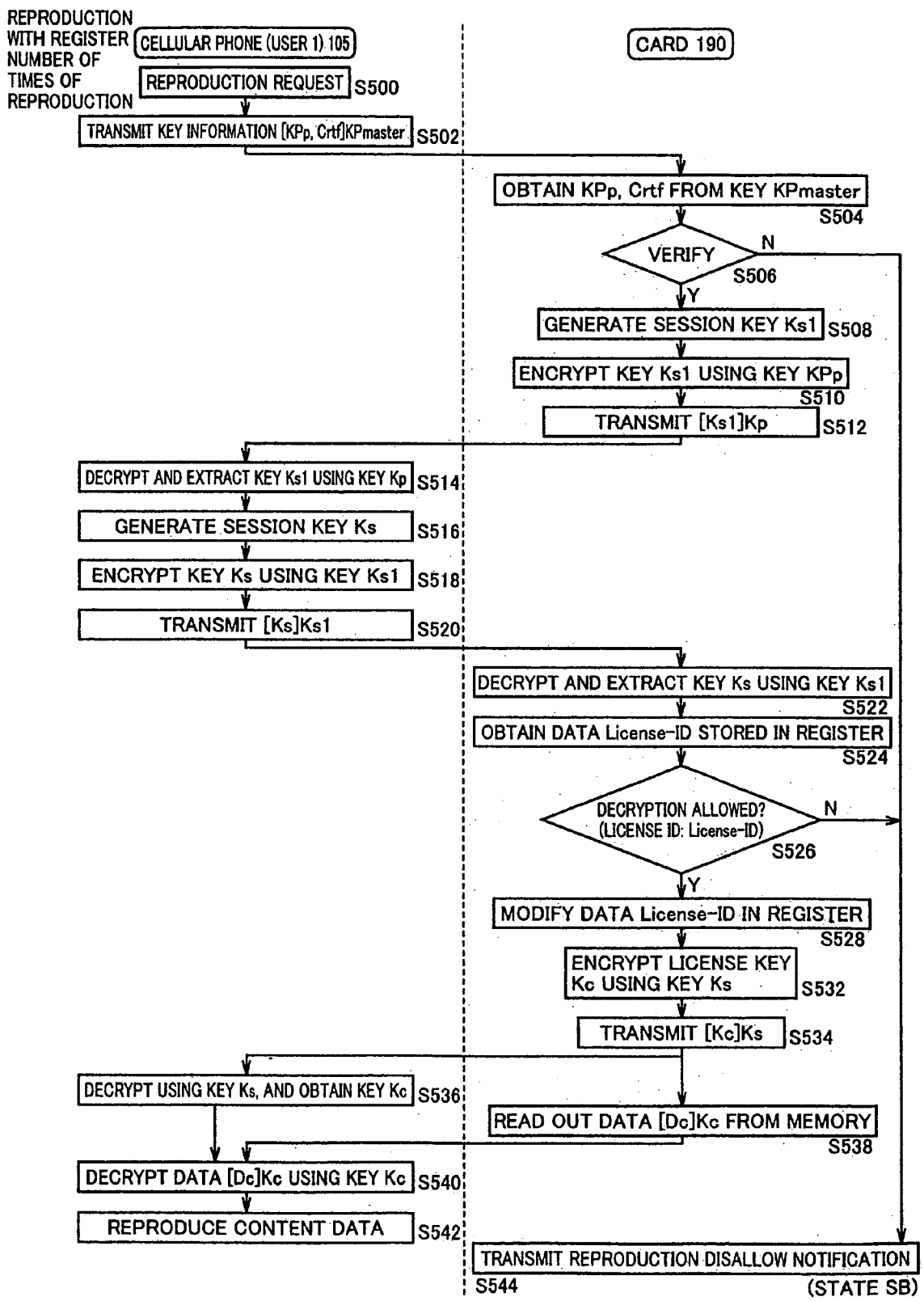
FIG. 42 is a flow chart to describe a reproduction mode to provide music output from the encrypted content data stored in memory card 200.

FIG. 42 is a flow chart to describe the process of decrypting content data from the encrypted content data stored in memory card 200 of the ninth embodiment and reproducing the same as music output in cellular phone 105, and is comparable to FIG. 37 of the eighth embodiment.

Referring to FIG. 41, in response to the application of a reproduction request to cellular phone 105 by designation of user 1 through touch key 1108 of the cellular phone (step S500), encrypted data [KPp, Crtf]KPmaster is transmitted from cellular phone 105 to memory card 200 (step S502).

At memory card 200, decryption processing unit 1452 applies a decryption process using public decryption key KPmaster, whereby public encryption key KPp and authentication data Crtf are obtained (step S504). Controller 1420 verifies the authenticity of cellular phone 105 using authentication data Crtf (step S506). When the authenticity of cellular phone 105 is verified, control proceeds to step S508. When the authenticity of cellular phone 105 is not verified, a reproduction disallow notification is transmitted to cellular phone 105 (step S544).

When the authenticity of cellular phone 105 is verified (step S506), session key generation unit 1432 generates a session key Ks1 (step S508). Encryption processing unit 1430 encrypts session key Ks1 based on public encryption key KPp from decryption processing unit 1452 (step S510). Encrypted session key [Ks1]Kp is transmitted from memory card 200 towards cellular phone 105 (step S512).

At cellular phone 105, decryption processing unit 1522 applies a decryption process, whereby session key Ks1 is decrypted and extracted (step S514). Then session key generation unit 1502 generates session key Ks (step S516). Encryption processing unit 1504 encrypts session key Ks using session key Ks1 (step S518). Encrypted session key [Ks]Ks1 is transmitted from cellular phone 105 to memory card 200 (step S520).

At memory card 200, decryption processing unit 1410 decrypts encrypted session key [Ks]Ks1 using session key Ks 1, whereby session key Ks is extracted (step S522). At memory card 200, license ID data License-ID, user ID data User-ID and the like are read out from register 1500 in memory 1412 by controller 1420 (step S524).

Controller 1420 determines whether the accumulated number of reproduction processes of content data (music data) specified by the data in license ID data License-ID has exceeded an upper limit of the reproducible number of times based on the information included in license ID data License-ID (step S526). When determination is made that the reproducible number of times is not exceeded, memory card 200 updates the data related to the accumulated number of reproduction process in license data License-ID in register 1500 in memory 1412 in response to conduction of a reproduction process (step S528).

Then, memory card 200 reads out license key Kc from memory 1412. License key Kc is encrypted using session key Ks extracted at step S522 (step S532). Encrypted license key [Kc]Ks is applied to data bus BS2 (step S534).

Decryption processing unit 1506 of cellular phone 105 applies a decryption process using session key Ks to obtain license key Kc (step S536).

Then, memory card 200 reads out encrypted content data [Dc]Kc from memory 1412, and applies the read out key to data bus BS2 (step S538).

Music reproduction unit 1508 of the cellular phone decrypts encrypted content key [Dc]Kc using the extracted license key Kc (step S540). The content data is reproduced and applied to mixer unit 1510 (step S542).

When determination is made that the decryption process is not allowed by controller 1420 at step S526, memory card 200 sends a reproduction disallow notification to cellular phone 105 (step S544).

By the above-described structure, the number of times a user can reproduce content data can be restricted even when the memory card and cellular phone generate unique session keys.

FIG. 43 is a flow chart to describe the mode of transferring content data and key data between two memory cards of the ninth embodiment, and is comparable to FIG. 38 of eighth embodiment.

It is assumed that cellular phone 105 corresponds to the reception side whereas cellular phone 107 corresponds to the reception side in FIG. 43. It is also assumed that a memory card 202 having a structure similar to that of memory card 200 is loaded in cellular phone 107.

Cellular phone 105 issues a transfer request to memory card 202 inserted in cellular phone 107 of the reception side (step S600).

In response, encrypted data [KPmedia, Crtf]KPmaster is transmitted from memory card 200 in cellular phone 107 towards memory card 200 (step S602).

When encrypted data [KPmedia, Crtf]KPmaster is received at memory card 200, decryption processing unit 1452 applies a decryption process based on public decryption key KPmaster stored in KPmaster hold unit 1450, whereby public encryption key KPmedia and authentication data Crtf are obtained (step S604).

At memory card 200, authentication of memory card 202 is conducted using authentication data Crtf (step S606). When the authenticity of memory card 202 is verified, control proceeds to S612. When the authenticity of memory card 202 is not verified, memory card 200 sends a transfer di-sallow notification (step S608). Cellular phone 107 receives the transfer disallow notification (step S610).

When the authenticity of memory card 202 is verified, session key generation unit 1432 in memory card 200 generates a session key Ks1 (step S612).

Then, encryption processing unit 1430 of memory card 200 encrypts session key Ks1 using public encryption key KPmedia, and applies the encrypted key to data bus BS3 (step S614).

Memory card 200 transmits encrypted session key [Ks] Kmedia from encryption processing unit 1430 towards memory card 202 of cellular phone 107 via cellular phone 105 (step S616).

At memory card 202, decryption processing unit 1404 decrypts the reception data applied onto data bus BS3 via memory interface 1200 using private decryption key Kmedia, whereby session key Ks is decrypted and extracted (step S618). At memory card 202, Ks2 generation unit 1432' having a structure similar to that of Ks1 generator 1432 generates a session key Ks2 (step S620).

At memory card 202, encryption processing unit 1406 receives public encryption key KPcard(1) applied from KPcard(1) hold unit 1405 in memory 1412 via data bus BS3. Since switch 1409 has contact Pa closed, encryption processing unit 1406 receives session key Ks2 applied from Ks2 generation unit 1432' via contact Pa. Since switch 1435 has contact Pe closed, encryption processing unit 1406 encrypts public encryption key KPcard(1) and session key Ks2 using session key Ks1 from decryption processing unit 1406. The encrypted keys are applied to data bus BS3 (step S622).

Data [KPcard(1), Ks2]Ks1 encrypted by encryption processing unit 1406 is transmitted to memory card 200 via cellular phone 107 (step S624).

At memory card 200, decryption processing unit 1410 decrypts the encrypted data transmitted from memory card 202 using session key Ks1, whereby public encryption key KPcard(2) and session key Ks2 of memory card 192 are decrypted and extracted (step S626). Here, switch 1435 has contact Pf closed. Key Ks1 from Ks1 generation circuit 1432 is applied to decryption processing unit 1410.

Then, at memory card 200, license key Kc, license ID data License-ID and user ID data User-ID are read out from register in memory 1412 (step S629).

Encryption processing unit 1414 of memory card 200 further encrypts license key Kc, license ID data License-ID and user ID data User-ID using public encryption key KPcard(2) of memory card 202 extracted by decryption processing unit 1410 (step S634).

The data encrypted by encryption processing unit 1414 of memory card 200 is applied to encryption processing unit 1406 via switch 1409 (contact Pd closed). Encryption processing unit 1406 encrypts data [Kc, License-ID, User-ID] Kcard(2) using session key Ks2 of memory card 202 (step S636). Here, switch 1435 has contact Pg closed. Session key Ks2 from decryption processing circuit 1410 is applied to encryption processing unit 1406.

Then, memory card 200 transmits the encrypted data [[Kc, License-ID, User-ID]Kcard(2)]Ks2 towards memory card 202 via cellular phone 105 (step S638).

At memory card 202, decryption processing unit 1410 decrypts the data transmitted from memory card 200 based on session key Ks2 (step S641). Memory card 202 decrypts data [Kc, License-ID, User-ID]Kcard(2) based on private decryption key Kcard(2). The decrypted license key Kc, license ID data License-ID and user ID data User-ID are stored in register 1500 of memory 1412 (step S643).

Memory card 200 erases license key Kc, license ID data License-ID and user ID data User-ID from register 1500 (step S644). Then, encrypted content data [Dc]Kc is read out from memory 1412, and transmitted to memory card 202 (step S646).

Memory card 202 stores the received encrypted content data directly in memory 1412 (step S648).

By the above-described structure, an operation similar to that of the eighth embodiment can be realized.

In each of the embodiments described above, non-encrypted data accompanying the content data such as the title of the music data, copyright data associated with the relevant music data (content data) such as the performer (singer, player, and the like), the composer, the songwriter and also access information for music server 30 can be distributed as additional information Di together with the encrypted content data. This additional data Di is recorded in the same memory 1412 of the encrypted content data so as to be processed together with the content data in distribution, transfer and replication, and separated during reproduction so as to be accessible independent of content data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory card to receive and record content key to decrypt content data comprising:
a first key hold unit storing a first private decryption key to decrypt data encrypted with a predetermined first public encryption key corresponding to said memory card,
a first decryption processing unit receiving a first symmetric key updated and distributed for each communication of a content key, and encrypted with said first public encryption key to apply a decryption process,
a second key hold unit to store a second public encryption key unique to each memory card,
a first encryption processing unit encrypting said second public encryption key based on said first symmetric key, and providing the encrypted second public encryption key,
a second decryption processing unit receiving said content key encrypted with said second public encryption key, and further encrypted with said first symmetric key to apply a decryption process based on said first symmetric key,
a first storage unit receiving and storing an output of said second decryption processing unit,
a third key hold unit storing a second private decryption key to decrypt data encrypted with said second public encryption key,
a third decryption processing unit to decrypt said content key using said second private decryption key, based on data stored in said first storage unit, and
a control unit controlling operation of said memory card according to an operation mode designate from an external source,
wherein said first storage unit receives and stores said encrypted content data that can be decrypted based on said content key,
wherein said first encryption processing unit under control of said control unit receives and encrypts using said first symmetric key said content key from said third decryption processing unit in a response to designation of a reproduction operation of said content data for output,
wherein said first storage unit under control of said control unit outputs said encrypted content data in response to designation of reproduction operation of said content data.

2. The memory card according to claim 1, wherein said second decryption processing unit receives license information data encrypted with said second public encryption key and further encrypted with said first symmetric key, distributed together with said content key, and applies decryption based on said first symmetric key,
wherein said third decryption processing unit decrypts said license information data applied from said second decryption processing unit, in a state decrypted with the first symmetric key and encrypted with said second public encryption key,
said memory card further comprising a second storage unit to store said decrypted license information data from said third decryption processing unit.

3. The memory card according to claim 1, further comprising a fourth key hold unit storing a predetermined first public encryption key corresponding to said memory card, and allowing output to an external source.

4. The memory card according to claim 3, wherein said first storage unit receives and stores said encrypted content data that can be decrypted based on said content key.

5. The memory card according to claim 4, further comprising a control unit to control operation of said memory card according to an operation mode designated from an external source,
wherein said first encryption processing unit under control of said control unit receives and encrypts using said first symmetric key said content key from said third decryption processing unit in response to designation of a reproduction operation of said content data for output,
wherein said first storage unit under control of said control unit outputs said encrypted content data in response to designation of a reproduction operation of said content data.

6. The memory card according to claim 5, wherein said second decryption processing unit receives license information data encrypted with said second public encryption key and further encrypted with said first symmetric key, distributed together with said content key, and applies decryption based on said first symmetric key, wherein said third decryption processing unit decrypts said license information data applied from said second decryption processing unit, in a state decrypted with the first symmetric key and encrypted with said second public encryption key, said memory card further comprising a second storage unit to store said decrypted license information data from said third decryption processing unit.

7. The memory card according to claim 2 or 6, further comprising:

a security region that cannot be read out by a third party, including at least said first encryption processing unit, said first decryption processing unit, said second decryption processing unit, said third decryption processing unit, and said second storage unit, and a data region that can be read out by a third party, including said first storage unit.

8. The memory card according to claim 1 or 4, further comprising:

a security region that cannot be read out by a third party, including at least said first encryption processing unit, said first decryption processing unit, said second decryption processing unit, and said third decryption processing unit, and a data region that can be read out by a third party, including said first storage unit.

9. The memory card according to claim 1 or 4, wherein said first storage unit receives and stores, together with said encrypted content data, non-encrypted data accompanying said encrypted content data.

10. The memory card according to claim 1, further comprising:

a key data generation unit generating a second symmetric key, and a second encryption processing unit to encrypt said second symmetric key with said first public encryption key, wherein said encrypted second symmetric key is transmitted from said memory card to another said memory card.

* * * * *